(12) United States Patent
Kudo et al.

(10) Patent No.: US 12,744,969 B2
(45) Date of Patent: Sep. 22, 2026

(54) INFORMATION PROCESSING SYSTEM, INFORMATION PROCESSING METHOD, AND COMPUTER PROGRAM

(71) Applicant: GREE, INC., Tokyo (JP)

(72) Inventors: Yoshiki Kudo, Tokyo (JP); Keisuke Yamaga, Tokyo (JP); Minami Yamamoto, Tokyo (JP); Yousuke Yamanouchi, Kanagawa (JP); Naoki Iio, Saitama (JP); Yuto Yazaki, Tokyo (JP); Koichiro Ito, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 312 days.

(21) Appl. No.: 18/400,801

(22) Filed: Dec. 29, 2023

(65) Prior Publication Data

US 2024/0334018 A1 Oct. 3, 2024

(30) Foreign Application Priority Data

Mar. 27, 2023 (JP) ................................ 2023-049911

(51) Int. Cl.
*H04N 21/478* (2011.01)
*G06Q 10/40* (2026.01)
(Continued)

(52) U.S. Cl.
CPC ......... *H04N 21/4781* (2013.01); *G06Q 10/40* (2026.01); *G06Q 30/0643* (2013.01);
(Continued)

(58) Field of Classification Search
None
See application file for complete search history.

(56) References Cited

U.S. PATENT DOCUMENTS 11,992,754 B2 * 5/2024 Matsuura .............. A63F 13/847
2016/0030846 A1 * 2/2016 Kamiya ................ A63F 13/537 463/31

(Continued)

FOREIGN PATENT DOCUMENTS

JP 2015-184689 A 10/2015
JP 2022-78480 A 5/2022
JP 2022-134539 A 9/2022

OTHER PUBLICATIONS

Aug. 22, 2023 Office Action issued in Japanese Patent Application No. 2023-049911.

(Continued)

*Primary Examiner* — Toan H Vu
(74) *Attorney, Agent, or Firm* — Oliff PLC

(57) ABSTRACT

[Problem] To make the distribution of a game play moving image more familiar to a player by more closely associating game play with the distribution of the game play moving image.
[Means for solving] It is determined that the disclosure condition is satisfied in at least one of a case where predetermined input information is received from the player during the game play of the player and a case where the game play situation becomes a predetermined situation. When a game play moving image of a player is set to a public mode, the game play moving image is controlled to be viewed by a viewer, and game processing is performed on the basis of a viewing situation of the game play moving image in a specific period when the game play moving image of the player is viewed.

22 Claims, 49 Drawing Sheets

(51) Int. Cl.
*G06Q 30/0601* (2023.01)
*H04L 51/52* (2022.01)
*H04N 21/431* (2011.01)
*H04N 21/472* (2011.01)

(52) U.S. Cl.
CPC ......... *H04L 51/52* (2022.05); *H04N 21/4312* (2013.01); *H04N 21/472* (2013.01)

(56) References Cited

U.S. PATENT DOCUMENTS

2016/0271499 A1* 9/2016 Higo ..................... A63F 13/822
2019/0111344 A1* 4/2019 Hiroki ................... A63F 13/833
2020/0360809 A1* 11/2020 Rhyoo .................. A63F 13/537
2021/0316215 A1 10/2021 Sensui
2021/0399911 A1* 12/2021 Jorasch ............... H04L 12/1818
2023/0290033 A1 9/2023 Yamaga
2023/0315269 A1* 10/2023 He ........................... G06F 9/44 715/781
2024/0151998 A1* 5/2024 Kim ........................ G06F 21/84
2025/0267323 A1* 8/2025 Flanagan ......... H04N 21/64723
2025/0362744 A1* 11/2025 Doken .................... G06T 13/00

OTHER PUBLICATIONS

Nov. 21, 2023 Office Action issued in Japanese Patent Application No. 2023-049911.

Dec. 16, 2025 Office Action issued in Japanese Patent Application No. 2024-016093.

* cited by examiner

Figure 42:
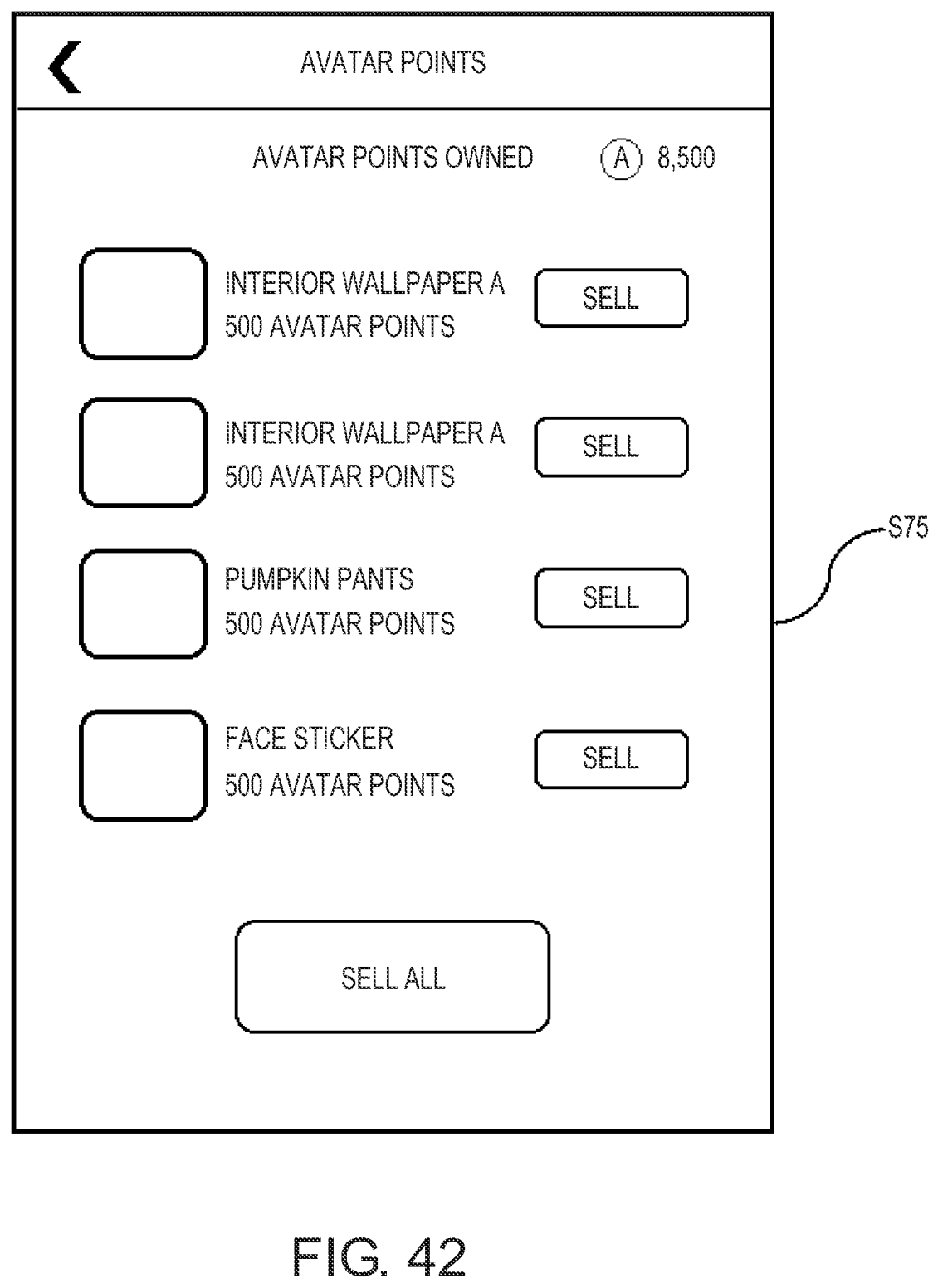

AVATAR POINTS

AVATAR POINTS OWNED (A) 8,500

INTERIOR WALLPAPER A
500 AVATAR POINTS
SELL

INTERIOR WALLPAPER A
500 AVATAR POINTS
SELL

PUMPKIN PANTS
500 AVATAR POINTS
SELL

FACE STICKER
500 AVATAR POINTS
SELL

SELL ALL

INFORMATION PROCESSING SYSTEM, INFORMATION PROCESSING METHOD, AND COMPUTER PROGRAM

This application claims the benefit of priority from Japanese Patent Application No. 2023-049911 filed Mar. 27, 2023, the entire contents of the prior application being incorporated herein by reference.

TECHNICAL FIELD

This disclosure relates to an information processing system, an information processing method, and a computer program.

BACKGROUND TECHNOLOGY

An information processing system is known that generates an animation of a character object based on movement of a user and distributes a video including the animation of the character object.

Additionally, the appearance of the character object is generally generated by combining parts selected by a user.

SUMMARY

Problems to be Solved

Here, parts that generate a character object include those that are provided for free of charge if a predetermined condition is met, and those that can be obtained with a predetermined probability through a lottery such as a gacha. Additionally, technology has been developed to sell the parts that generate a character object at a shop in a virtual space.

In recent years, in addition to video distribution, there has been an increase in the provision of services that use a character object, which is a person's own avatar, such as video chats and the metaverse.

In such a situation, it is expected that an increasing number of users will use a shop to adjust the appearance of their character objects before they are seen by other users. If there are many steps from the time a user uses a shop to the time s/he distributes a video, the start of distributing a video and the like will be delayed, and there is a risk that the user's desire to distribute a video and the like will even decrease.

Furthermore, the delay in the start of distributing a video and the decrease in users' desire to distribute a video lead to a reduction in distribution time, and the like, and there is a risk that the quality of video content may deteriorate.

Accordingly, it is an object of this disclosure to provide a technical improvement that solves or alleviates at least part of the problem of the conventional technology described above.

One of the more specific objects of this disclosure is to provide an information processing system, an information processing method, and a computer program that allow a user to smoothly start distributing a video and the like by reducing the number of steps from the time a user uses a shop to the time s/he distributes a video.

Means of Solving Problem

An information processing system of this disclosure comprises a user terminal of a user and a server device, wherein one or more computer processors included in the information processing system comprise: a display processor that displays a display screen that includes a first screen that displays a character object of the user, and a second screen that selectably displays one or more game media that can be attached to the character object; a receiver that receives, from the user terminal, a selection instruction of at least one game medium from among the one or more game media; and an association portion that consumes a predetermined number of specific game media held by the user based on the selection instruction received by the receiver, and stores the game medium related to the selection instruction in association with the user and the character object.

The one or more computer processors can further comprise a first determination portion that determines whether a number of the specific game media is insufficient; and the association portion can store the game medium related to the selection instruction in association with the user and the character object when the first determination portion determines that the number of the specific game media is not insufficient.

When the user is a distributing user of a video, processing by the receiver, the display processor, and the association portion can be executed while the video is being distributed in a manner viewable by a viewing user of the video.

The display processor can make at least part of the display screen different between the user terminal of the distributing user and a user terminal of the viewing user.

The display processor can determine the one or more game media to be displayed on the second screen according to an attribute of the character object that is displayed on the first screen.

The one or more computer processors can further comprise a change portion that changes the character object displayed on the first screen to another character object of the user according to an operation of the user.

The one or more computer processors can further comprise a second determination portion that determines whether attributes of the character object and the other character object are different in relation to the change process by the change portion; and if the second determination portion determines that the attributes of the character object and another character object are different, the display processor can determine the one or more game media to be displayed on the second screen according to the attribute of the other character object.

When the receiver receives the selection instruction, the display processor can further display, on the display screen, a first object for receiving a display instruction of a third screen that is displayed to enable cancellation of the selection of the game medium related to the selection instruction.

The display processor can display, on the third screen, a list of game media related to the selection instruction in a predetermined order.

When the receiver receives a selection instruction of one or more game media that can be attached to the character object and one or more game media that can be attached to the other character object, the display processor can further (i) display, on the display screen, a first object for receiving a display instruction of a third screen that is displayed to enable cancellation of the selection of the game media related to the selection instruction, and (ii) display, on the third screen, a list of game media related to the selection instruction in a predetermined order for each character object to which the one or more game media are to be attached.

When the receiver receives the display instruction of the third screen from the user terminal via the first object, the display processor can further (i) display the third screen on the display screen and (ii) display a second object on the display screen for sending a decision instruction to consume the predetermined number of specific game media and to store the game medium related to the selection instruction in association with the user and the character object; and in response to the selection of the second object, the association portion can store game media for which the selection has not been canceled in association with the user and the character object.

When the receiver receives the decision instruction from the user terminal via the second object, the display processor can further cause (i) the display screen to display a fourth screen that is displayed to enable cancellation of the selection of the game medium related to the decision instruction and (ii) the display screen to display a third object for executing processing by the association portion; and the association portion can store only game media for which the selection has not been canceled in association with the character object in response to the selection of the third object.

The receiver can further receive selection of at least one attribute from among a plurality of attributes provided for the game medium related to the selection instruction.

When the receiver receives the selection instruction, the display processor can cause the game medium related to the selection instruction to be attached to the character object that is displayed on the first screen, and can display the character object with the attached game medium.

When multiple game media to be attached to one part of the character object are selected, the display processor can switch and display attachment of the multiple game media according to user's movement or operation.

When multiple game media to be attached to one part of the character object are selected, the display processor can divide the one part into a plurality of regions and can attach and display each of the multiple game media related to the selection instruction in a respective one of the regions.

The display processor can display a still image or video related to the character object of the user separately from the character object displayed on the first screen.

The association portion can store the game medium related to the selection instruction in association with the user and the character object with a restriction, based on the selection instruction and a tentative decision instruction received by the receiver.

A consumption amount of the specific game media when the association portion stores the game medium related to the selection instruction in association with the user and the character object with a restriction can be less than a consumption amount of the specific game media when the association portion stores the game media related to the selection instruction in association with the user and the character object.

The restriction can be directed to a period of the association.

The restriction can be cancelled by consumption of the specific game media by the user or another user.

The one or more computer programs can further comprise a notification portion that displays, on the user terminal, a notification indicating that the number of the specific game media consumed when associating the game medium related to the selection instruction has been reduced, at a predetermined timing after the association is canceled due to the restriction.

The one or more computer processors can further comprise a third determination portion that determines whether multiple game media having a predetermined relationship are included in the game medium related to the selection instruction; and when the third determination portion determines that the multiple game media having the predetermined relationship are included, the association portion can reduce the number of the specific game media consumed when associating the game media related to the selection instruction, and can store the game medium related to the selection instruction in association with the user and the character object.

An information processing method of this disclosure is executed in an information processing system including a user terminal of a user and a server device, wherein: the information processing method causes one or more computer processors included in the information processing system to execute: a display processing step that displays a display screen that includes a first screen that displays a character object of the user, and a second screen that selectably displays one or more game media that can be attached to the character object; a receiving step that receives, from the user terminal, a selection instruction of at least one game medium from among the one or more game media; and an associating step that consumes a predetermined number of specific game media held by the user based on the selection instruction received in the receiving step, and stores the game medium related to the selection instruction in association with the user and the character object.

An information processing method of this disclosure causes an information processing device to execute: a display processing step that displays a display screen that includes a first screen that displays a character object of a user, and a second screen that selectably displays one or more game media that can be attached to the character object; a receiving step that receives a selection instruction of at least one game medium from among the one or more game media; and an associating step that consumes a predetermined number of specific game media held by the user based on the selection instruction received in the receiving step, and stores the game medium related to the selection instruction in association with the user and the character object.

A computer program of this disclosure causes an information processing device to realize: a display processing function that displays a display screen that includes a first screen that displays a character object of a user, and a second screen that selectably displays one or more game media that can be attached to the character object; a receiving function that receives a selection instruction of at least one game medium from among the one or more game media; and an associating function that consumes a predetermined number of specific game media held by the user based on the selection instruction received in the receiving function, and stores the game medium related to the selection instruction in association with the user and the character object.

Effects

This disclosure provides a technical improvement that solves or alleviates at least part of the problem of the conventional technology described above. Specifically, according to this disclosure, by reducing the number of steps from a user using a shop to distributing a video, an information processing system, an information processing method, and a computer program can be provided that allow a user to start distributing a video smoothly and the like.

BRIEF DESCRIPTION OF DRAWINGS

FIG. 42 is a conceptual diagram showing an image of a screen displayed on a user terminal.

DETAILED DESCRIPTION OF EMBODIMENTS

Figure 1:
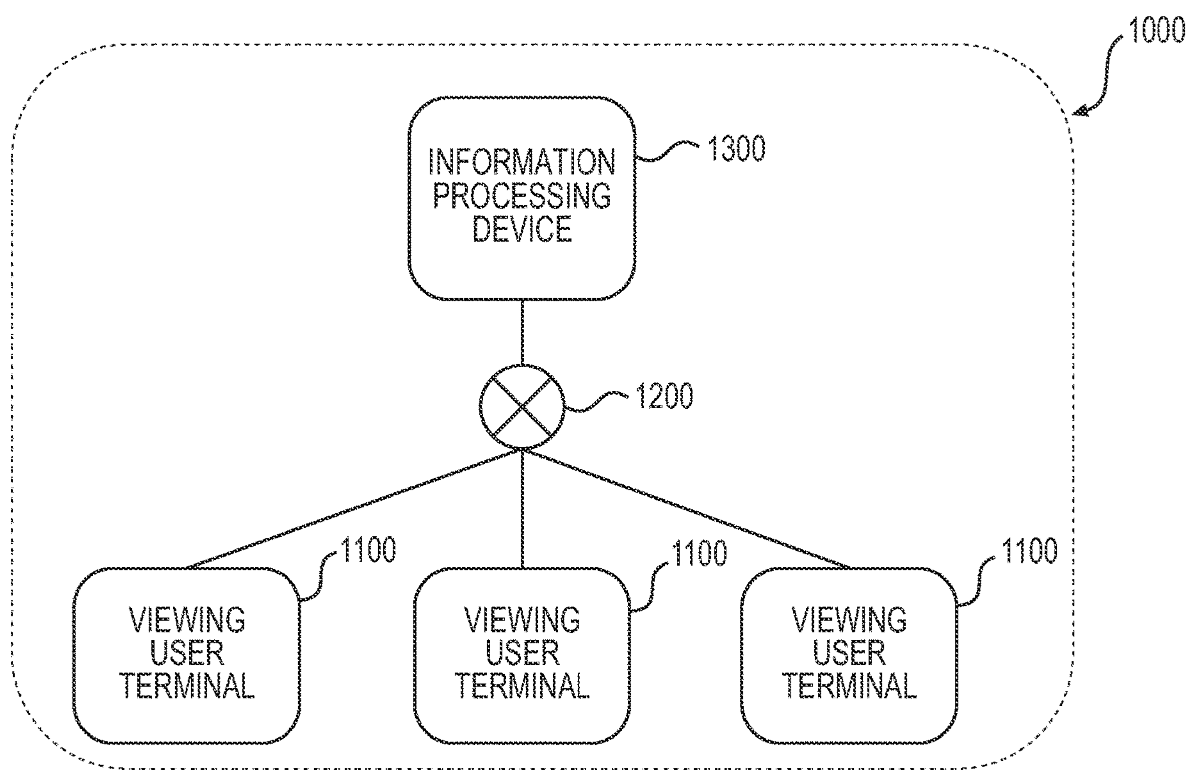
FIG. 1 is a system configuration diagram showing an example of an information processing system in this disclosure.

First, an overview of an information processing system according to an embodiment of this disclosure will be described with reference to the drawings.

The information processing system in this disclosure is an information processing system including one or more client devices and a server device, and includes one or more computer processors.

A video displayed on each client device is described as including an animation of a 3D or 2D character object generated based on movement of a distributing user, but the description is not limited to this, and the video may include an animation of a character object generated in response to an operation by the distributing user, or may include an image of the distributing user himself/herself. Further, the video may also include only the voice of the distributing user, without displaying a character object or the distributing user.

Here, a distributing user means a user who sends information related to video and/or sound. For example, a distributing user can be a user who organizes or hosts a single video distribution, a collaborative distribution in which multiple people can participate, a video or voice chat that multiple people can participate in and/or view, or an event (for example, a party) in a virtual space that multiple people can participate in and/or view, that is, a user who mainly performs these functions. Therefore, the distributing user in this disclosure can also be called a host user, a sponsor user, a hosting user, or the like.

Meanwhile, a viewing user means a user who receives information related to video and/or sound. However, the viewing user can be a user who not only receives the above information, but can also react to it. For example, a viewing user can be a user who views a video distribution, a collaborative distribution, or a user who participates in and/or views a video or voice chat, or an event. Therefore, the viewing user in this disclosure can also be referred to as a guest user, a participating user, a listener, a spectator user, a cheering user, or the like.

The information processing system in an embodiment of this disclosure can be used to provide the next Internet space (metaverse), which is a digital world in which many people can participate simultaneously and freely engage in activities such as interaction, work, and play via character objects (avatars) at a level close to that of the real world. Social activities can be carried out transcending the gap between reality and virtuality. It can be used to provide the next Internet space (metaverse).

In such a space, user avatars can freely walk around the world and communicate with each other.

Additionally, one avatar (character object) among the plurality of avatars in the virtual space may be configured to be able to distribute a video as a character object of a distributing user. That is, one-to-many video distribution can be performed in a many-to-many metaverse virtual space.

In such a space, there may be no particular distinction between a distributing user and a viewing user.

The space displayed in the video may be a virtual space, a real space, or an augmented reality space that is a combination thereof. The video may be a karaoke video or a live game video that plays at least a predetermined image and the voice of the distributing user, or it may be a superimposed display of a character object, or a real image of the distributing user, on these images.

Further, when the distributing user is included in a real space, a character object generated based on movement of the distributing user may be superimposed and displayed on the actual image of the distributing user. Further, an animation such as a gift object may be superimposed and displayed on a captured image of the real space.

<System Configuration>

As shown as an example in FIG. 1, an information processing system 1000 according to this disclosure includes (i) one or more viewing user terminals 1100, and (ii) an information processing device (support computer) 1300 arranged in a video distribution studio or the like, which is connected to these viewing user terminals 1100 via a network 1200.

Further, the information processing device 1300 may be connected to a predetermined server device via the Internet, and part or all of the processing to be performed by the information processing device 1300 may be performed by the server device. The server device may be an information processing device 2400 shown in FIG. 2.

In this specification, distribution by the information processing system 1000 is referred to as studio distribution.

In studio distribution, movement of an entire body of a distributing user (actor) will be reflected in a character in real time by shooting markers attached to the distributing user with a camera(s) installed in the studio and using known motion capture technology.

Figure 2:
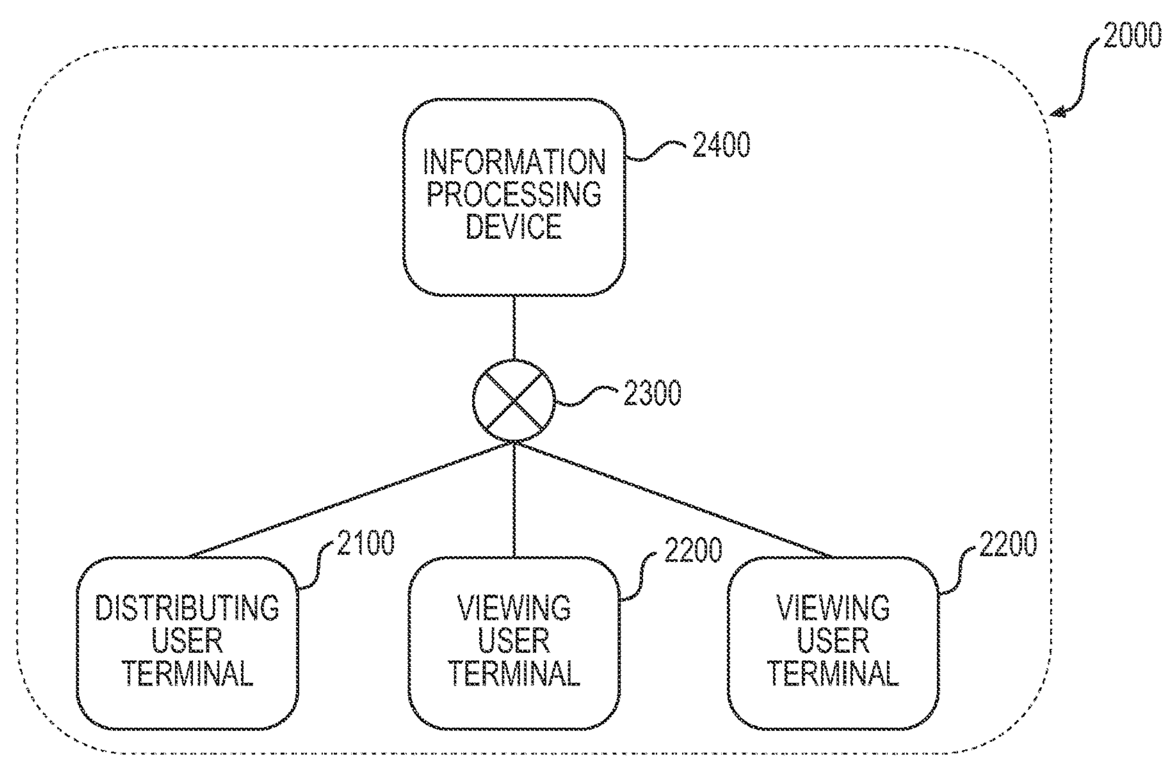
FIG. 2 is a system configuration diagram showing an example of an information processing system in this disclosure.

Additionally, the information processing system 1000 can also work in cooperation with another information processing system 2000, shown in FIG. 2 as an example. The information processing system 2000 shown in FIG. 2 can include (i) a distributing user terminal 2100, (ii) one or more viewing user terminals 2200, and (iii) and an information processing device (server device) 2400 that is connected to the distributing user terminal 2100 and the viewing user terminals 2200 via a network 2300.

In the above example, the distributing user terminal 2100 can be an information processing terminal such as a smartphone. In this specification, distribution by such information processing system 2000 is referred to as mobile distribution.

In mobile distribution, the movement of the distributing user's face is captured by a camera provided in the distributing user terminal 2100 and reflected on the character's face in real time using known face tracking technology.

There is no particular distinction between a distributing user and a viewing user in mobile distribution. A viewing user can perform mobile distribution at any time, and a distributing user can be a viewing user when viewing a video of another distributing user.

The video generated by the information processing system 1000 and the information processing system 2000 can be distributed to a viewing user from one video distribution platform, as an example.

Furthermore, in any distribution, the process of generating animation by reflecting motion on a character, the process of displaying a gift described hereafter, and the like may be shared by a distributing user terminal, a viewing user terminal, an information processing device and other devices.

That is, "distribution" here refers to sending information to make the video available for viewing at the viewing user terminal. Video rendering is performed at the information processing devices 1300, 2400 side or at the distributing user terminal 2100 and viewing user terminal 1100 and 2200 side.

Specifically, face motion data and sound data of the distributing user is sent from the distributing user terminal or information processing device to a terminal or device that generates (renders) an animation of a character object. Further, body motion may be sent in addition to the face motion.

In this disclosure, the process of generating an animation will be described as being performed by each of the distributing user terminal and the viewing user terminal, but this disclosure is not limited to this.

Figure 3:
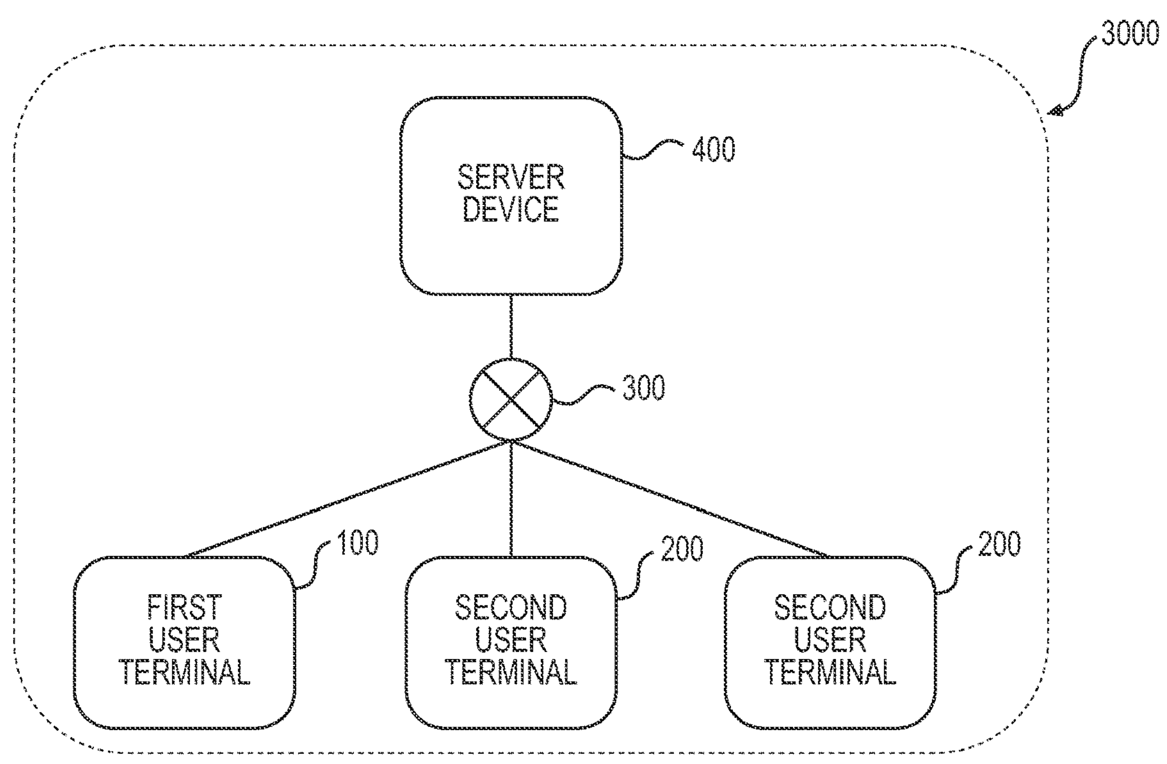
FIG. 3 is a system configuration diagram showing an example of an information processing system in this disclosure.

The information processing system in this disclosure can be applied to any of the examples shown in FIGS. 1 and 2. Further, an information processing system 3000 in an embodiment of this disclosure is described as being provided with a first user terminal 100, second user terminals 200, and a server device 400 that can be connected to these distributing first terminal 100 and second user terminals 200 via a network 300, as shown in FIG. 3.

The first user terminal 100 and the second user terminals 200 are interconnected with the server device 400 via, for example, a base station, a mobile communication network, a gateway, and the Internet. Communication is performed between the first user terminal 100 and the second user terminals 200 and the server device 400 based on a communication protocol such as the Hypertext Transfer Protocol (HTTP). Additionally, between the first user terminal 100 and the second user terminals 200 and the server device 400, communication may be performed based on WebSocket, which initially establishes a connection via HTTP communication and then performs bidirectional communication at a lower cost (less communication load and processing load) than HTTP communication. The communication method between the first user terminal 100 and the second user terminals 200 and the server device 400 is not limited to the method described above, and any communication method technology may be used as long as it can realize this embodiment.

The first user terminal 100 functions as at least the information processing device 1300, the viewing user terminal 1100, the distributing user terminal 2100, or the viewing user terminal 2200 described above. The second user terminals 200 function as at least the information processing device 1300, the viewing user terminal 1100, the distributing user terminal 2100, or the viewing user terminal 2200 described above. The server device 400 functions as at least the server device or information processing device 2400 described above.

In this disclosure, the first user terminal 100 and the second user terminals 200 may each be a smartphone (multi-functional phone terminal), a tablet terminal, a personal computer, a console game machine, a head-mounted display (HMD), a wearable computer such as a spectacle-type wearable terminal (AR glasses or the like), or an information processing device other than these devices that can reproduce a video. Further, these terminals may be stand-alone devices that operate independently, or may be constituted by a plurality of devices that are connected to each other so as to be able to send and receive various data.

<Hardware Configuration>

Here, a hardware configuration of the first user terminal 100 will be described using FIG. 4. The first user terminal 100 includes a processor 101, a memory 102, a storage 103, an input/output interface (input/output I/F) 104, and a communication interface (communication I/F) 105. Each component is connected to each other via a bus B.

The first user terminal 100 can realize the functions and methods described in this embodiment by the processor 101, the memory 102, the storage 103, the input/output I/F 104, and the communication I/F 105 working together.

The processor 101 executes a function and/or a method realized by a code or a command included in a program stored in the storage 103. The processor 101 may realize each process disclosed in each embodiment by a logic circuit (hardware) or a dedicated circuit formed in an integrated circuit (IC (Integrated Circuit) chip, an LSI (Large Scale Integration)) or the like, including, for example, a CPU (Central Processing Unit), an MPU (Micro Processing Unit), a GPU (Graphics Processing Unit), a microprocessor, a processor core, a multiprocessor, an ASIC (Application-Specific Integrated Circuit), an FPGA (Field Programmable Gate Array), or the like. These circuits may be realized by one or more integrated circuits. A plurality of processes shown in each embodiment may be realized by a single integrated circuit. Furthermore, LSI may also be referred to as VLSI, Super LSI, Ultra LSI, or the like, depending on difference in the degree of integration.

The memory 102 temporarily stores a program loaded from the storage 103 and provides a work area to the processor 101. Various data generated while the processor 101 is executing the program are also temporarily stored in the memory 102. The memory 102 includes, for example, a RAM (Random Access Memory), a ROM (Read Only Memory), and the like.

The storage 103 stores the program. The storage 103 includes, for example, an HDD (Hard Disk Drive), an SSD (Solid State Drive), a flash memory, or the like.

The communication I/F 105 is implemented as hardware such as a network adapter, software for communication, or a combination thereof, and is used to send and receive various types of data via the network 300. This communication may be executed by either by wire or wirelessly, and any communication protocol may be used as long as mutual communication can be executed. The communication I/F 105 executes communication with another information processing device via the network 300. The communication I/F 105 sends various data to other information processing devices according to instructions from the processor 101. The communication I/F 105 also receives various data sent from other information processing devices and transmits them to the processor 101.

The input/output I/F 104 includes an input device for inputting various operations to the first user terminal 100 and an output device for outputting processing results processed by the first user terminal 100. The input/output I/F 104 may be such that the input device and the output device are integrated, or may be separated into the input device and the output device.

The input device is realized by any one of all types of devices that can receive an input from a user and transmit information related to the input to the processor 101, or a combination thereof. The input device includes, for example, (i) a hardware key, such as a touch panel, a touch display, or a keyboard, (ii) a pointing device, such as a mouse, (iii) a camera (operation input via an image), and (iv) a microphone (operation input by sound).

The input device may include a sensor portion. The sensor portion is one or more sensors that detect (i) face motion, which indicates changes in the user's facial expression, and (ii) body motion, which indicates changes in the relative position of the user's body with respect to the sensor portion. Face motion includes movements such as blinking of the eyes, opening and closing of the mouth, and the like. A known device may be used as the sensor portion. An example of a sensor portion includes (i) a ToF sensor that measures and detects the time of flight (Time of Flight) until light irradiated toward the user is reflected by the user's face and returns, or the like, (ii) a camera that captures the user's face, and (iii) an image processor that image-processes the data captured by the camera. The sensor portion may also include an RGB camera for capturing visible light and a near-infrared camera for capturing near-infrared light. The RGB camera and near-infrared camera may use, for example, "True Depth" of the "iPhone X (registered trademark)," "LiDAR" of the "iPad Pro (registered trademark)," or other ToF sensors in smartphones. This camera specifically projects tens of thousands of invisible dots onto the user's face and the like. Then, accurate face data is captured by detecting and analyzing the reflected light of the dot pattern to form a depth map of the face, and capturing infrared images of the face and the like. An arithmetic processor of the sensor portion generates various types of information based on the depth map and infrared images, and compares this information with registered reference data to calculate the depth (distance between each point and the near-infrared camera) and non-depth positional deviations for each point on the face.

Further, the sensor portion may have a function of tracking not only the user's face, but also the hand(s) (hand tracking). The sensor portion may further include a sensor other than the above-mentioned sensors such as an acceleration sensor and a gyro sensor. The sensor portion may have a spatial mapping function of (i) recognizing an object in the real space in which the user exists based on the detection results of the above ToF sensor or other known sensor, and (ii) mapping the recognized object to a spatial map. Hereinafter, when the face motion detection data and the body motion detection data are described with no particular distinction, they are simply referred to as "tracking data." The image processor of the sensor portion may be provided with a controller that can be provided in the information processing system of this disclosure.

As an operation portion as an input device, a device corresponding to the type of the user terminal can be used. An example of the operation portion is a touch panel integrated with a display, an operation button provided on a housing of a user terminal, a keyboard, a mouse, a controller operated by a user, and the like. The controller may incorporate various known sensors such as an inertial measurement sensor (IMU: Inertial Measurement Unit) such as an acceleration sensor and a gyro. Furthermore, another example of the operation portion may be a tracking device that specifies the movement of the user's hand, the movement of the eyes, the movement of the head, the direction of the line of sight, and the like. In this embodiment, for example, based on the user's hand movements, the user's instructions are determined and various operations are performed such as starting or ending the video distribution, rating messages and videos, and requesting the display of predetermined objects (for example, the gift described hereafter), and the like. If the sensor portion also has an input interface function such as a hand tracking function, the operation portion can be omitted.

The output device outputs the processing result processed by the processor 101. The output device includes, for example, a touch panel, a speaker, and the like.

The functions realized by the components described in this specification may be implemented in circuitry or processing circuitry programmed to realize the functions described, including general-purpose processors, special-purpose processors, integrated circuits, ASICs (Application Specific Integrated Circuits), a CPU (a Central Processing Unit), conventional circuits, and/or combinations thereof. Processors include transistors and other circuits, and are referred to as circuitry or processing circuitry. The processors may be programmed processors that execute programs stored in memory.

In this specification, circuitry, units, and means are hardware that is programmed, or hardware that performs, so as to realize the functions described. Such hardware may be any hardware disclosed in this specification or any hardware known to be programmed or to perform so as to realize the functions described herein.

When the hardware is a processor considered to be of the circuitry type, the circuitry, means or units are a combination of (i) hardware and (ii) software used to constitute a processor and/or the hardware.

Figure 4:
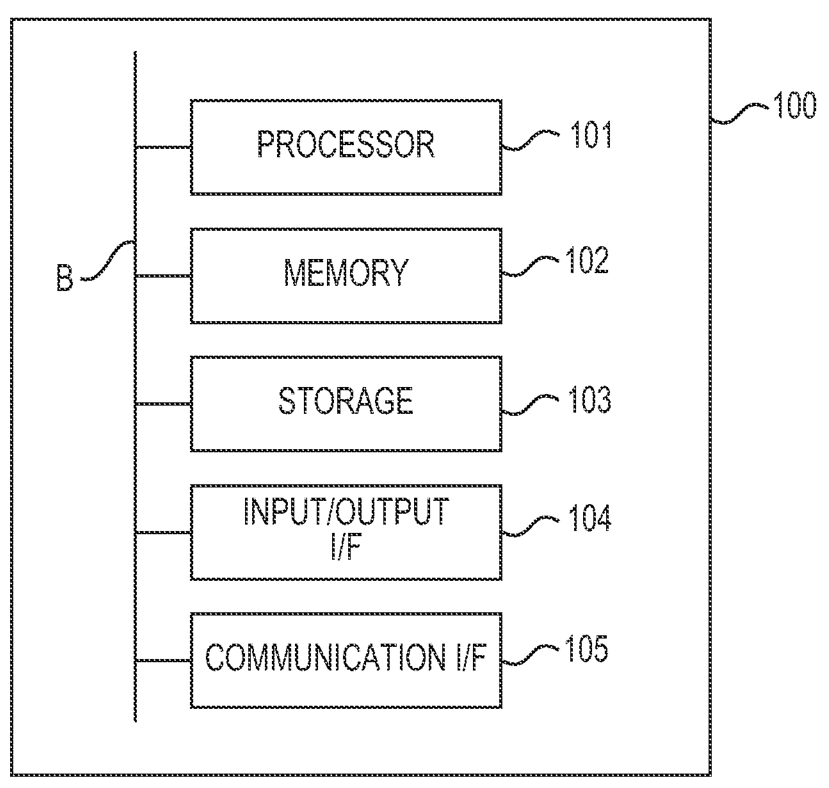
FIG. 4 is a configuration diagram showing an example of a hardware configuration of a server device, a first user terminal, and a second user terminal in this disclosure.

Also, except for special cases, a second user terminal 200 and server device 400 in this disclosure can be configured with the same hardware configuration as in FIG. 4.

Next, various functions that can be executed in a user terminal that starts an application realized by an information processing system according to the embodiment of this disclosure, and transitions of screens that are displayed, will be described with reference to the drawings.

Figure 5:
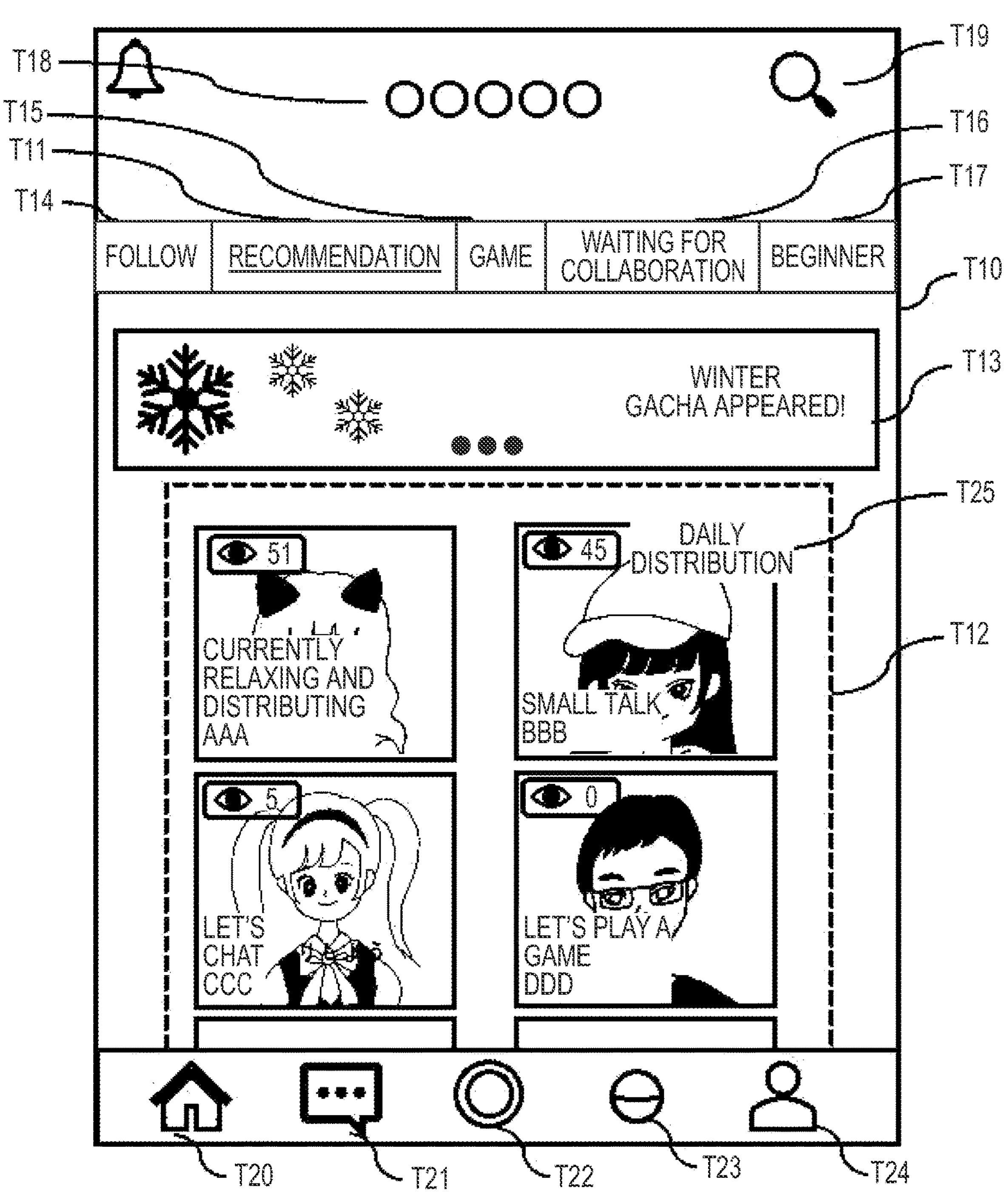
FIG. 5 is a conceptual diagram showing an image of a screen displayed on a user terminal.

FIG. 5 shows a top screen T10 displayed on a user terminal (here, it is not yet specified whether or not the user will view or distribute) when a video distribution/viewing application is started.

As shown in FIG. 5, by selecting one distribution channel (called a distribution frame, distribution program, distribution video or the like) from among thumbnail images of one or more recommended distribution channels T12 displayed in a recommendation tab T11 on the top screen T10, the user can view a video played on that distribution channel.

Alternatively, by accessing a fixed link for a specific distribution channel, the user can view a video played on that specific distribution channel. Such fixed links may come from a notification from a first user who is followed, or from a share notification sent by another user.

Here, the user who views the video is the viewing user, and the terminal for viewing the video is the second user terminal 200.

Further, as shown in FIG. 5, a display field T13 for notification of a campaign, an event, or the like may be displayed on the top screen T10. The display field T13 of this notification can be switched to another notification by a slide operation.

Additionally, from the top screen T10, a follow tab T14, a game tab T15 for displaying a game category, an awaiting collaboration tab T16 for displaying a distribution channel that is awaiting collaboration, and a beginner tab T17 for displaying a beginner's distribution channel are displayed. By selecting these (by switching the tabs), the top screen T10 transitions to respective different screens.

A service name display T18 and a search button T19 in an upper frame of the top screen T10 may be fixedly displayed on a transition destination screen.

Similarly, a home button T20, a message button T21, a distribution preparation button T22, a gacha button T23, and a profile button T24 in a lower frame of the top screen T10 may be fixedly displayed on the transition destination screen.

A user who selects displayed thumbnail images T12 on the top screen T10 or the like shown in FIG. 5 becomes a viewing user (second user) who views the video as described above, and a user who selects the distribution preparation button T22 can become a distributing user (first user) who distributes a video.

Figure 6:
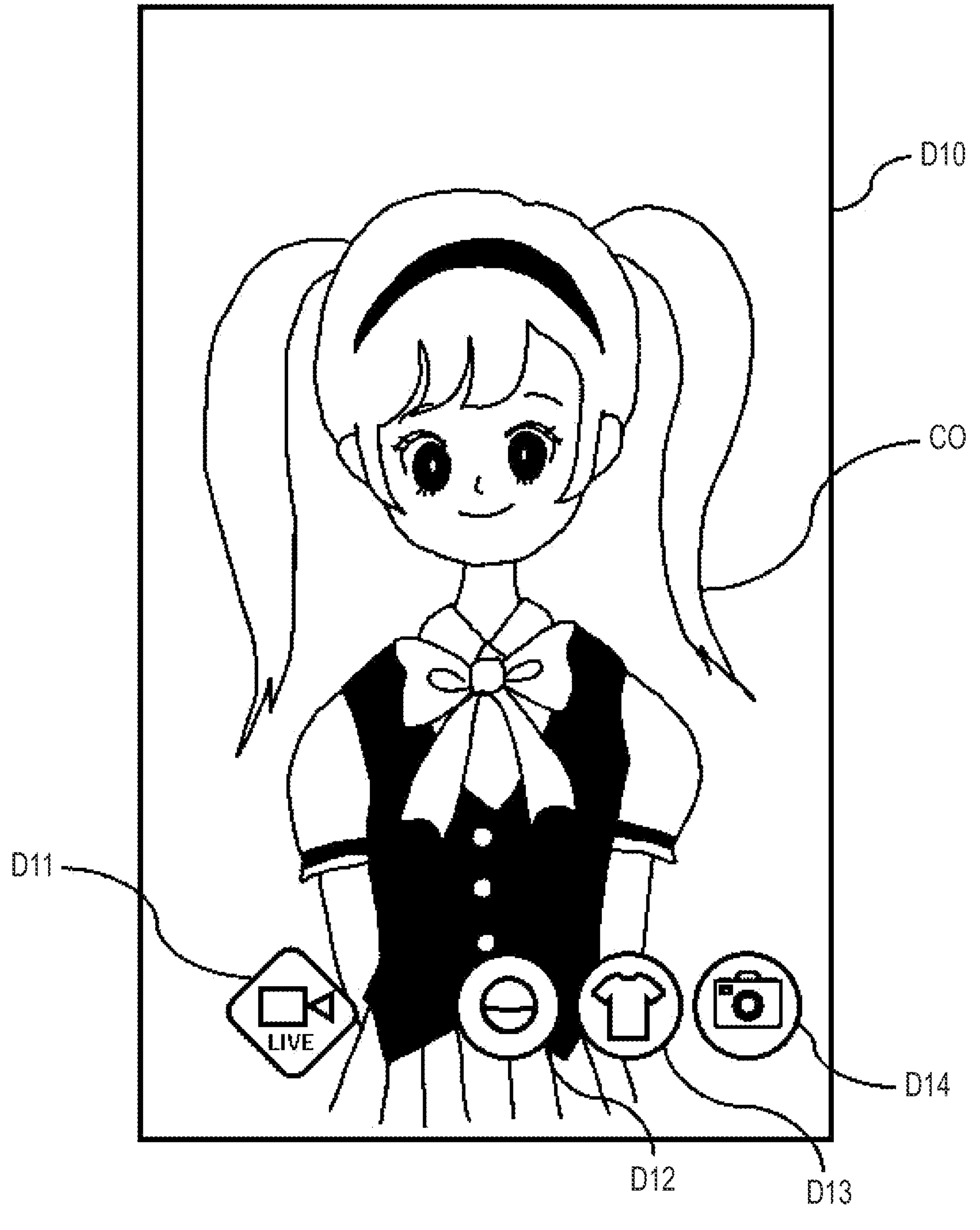
FIG. 6 is a conceptual diagram showing an image of a screen displayed on a user terminal.

As an example, when the distribution preparation button T22 is selected on the top screen T10 shown in FIG. 5, the screen transitions to an avatar setting screen D10 shown in FIG. 6. Then, when a distribution button D11 is selected on the avatar setting screen D10, the screen transitions to a distribution setting screen D20 shown in FIG. 7. Then, when a distribution start button D25 is selected on the distribution setting screen D20, the screen transitions to an avatar distribution screen D30 shown in FIG. 8.

Next, details of a flow up to the start of video distribution will be described.

The one or more computer processors in this disclosure may include a distribution start request receiver, a distribution setting portion, and a distribution start portion.

The distribution start request receiver receives a distribution start request for a first video including an animation of a character object from the first user terminal of the first user.

Here, the first video refers to a video including an animation of a character object. In this specification, the character object may be referred to as an "avatar."

The above-described distribution start request can be sent from the user terminal to the information processing device 400 by selecting the distribution button D11 located on the avatar setting screen or the like that has transitioned from the top screen displayed on the user terminal (later to become the first user terminal) that started a dedicated application (video distribution/viewing application) for accessing the above-described video distribution platform.

FIG. 6 shows an example of the avatar setting screen D10. A character object CO, the distribution button D11, a gacha button D12, a clothes-changing button D13, a photo button D14, and the like can be displayed on the avatar setting screen D10.

When the clothes-changing button D13 is selected by the user, a closet screen for selecting various avatar parts such as eyes, nose, mouth, hair, accessories, clothes, and background of the character object CO appears.

When the gacha button D12 is selected by the user, a lottery screen for obtaining the above-described avatar parts appears.

When the photo button D14 is selected by the user, a capturing screen for capturing a still image of the character object appears.

When the distribution button D11 is selected by the user, a distribution start request is sent to the information processing device 400.

The distribution setting portion sets the distribution setting of the first video based on the designation from the first user terminal 100 in response to the distribution start request of the first video received by the distribution start request receiver.

Figure 7:
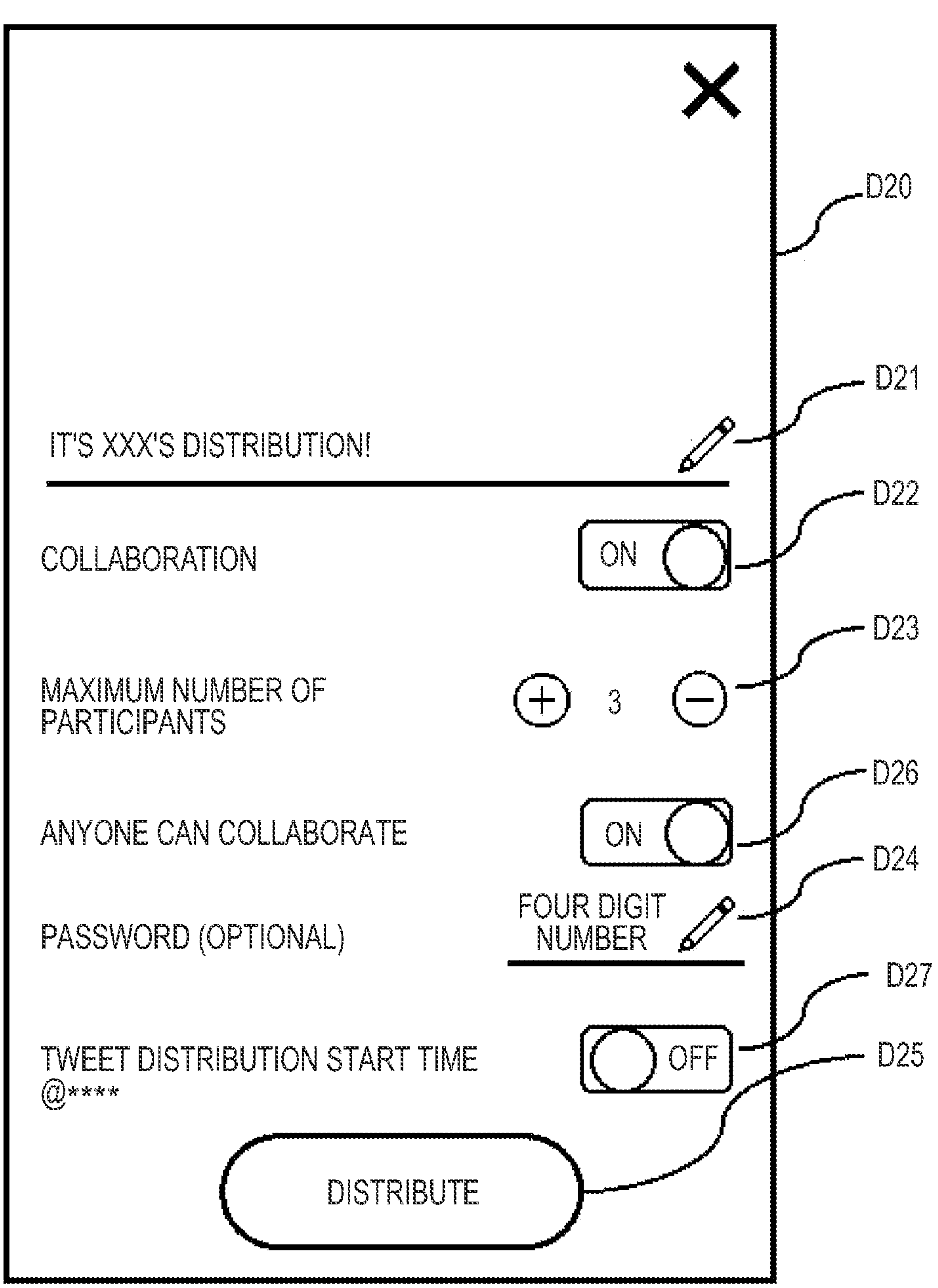
FIG. 7 is a conceptual diagram showing an image of a screen displayed on a user terminal.

As an example, when the distribution button D11 is selected, the screen displayed on the first user terminal 100 transitions from the avatar setting screen D10 shown in FIG. 6 to the distribution setting screen D20 shown in FIG. 7.

The distribution setting can include at least one of a setting related to the title of the first video, a setting regarding whether other users can appear in the first video, a setting related to the number of people who can appear in the first video, or a setting related to a password.

These distribution settings can be set in a title setting field D21, a collaboration possibility setting field D22, a number-of-people setting field D23, and a password setting field D24 in FIG. 7, respectively. Additionally, in FIG. 7, an anyone-can-collaborate possibility setting field D26 and an SNS posting possibility field D27 are further displayed.

The title of the first video can be freely determined by the distributing user within a range of a number of characters up to an allowable upper limit. If there is no input by the distributing user, a preset title, including the name of the character object (distributing user) such as "This is so and so's distribution P," may be determined automatically.

Whether other users can make a request for appearance in the first video can be freely determined by the first user. If yes, other users can make a request for appearance to the distributing user. If no, other users cannot make a request for appearance to the distributing user. A state in which another user appears in the video of the first user may be referred to as "collaboration" in this specification. Details of the collaboration will be described later.

The number of people who can appear in the first video can be set only when other users can appear in the first video mentioned above, and the distributing user can freely determine this number within a range of the number of people up to an allowable upper limit.

A password can be arbitrarily set only when other users can appear in the first video mentioned above, and the distributing user can freely determine the designated number of digits. When another user makes a request for appearance in the first video, entering of such a password is required. A configuration is acceptable in which the password setting field D24 may become active only when the anyone-can-collaborate possibility setting field D26 is OFF.

The distribution start portion distributes information about the first video to the viewing user terminal(s) 200 of the viewing user(s) based on the conditions set by the distribution setting portion.

The instruction to start such distribution is sent by selecting the distribution start button D25 shown in FIG. 7.

As an example, the distribution start portion distributes information about the video (first video) including the animation of the character object of the first user to the second user terminal 200 of the second user (avatar distribution).

Information about the first video includes, for example, motion information indicating movement of the character object, sound information of the first user, and gift object information indicating a gift sent from another viewing user. The gift object information includes at least gift object identification information that specifies the type of the gift object and position information that indicates the position where the gift object is to be displayed.

Then, the distribution start portion can live-distribute the video via the video distribution platform described above.

Figure 8:
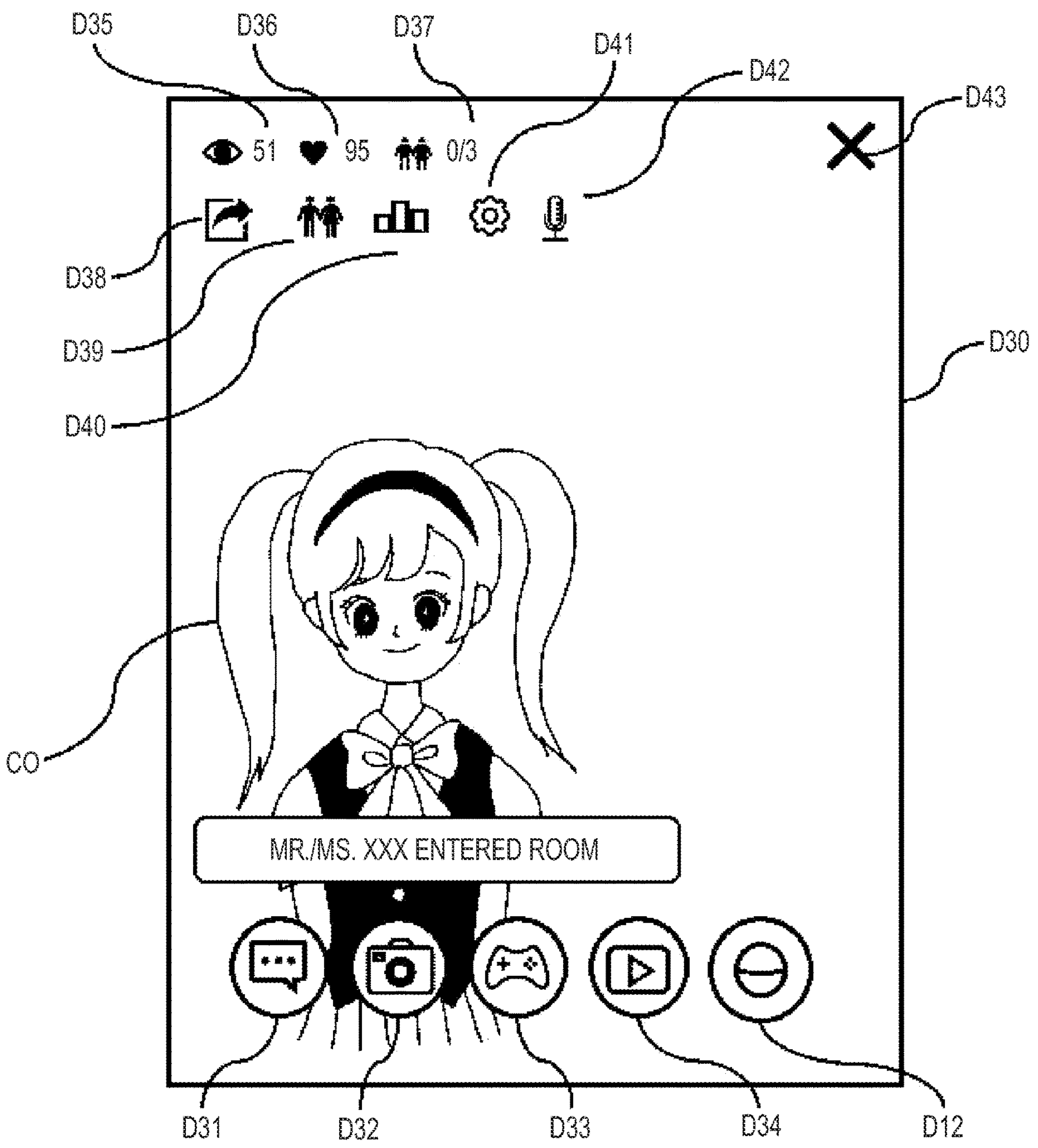
FIG. 8 is a conceptual diagram showing an image of a screen displayed on a user terminal.

FIG. 8 shows the avatar distribution screen D30 displayed on the first user terminal 100.

In addition to displaying the character object CO on the avatar distribution screen D30, a comment input button D31 for the distributing user to input a comment, a photo button D32 for saving a still image of the screen, a play start button D33 for playing a game described later, an external service liaison button D34 for viewing a video provided by an external service, and the gacha button D12 for obtaining an avatar part can be displayed.

Additionally, a cumulative number-of-viewers display D35, a cumulative number-of-likes display D36, a number-of-collaborators display D37, a share button D38 for an external SNS, a guest details button D39, a ranking display button D40, a setting button D41, and a sound switching button D42 for switching sound ON/OF can be displayed. Further, an end button D43 for ending the distribution is also displayed.

Although detailed description of these displays and buttons is omitted, it is possible to change the distribution settings set on the distribution setting screen D20 by selecting the setting button D41.

FIG. 8 shows an example of starting distribution in which the distribution setting screen D20 allows other users to appear in the first video, and the number of people who can appear in the first video is three. Therefore, the character object CO is displayed in a state of being closer to the lower left. This is a state in which up to three character objects of other users are able to appear in a vacant space.

The above is a description of the screen transition when the avatar distribution of this disclosure is performed.

Subsequently, a screen transition when the distributing user plays a game during distribution will be described.

The one or more computer processors in this disclosure may include a game request receiver, a game video distribution portion, and a game display processor.

The distributing user can request to start playing a game by selecting the play start button D33 during avatar distribution such as is shown in FIG. 8.

The game displayed by selecting the play start button D33 can be a dedicated game implemented in the application realized by the information processing system in this disclosure, and can be different from a general-purpose game provided by an external service. Therefore, the game distribution in this disclosure may be distinguished from the distribution of a general-purpose game play video provided by an external service together with a live broadcast of the distributing user.

Alternatively, the play start request may be sent from the first user terminal 100 to the information processing device 400 by selecting the play start button arranged on a predetermined screen displayed on the first user terminal 100 of the first user.

Figure 9:
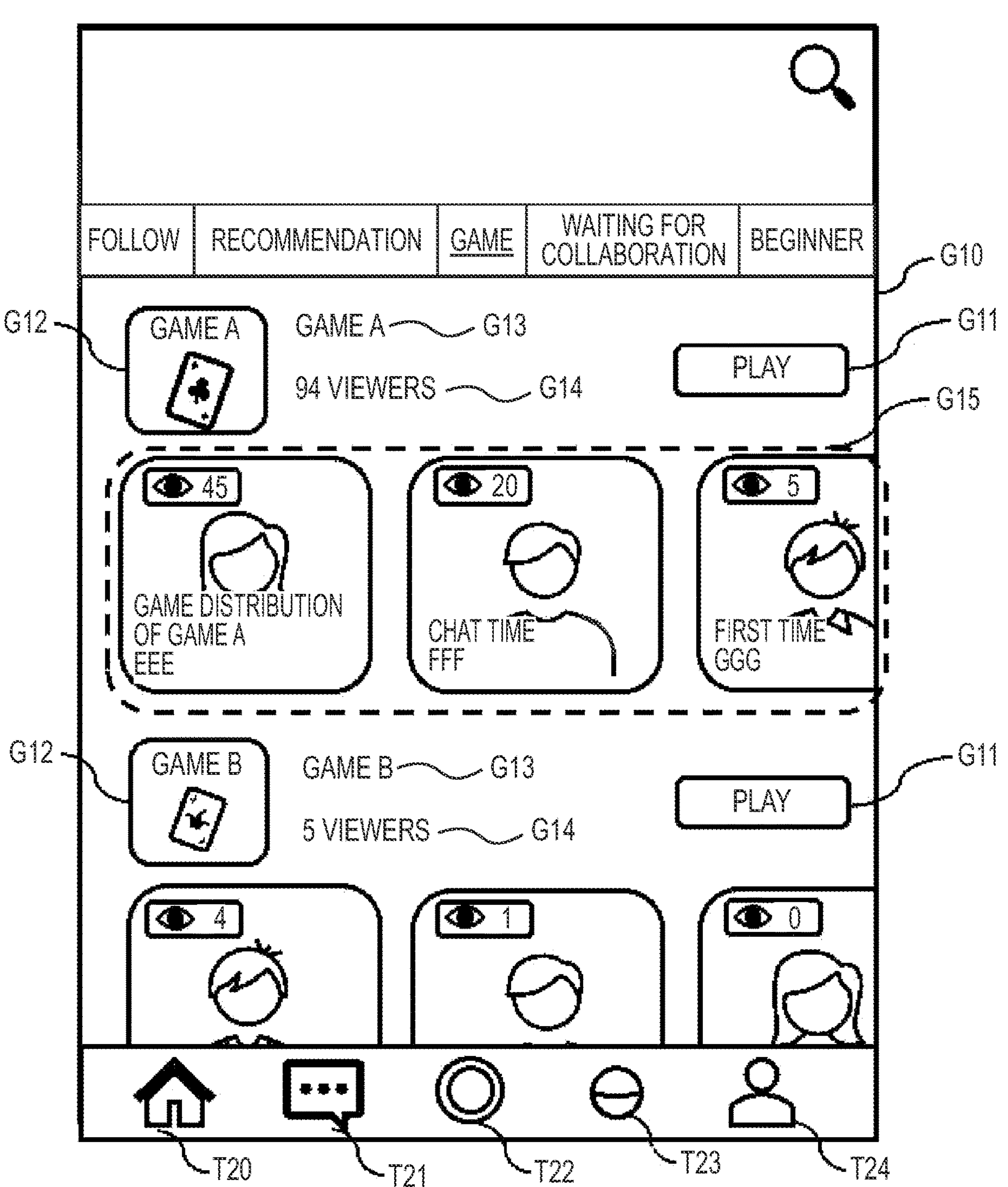
FIG. 9 is a conceptual diagram showing an image of a screen displayed on a user terminal.

FIG. 9 shows an example of a screen G10, in which a play start button G11 is arranged, as the predetermined screen. The screen G10 shown in FIG. 9 is a screen that has transitioned from the top screen T10 (FIG. 5) displayed on a user terminal that has started the application realized by the information processing system in this disclosure by selecting the game tab T15.

At least the play start button G11 that can send a request to start play of a predetermined game is displayed on the screen G10.

Then, when the game request receiver receives the request to start play of the predetermined game, the game video distribution portion distributes information about a second video to the second user terminal 200.

Here, the second video is a play video of a predetermined game. In this specification, distributing a video so that it is displayed on the screen of the second user terminal 200 is called "game distribution."

Further, as a first user, after starting the application realized by this disclosure, the user can send the request for the start of distribution of the second video to the information processing device 2400 by selecting a play start object arranged on the game list screen and the game detail screen.

The game list screen or the game details screen is a first screen to be described in detail below.

That is, the game display processor performs display processing of the first screen including (i) a distribution start object that can send a distribution start request, (ii) a play start object that can send a play start request for a predetermined game, and (iii) a thumbnail image of a video that is distributing a play video for a predetermined game.

The screen G10 shown in FIG. 9 corresponds to the game list screen of the first screen. The first screen, which is the game list screen, is a screen that has transitioned from the top screen T10 by selection of the game tab T15.

The first screen includes (i) the distribution preparation button T22 as a distribution start object, (ii) the play start button G11 as a play start object, and (iii) a thumbnail image showing a distribution channel of a video.

On the first screen, for each of a plurality of playable games, the play start button G11, a game icon G12, a game name G13, a total number-of-viewers G14 of the distribution channel of the game, and a distribution list G15 including thumbnail images of the distribution channels during the game distribution are displayed.

The order of the thumbnail images displayed in the distribution list G15 displayed here may be different depending on the viewing user. As an example, the thumbnail images are arranged in the order of (i) the order in which the number of viewing users following and the number of views by those viewing users are highest, (ii) the order in which the cumulative number of viewers is highest, and (iii) the order in which the distribution start is oldest. Additionally, the display range of the thumbnail images of the distribution list G15 can be changed by horizontal scrolling.

Additionally, the games displayed on this game list screen will read the top 10 titles with the following priorities. As an example, the priority is determined by (i) the order by newest date within 48 hours from the game distribution start date and time, and in which a viewing user last played within 30 days, (ii) the order of highest priority of a period ID, and (iii) the descending order of the period ID.

This distribution list G15 will be updated (i) when returning from the screen of another tab and (ii) when a refresh operation (Pull-to-Refresh) has been performed.

Figure 10:
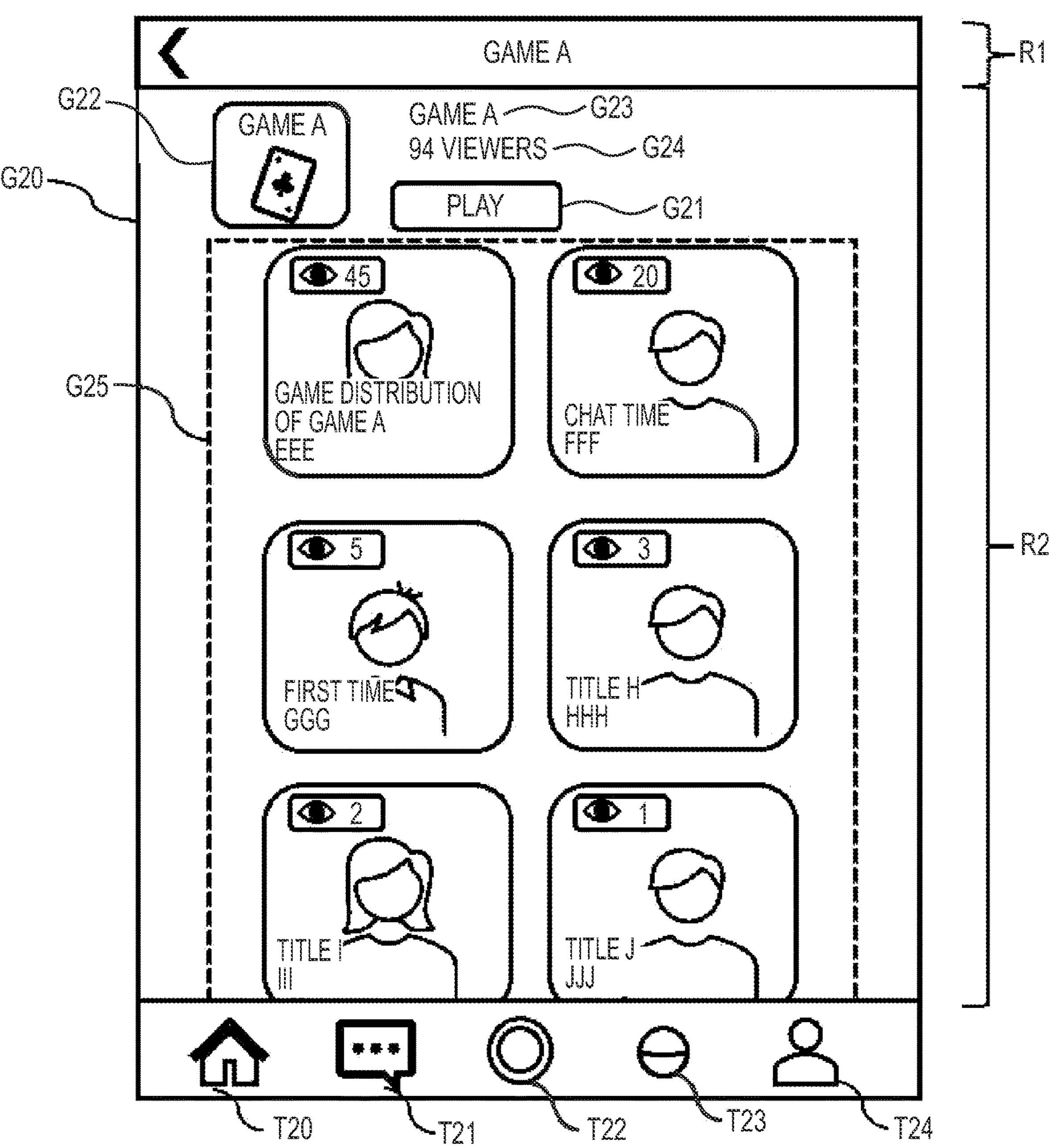
FIG. 10 is a conceptual diagram showing an image of a screen displayed on a user terminal.

FIG. 10 corresponds to a game detail screen of the first screen. The first screen, which is the game detail screen, is a screen that has been transitioned to by selecting a game icon G12 or a game name G13 displayed on the game list screen shown in FIG. 9, and is G20.

The first screen includes the distribution preparation button T22 which is a distribution start object, a play start button G21 which is a play start object, and thumbnail images showing video distribution channels.

Further, on the first screen, a game icon G22, a game name G23, a total number-of-viewers G24 of the distribution channel of the game, and a distribution list G25 including thumbnail images of the distribution channels that are distributing the game are displayed.

The order of the thumbnail images displayed in the distribution list G25 displayed here may be different depending on the viewing user. As an example, the order is arranged in the order of (i) the order in which the number of viewing users following and the number of views by the viewing users is highest, (ii) the order in which the cumulative number of viewers is highest, and (iii) the order in which the distribution start is oldest. Additionally, the display range of the thumbnail images of the distribution list G25 can be changed by vertical scrolling.

This distribution list G25 will be updated (i) when returning from the screen of another tab and (ii) when a refresh operation (Pull-to-Refresh) has been performed.

As described above, a user who selects the distribution start object or the play start object becomes a first user who makes the distribution start request or the play start request.

Further, a user who selects a thumbnail image becomes a second user who views the second video.

In addition, the first screen includes a first region in which a scrolling operation is not possible, and a second region in which a scrolling operation is possible.

The first screen referred to here is the first screen shown in FIG. 10. The first screen includes a first region R1 and a second region R2. Specifically, the game title is displayed in the first region R1, and the play start button G21, the game icon G22, the game name G23, the number of viewers G24, and the distribution list G25 described above are displayed in the second region R2.

The first region R1 is a portion in which a scrolling operation is not possible, and is fixedly displayed on the display screen, and the second region R2 is a portion in which a scrolling operation by the user is possible. By scrolling the second region R2, the user can check the thumbnail images hidden outside the screen.

However, since the play start button G21 may be hidden outside the screen by scrolling in the second region, the display processor in this disclosure can display a play start object (play start button G21) in the first region R1 according to a display state of a play start object (play start button G21) displayed in the second region R2.

Figure 11:
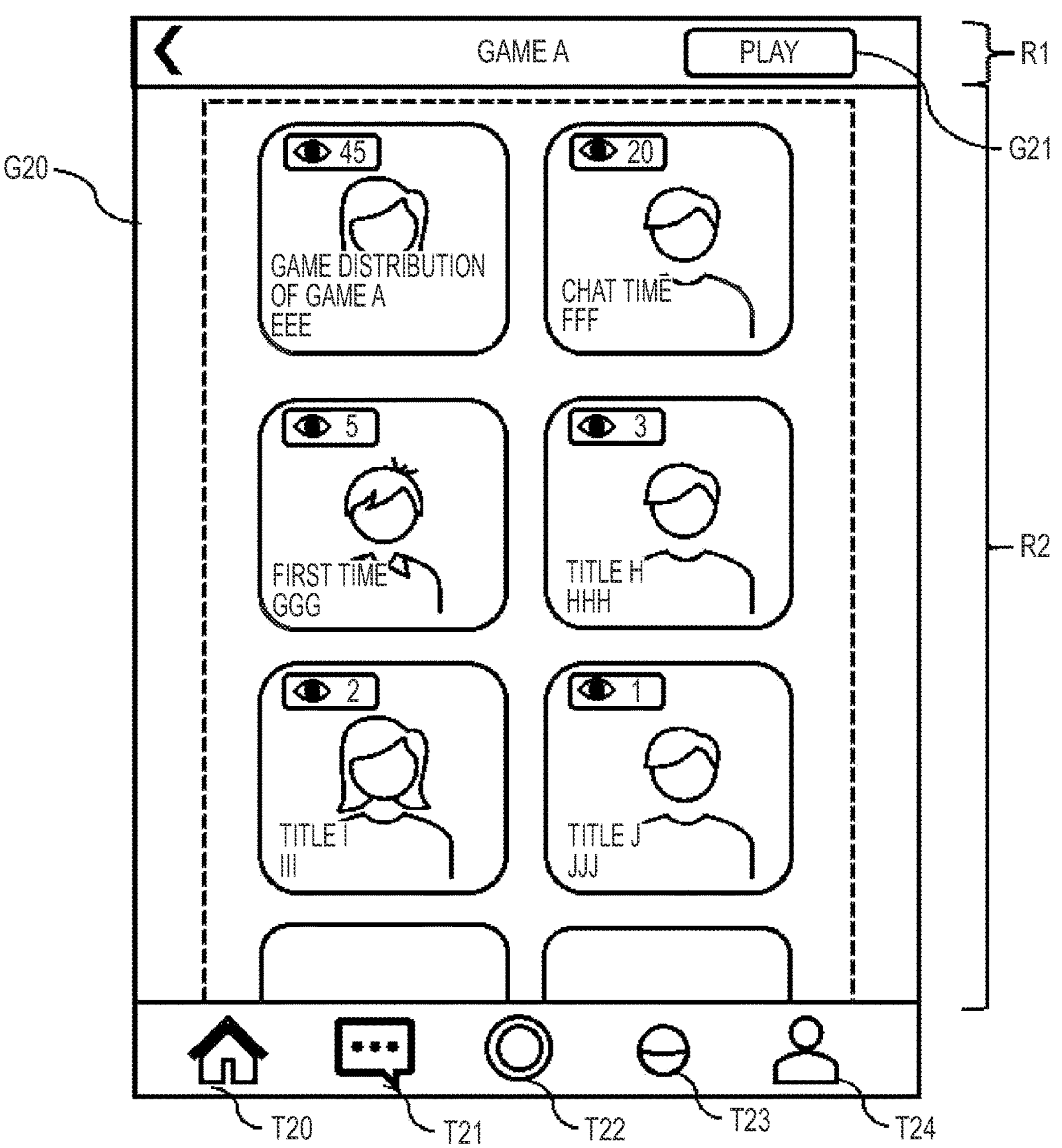
FIG. 11 is a conceptual diagram showing an image of a screen displayed on a user terminal.

As an example, in FIG. 10, the play start button G21 is displayed in the second region R2, but in FIG. 11, it is displayed in the first region R1. That is, when part or all of the play start button G21 is not displayed in the second region R2, the play start button G21 appears in the first region.

Further, the game display processor may display the play start object in the first region R1 in stages according to the display state of the play start object displayed in the second region R2.

Such an expression can be realized by changing the transparency of the play start object according to the scroll amount of the second region R2.

As an example, a scroll amount (unit is pixels) of 0 to 50 is caused to correspond to a button transparency of 0.0 (completely transparent) to 1.0 (completely opaque). Thus, in the initial display state, the object is completely transparent and cannot be seen, and when scrolling by 50 pixels or more has been performed, the object is completely displayed. During that scrolling (0 to 50), it is preferable to change the transparency of the object linearly. The unit of the scroll amount is a logical pixel, which may be different from an actual pixel of the display.

Further, the game request receiver can accept a play end request for a predetermined game from the first user terminal 100 after the game video distribution portion distributes information about the second video.

The play end request can be sent by selection of an end button arranged on the game screen.

Then, when the game request receiver receives the play end request of the predetermined game, the video distribution portion can end the distribution of the information about the second video and distribute the information about the first video.

That is, what is distributed here is not part of the information of the first video, but all the information of the first video.

Then, when the video distribution portion ends the distribution of the information about the second video and distributes the information about the first video, what is displayed on the second user terminal 200 is the first video.

The following is an explanation of a flow to start viewing the video.

The one or more processors in this disclosure may further include a viewing receiver.

The viewing receiver receives a video viewing request from a user.

The video distribution portion distributes video and sound information as video information to the user's information processing terminal in response to the viewing request.

Figure 12:
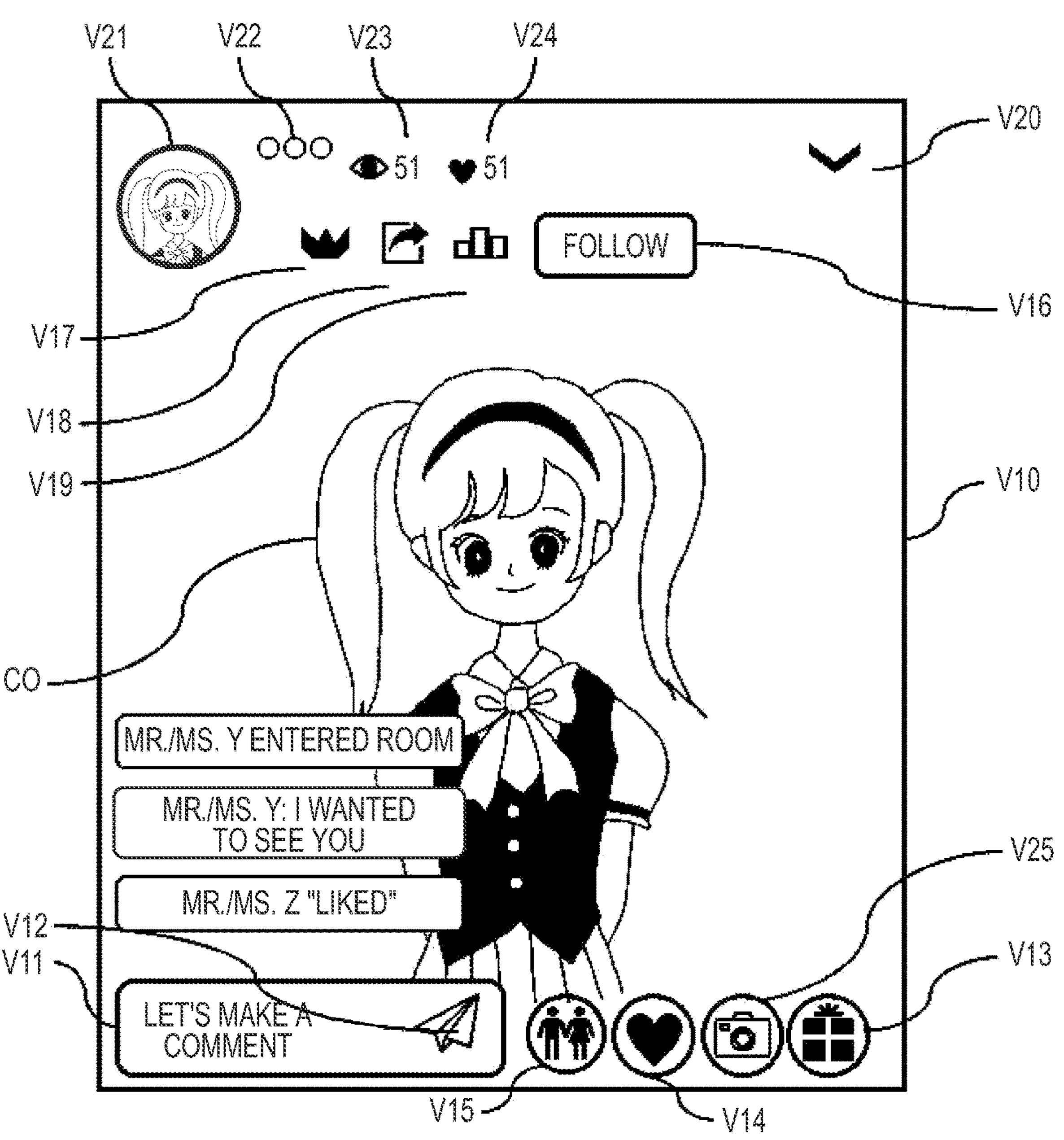
FIG. 12 is a conceptual diagram showing an image of a screen displayed on a user terminal.

FIG. 12 is an example showing a viewing screen V10 of an avatar video displayed on the second user terminal 200.

The viewing user can post a comment by inputting text in a comment posting field V11 and pressing a send button V12.

Further, by pressing a gift button V13, a gift list (screen V30 in FIG. 13) is displayed to the viewing user, and a display request for a gift designated by selection can be sent.

At this time, the one or more processors in this disclosure may include a determination portion. The determination portion determines whether there is a gift display request from the second user terminal 200.

The display request can include gift object information. The gift object information includes at least (i) gift object identification information that specifies the type of the gift object and (ii) position information that indicates the position where the gift object is to be displayed.

Figure 13:
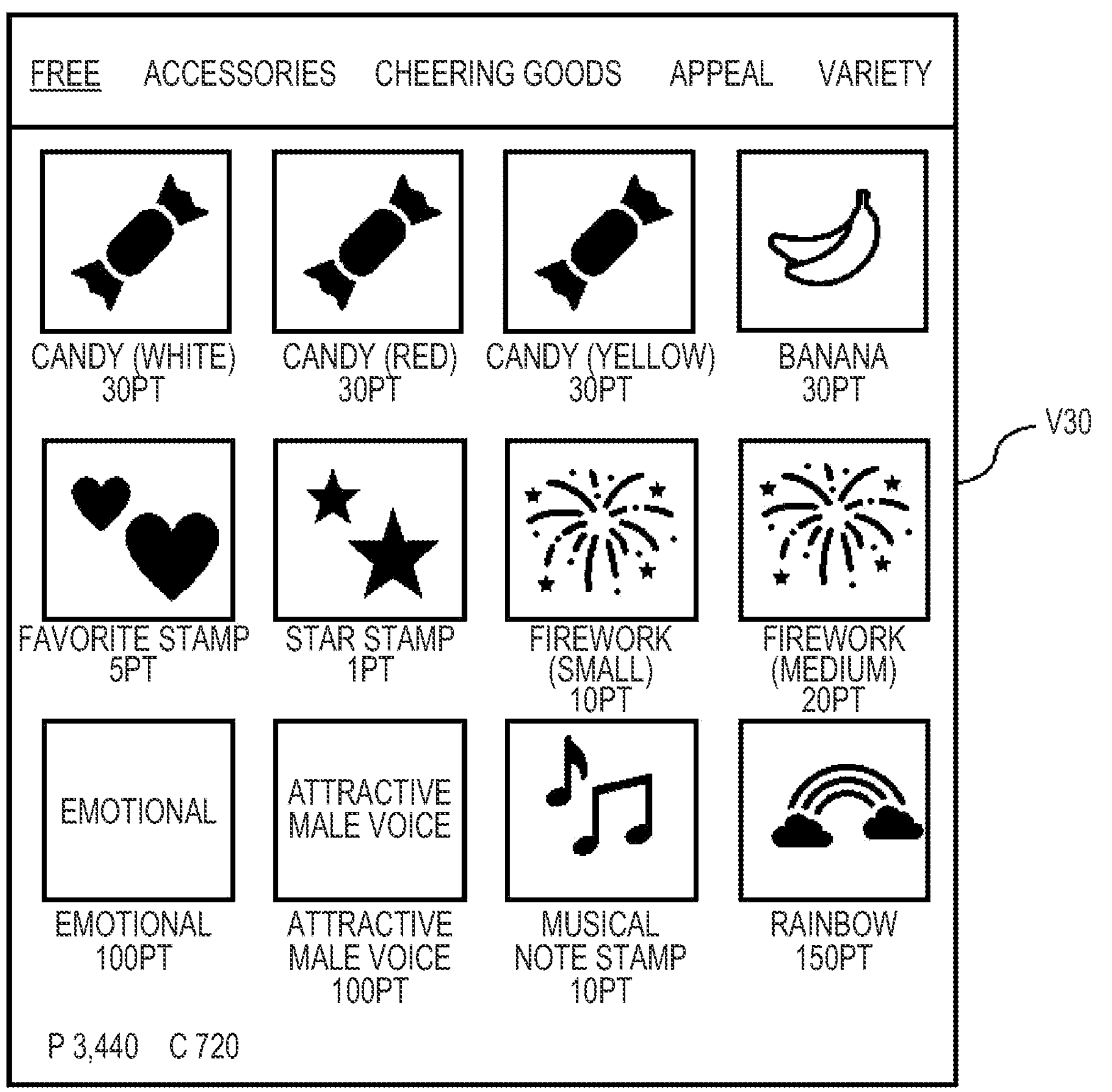
FIG. 13 is a conceptual diagram showing an image of a screen displayed on a user terminal.

Further, as shown in FIG. 13, gifts can be displayed separately for each category (free (paid) gifts, accessories, cheering goods, appeal, variety, or the like).

Here, a paid gift is a gift (coin gift) that can be purchased by the consumption of "My Coin" purchased by the viewing user. A free gift is a gift (point gift) that can be obtained with or without consumption of "My Points," which the viewing user has obtained for free.

The term "gift" used in this application means the same concept as the term "token." Therefore, it is also possible to replace the term "gift" with the term "token" to understand the technology described in this application.

Furthermore, the viewing user can post a rating showing favor by pressing a like button V14. In addition to/in place of the like button V14, it is also possible to display a button for posting a negative rating or other emotions.

An object may be displayed in the video in response to such evaluation posting. For example, when someone posts a positive review, an object can be displayed representing a heart or thumbs-up symbol.

In addition, when the first user has enabled other users' appearances in the distribution settings, a user can send a request to appear in the video by selecting a collaboration request button V15.

In addition, a follow button V16 for a second user to follow a distributing user is displayed on the screen of a video distributed by a first user whom the second user has not yet followed. This follow button functions as an unfollow button on the screen of a video distributed by a first user whom a second user is already following.

This "follow" may be performed from a second user to another second user, from a first user to a second user, and from a first user to another first user. However, this "follow" is managed as a one-way association, and a reverse association is managed separately as a "follower."

Additionally, a photo button V25 for saving a still image of the screen can also be displayed.

Further, a cheering ranking display button V17, a share button V18, and a ranking display button V19 are also displayed on the viewing screen V10.

The cheering ranking displays the ranking of a second user who cheers a first user, and the ranking can be calculated according to the amount of gifts (points/coins) or the like.

Additionally, regarding the sharing of videos, by pressing the share button V18, the second user can check a list of SNS (Social Networking Services) that can be shared, and can send a fixed link to a designated location of the SNS designated by selection.

Furthermore, by pressing the collaboration request button V15, it is possible to request collaborative distribution from a first user. Collaborative distribution means that the character object of a second user is caused to appear in a distributed video of the first user.

At the top of the viewing screen V10, a distributing user icon V21, a distributing user name (character object name) V22, a cumulative number-of-viewers display V23, and a cumulative number-of-likes display V24 can be displayed.

Further, when the viewing end button V20 is selected, a screen for ending viewing appears, and a viewing end request can be sent.

The screen for ending such viewing will be described in detail. Such a screen is called "small window sound distribution," and is for viewing a video in a manner of playing only the sound without displaying the image of the video.

The selection of the viewing end button V20 is received by the viewing receiver as a video viewing end request.

At this time, the video distribution portion ends the distribution of the image-related information in response to the viewing end request, but does not end the distribution of the sound-related information.

Thus, when the image- and sound-related information are distributed at the user terminal, the image is displayed on the main screen at the user terminal, and when only the sound information is distributed, the image is not displayed at the user terminal and a sub screen indicating that the video is being viewed is displayed.

Figure 14:
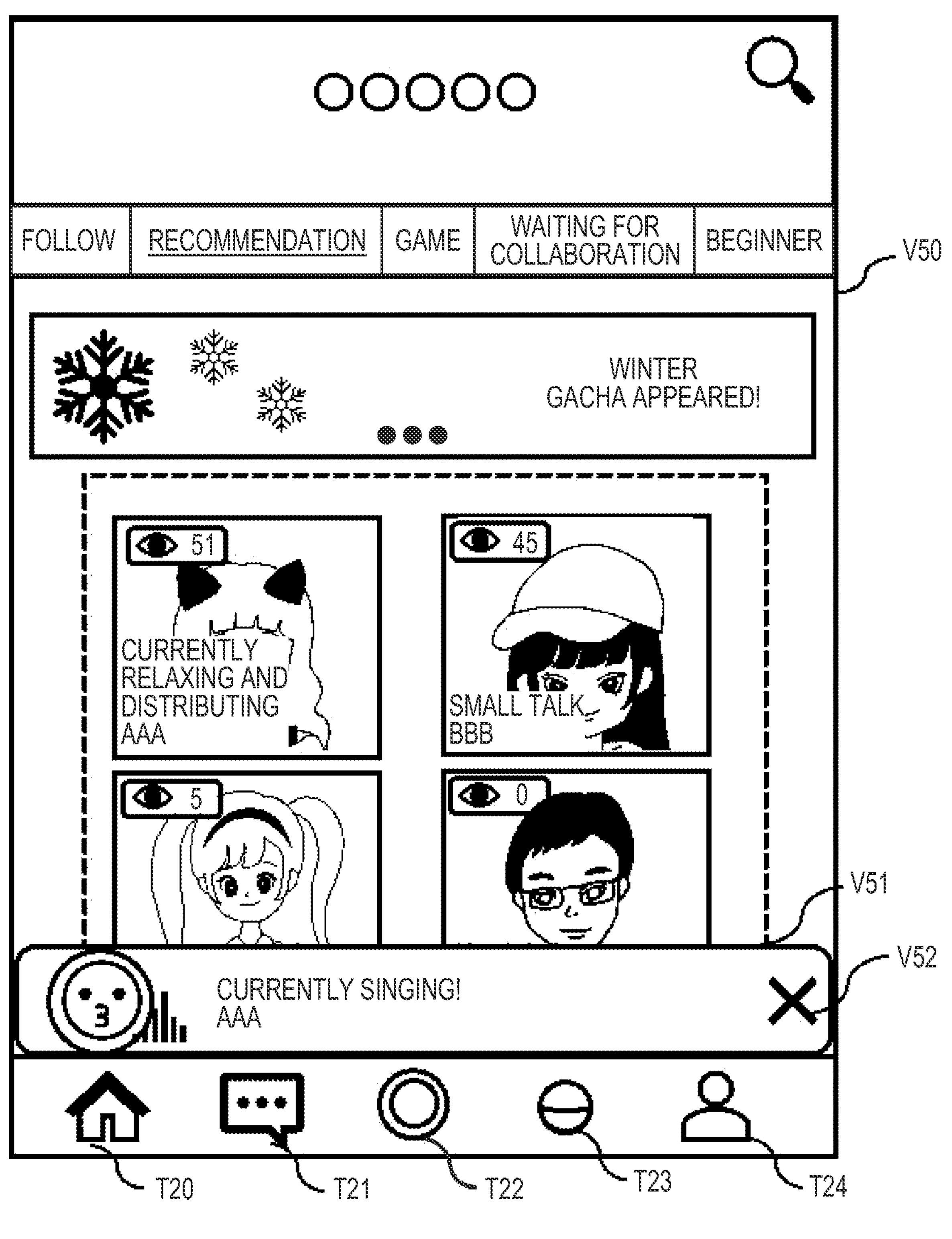
FIG. 14 is a conceptual diagram showing an image of a screen displayed on a user terminal.

FIG. 14 shows an image of a screen V50 on which a sub screen V51 is displayed.

When this sub screen V51 is displayed, the main screen displayed at the back transitions to the screen before viewing the video. For example, when moving from a recommendation tab to the viewing frame, the display returns to the recommendation tab, and when moving from the follow tab to the viewing frame, the display transitions to the follow tab.

When this sub screen V51 is being displayed, operation on the main screen becomes possible, and transition to another screen becomes possible.

On the sub screen V51, a profile image, a name, a title, and a sound icon that can visually identify that sound is playing are displayed.

Then, by selecting an end icon V52 displayed on the sub screen V51, the viewing can be completely ended.

Regarding the end of the display of the image, the information may be sent from the server device, but not displayed at the terminal side, or the transmission of the information itself from the server device may be stopped.

With such a configuration, it becomes possible to search for other distributions and enjoy chatting with other users while listening only to sound.

Next, a "collaboration" in which another user appears in the video of the first user will be described.

As described above, a second user can send a request to participate in the video via the confirmation screen of the collaborative distribution participation request, which is displayed by pressing the collaboration request button V15 shown in FIG. 12.

A collaboration avatar display portion provided to one or more computer processors in this disclosure causes a character object generated based on the movement of the viewing user who made the participation request to be displayed in the video, in response to the received participation request.

Figure 15:
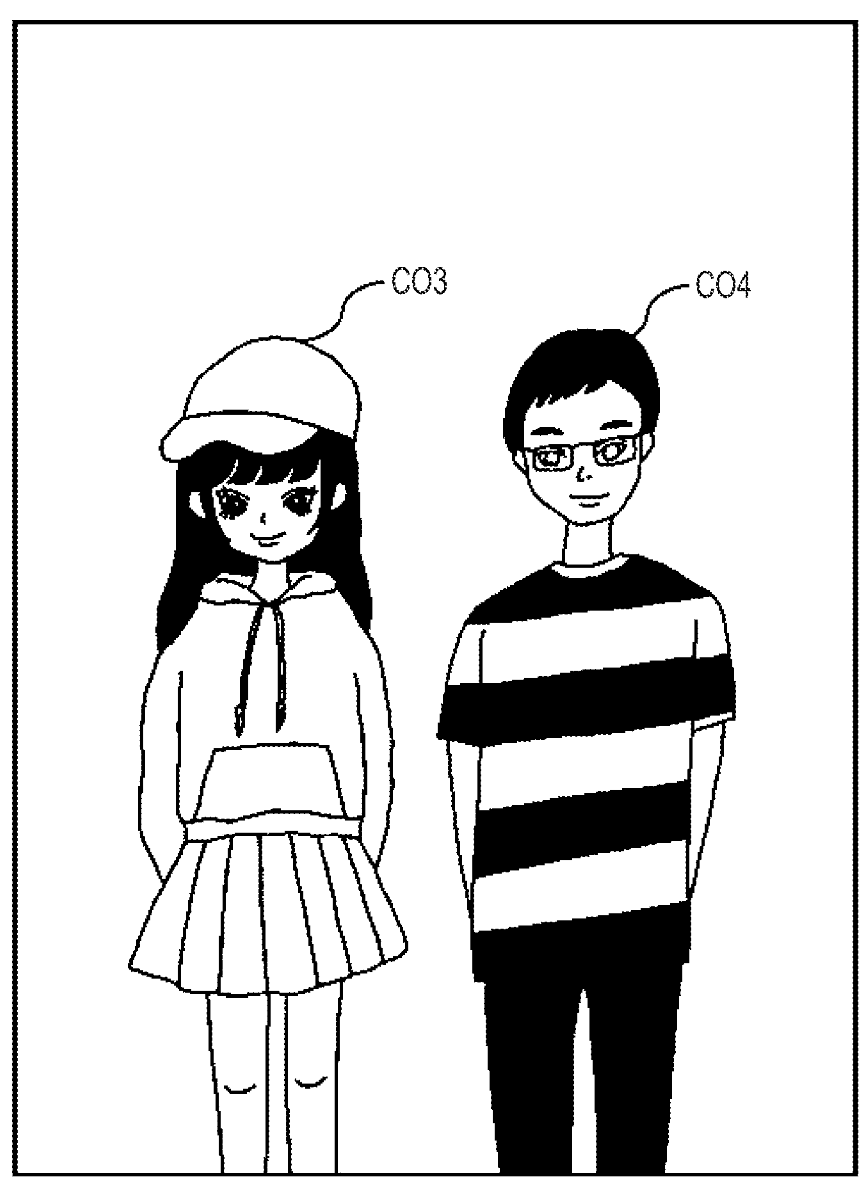
FIG. 15 is a conceptual diagram showing an image of a screen displayed on a user terminal.

FIG. 15 shows, as an example, a viewing or distribution screen when a second avatar CO4, which is a character object of a guest user, participates in a video in which a first avatar CO3, which is the character object of the host user, is displayed. In FIG. 15, the display of objects other than the avatars is omitted.

Figure 16:
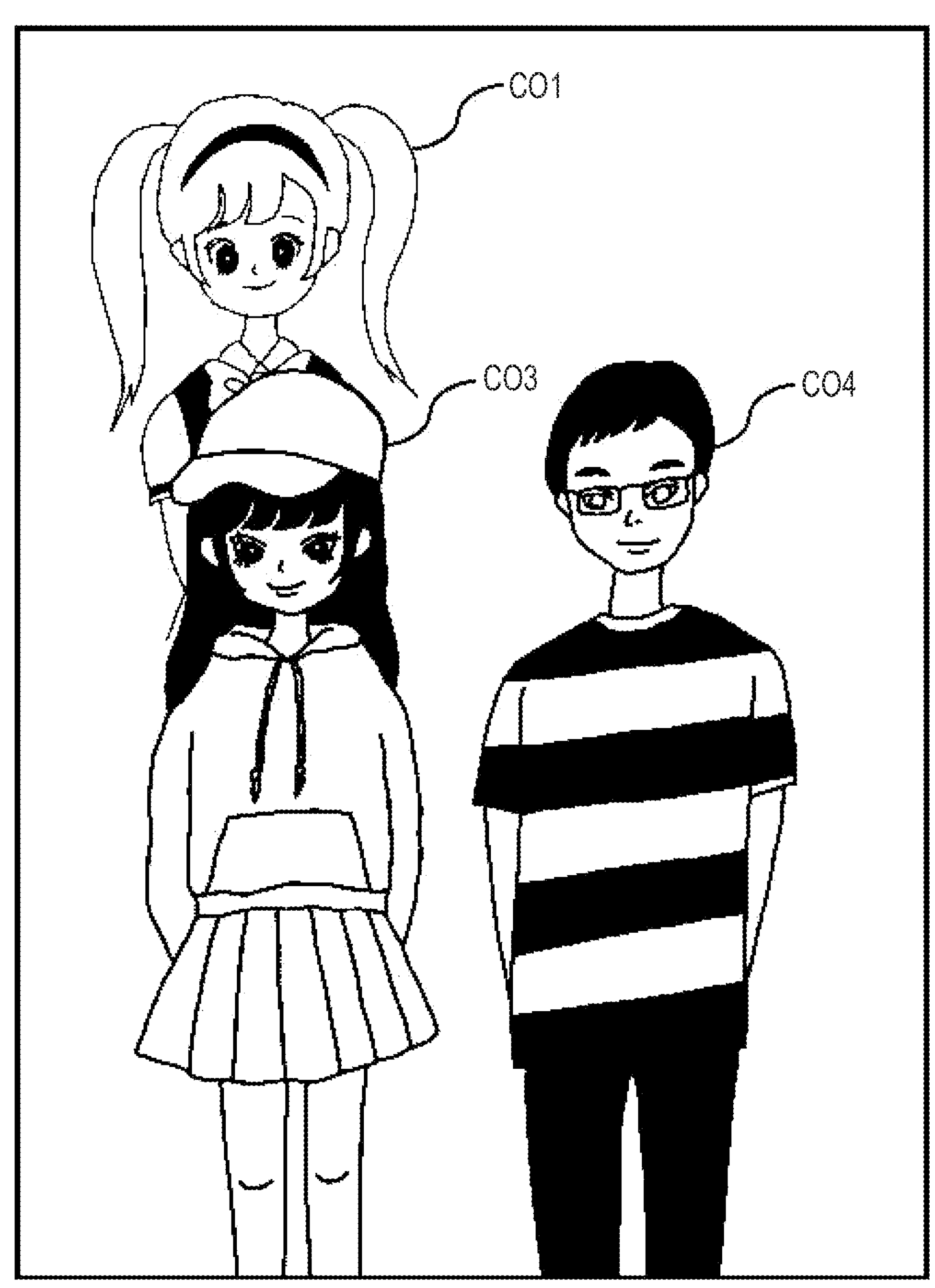
FIG. 16 is a conceptual diagram showing an image of a screen displayed on a user terminal.

Further, as shown in FIG. 16, a third avatar CO1, which is a character object generated based on the movement of another viewing user, may participate in the video. Additionally, although the third avatar CO1 is arranged behind the first avatar CO3 and the avatar CO4 in FIG. 16, the three people may be arranged so as to line up in a horizontal row. Further, the arrangement position of the avatars may be designated by the distributing user.

Figure 17:
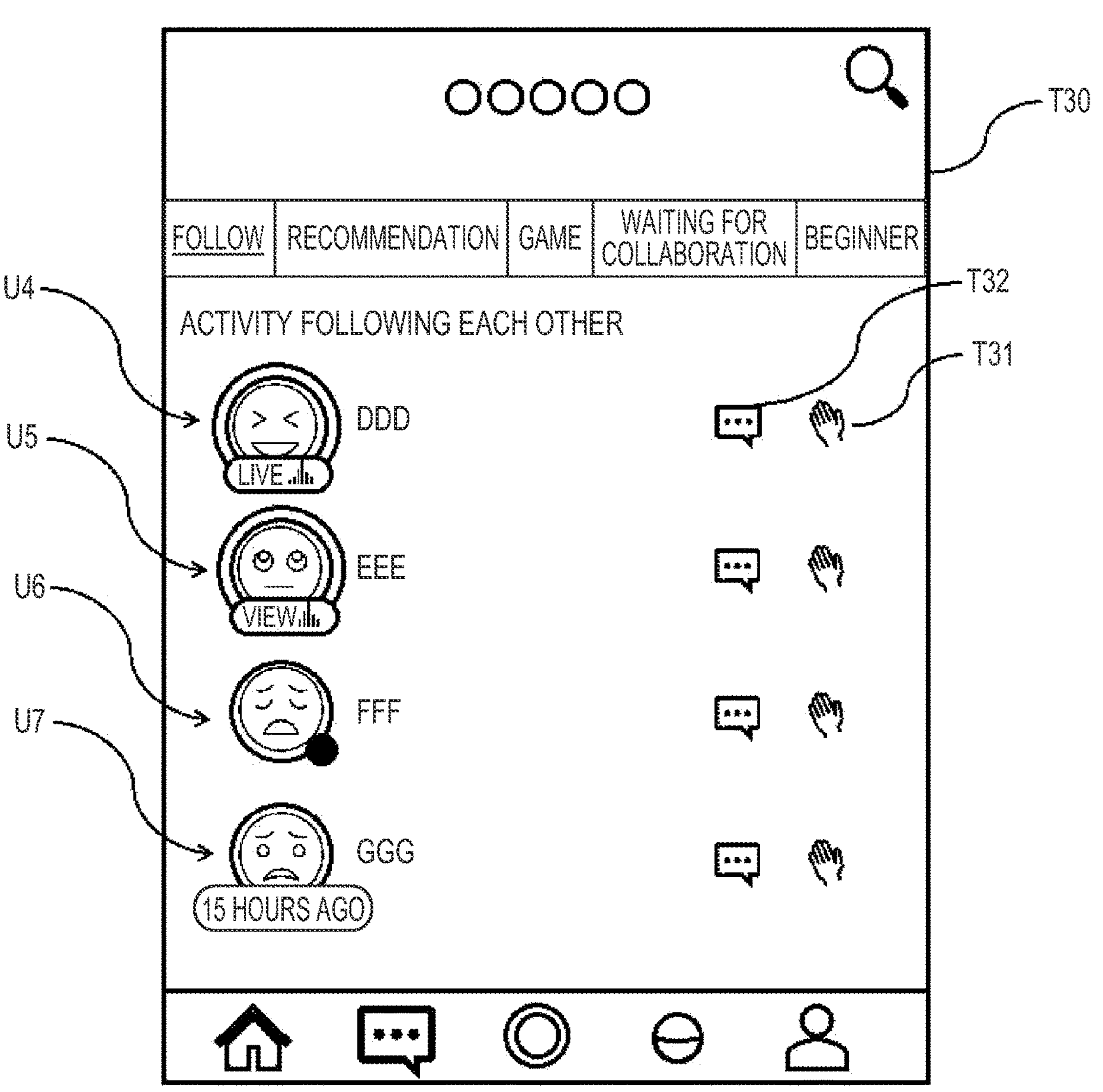
FIG. 17 is a conceptual diagram showing an image of a screen displayed on a user terminal.

FIG. 17 shows a list screen T30 of users having a mutual follow relationship, which is displayed by selection of the follow tab on the top screen shown in FIG. 5. Mutual follow is a relationship in which each is a follower of the other.

On the list screen T30, profile images and names of users who have a mutual follow relationship are displayed.

As shown in FIG. 17, a first object T31 is displayed on the list screen T30 for each of the users having a mutual follow relationship. Further, a chat object T32 may be displayed together with the first object T31. By selecting this chat object, it is possible to transition to an individual chat screen with a second user.

The first object T31 sends a predetermined notification to the terminal of the user associated with the first object T31.

The predetermined notification may be, for example, a call notification.

Nest, a detailed description of a flow for executing a video chat in an embodiment of this disclosure will be explained.

As an example, a user can execute a video chat from an individual chat screen or a group chat screen.

These chat screens can be transitioned to, for example, from a chat list screen C10 (FIG. 18) expanded by selecting the message button T21 on the top screen T10 (FIG. 5).

Figure 18:
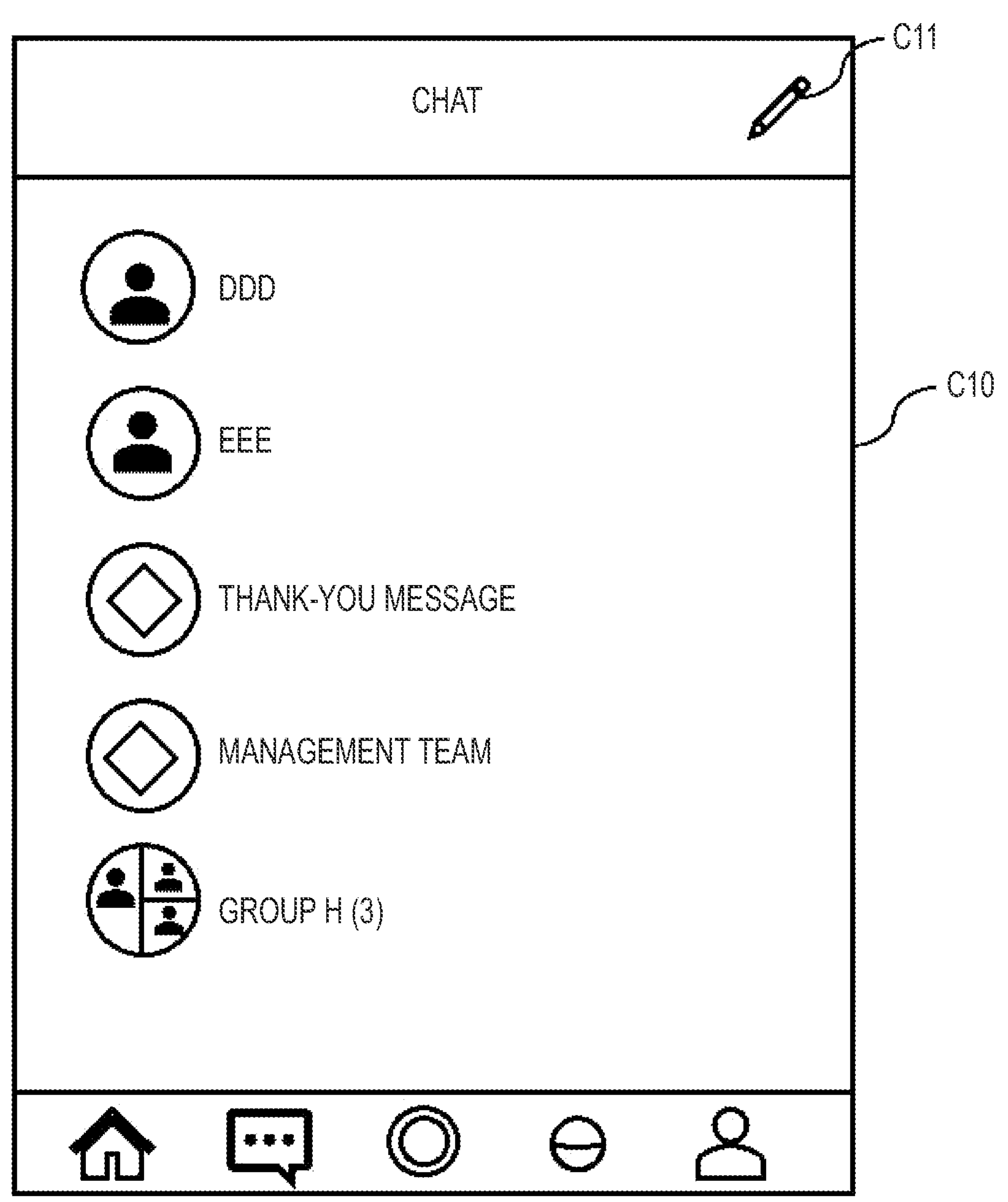
FIG. 18 is a conceptual diagram showing an image of a screen displayed on a user terminal.

The chat list screen C10 shown in FIG. 18 displays icons of users (character objects) or icons of groups that have sent or received messages (chats) in the past, along with their names or titles. The icons of groups can include icons of users (character objects) participating in the groups.

Figure 19:
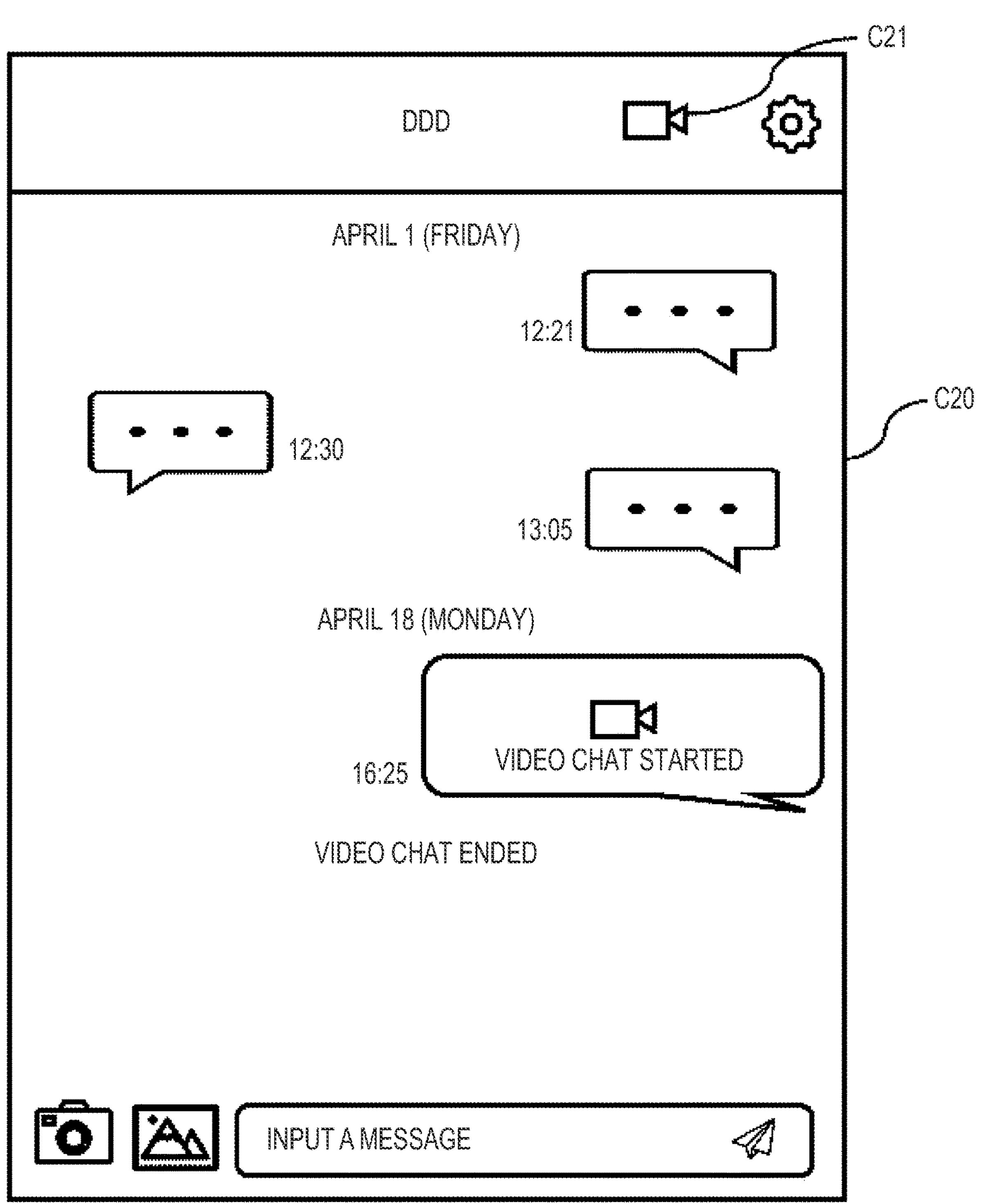
FIG. 19 is a conceptual diagram showing an image of a screen displayed on a user terminal.

The user can then select one user or group on the above-described chat list screen C10, open an individual chat screen C20 (FIG. 19) or a group chat screen, and select a video chat button C21 to start a video chat.

Figure 20:
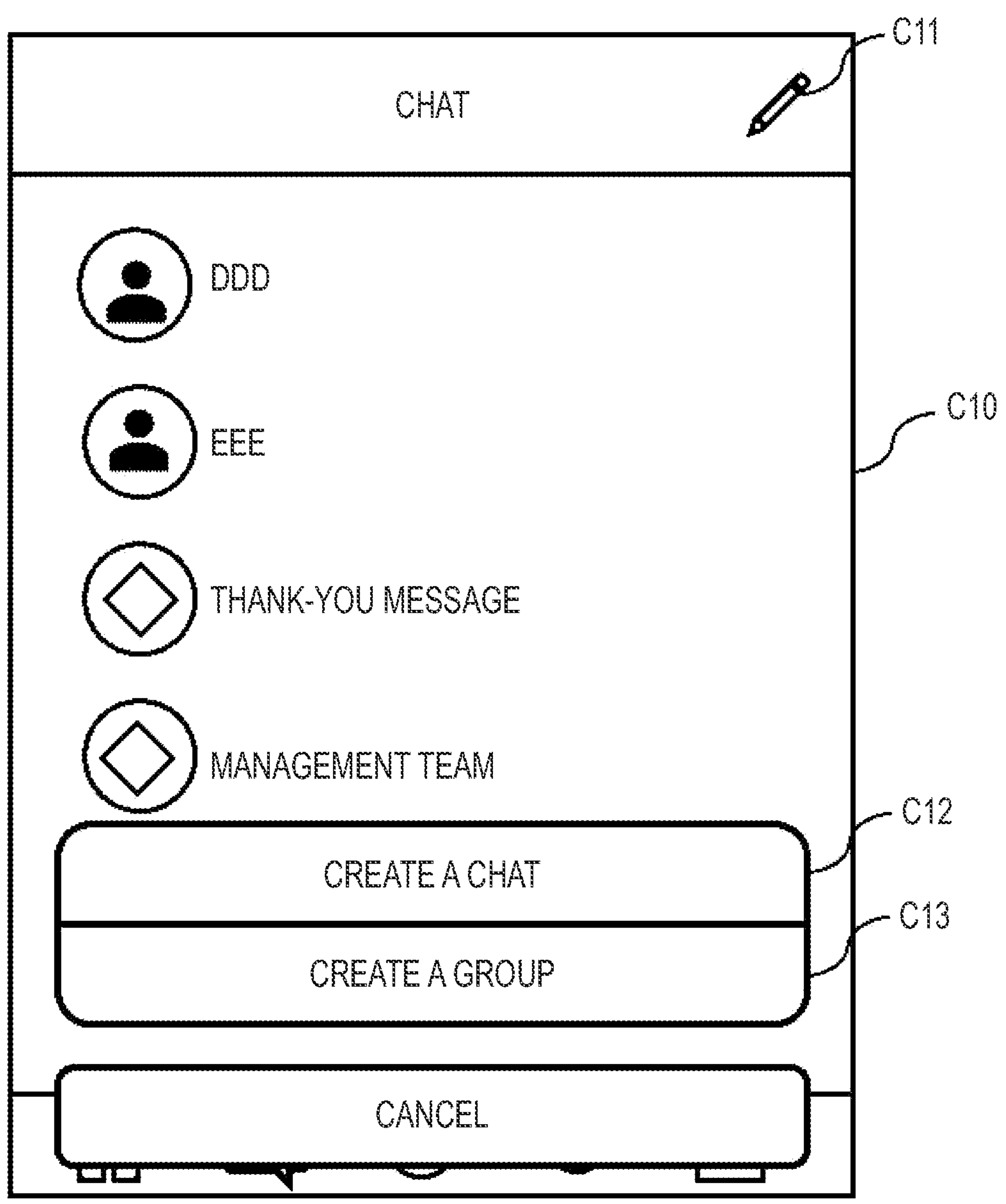
FIG. 20 is a conceptual diagram showing an image of a screen displayed on a user terminal.

Additionally, by selecting a chat creation button C12 or a group creation button C13 displayed by selecting an edit button C11 on the chat list screen C10 (FIG. 20), a chat screen of a user or group not displayed on the chat list screen C10 can be created.

Figure 21:
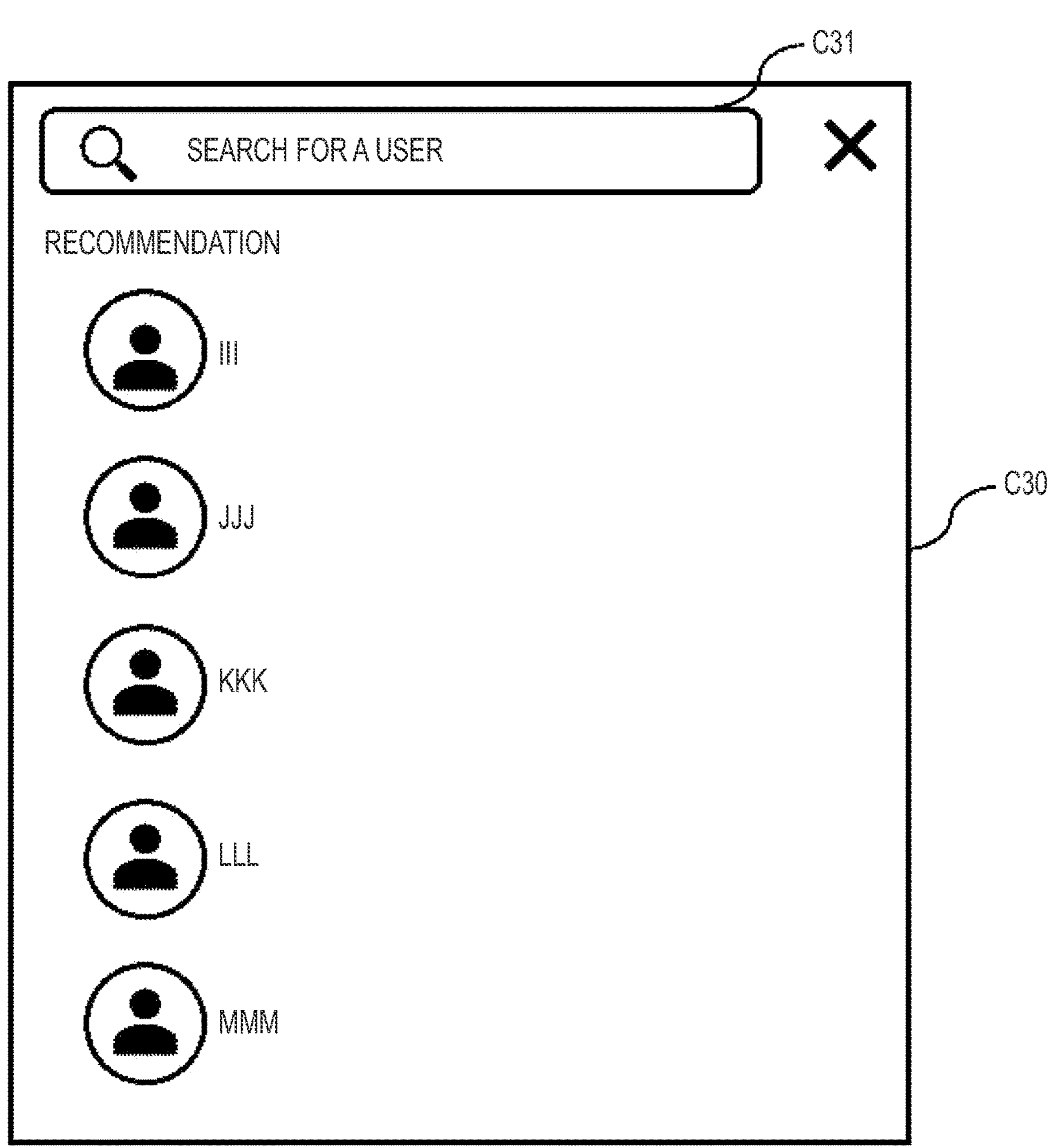
FIG. 21 is a conceptual diagram showing an image of a screen displayed on a user terminal.

FIG. 21 is a user selection screen C30 that deploys when the chat creation button C12 is selected, and a chat screen with a recommended user(s) that is being displayed or a user searched for using a search field C31 is displayed/generated. A configuration of the generated chat screen is the same as the chat screen C20 shown in FIG. 19, and video chatting can be started by selecting the video chat button C21.

Figure 22:
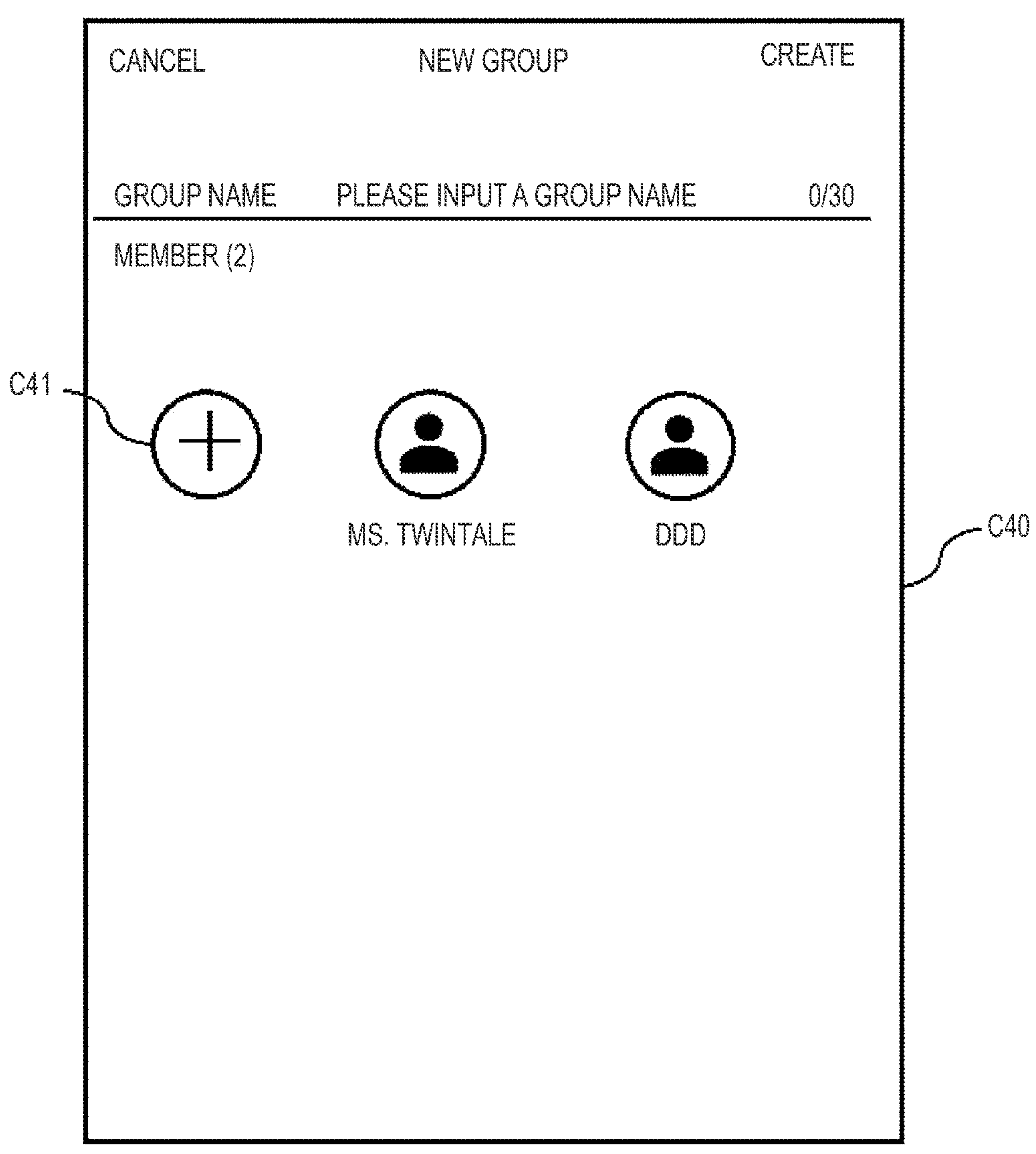
FIG. 22 is a conceptual diagram showing an image of a screen displayed on a user terminal.

Similarly, FIG. 22 shows a group creation screen C40 that deploys when the group creation button C13 is selected. The user can add users other than himself/herself as group members by selecting a user addition button C41. As an example, the number of group members that can be added is up to 7. A group name can also be set on this screen.

Figure 23:
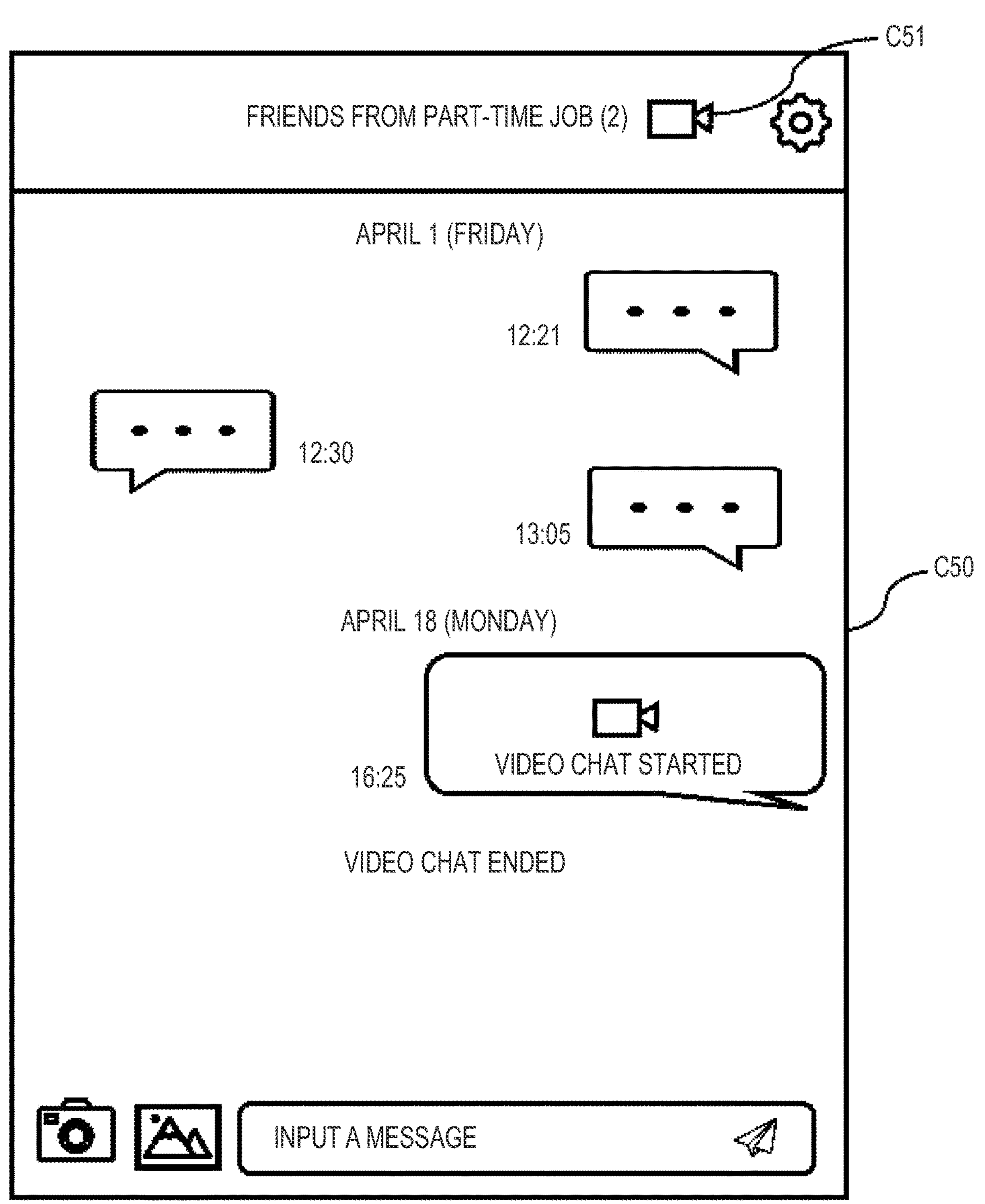
FIG. 23 is a conceptual diagram showing an image of a screen displayed on a user terminal.

Once a group is created, a group chat screen C50 is displayed (FIG. 23). In the group chat screen C50 as well, video chatting can be started by selecting a video chat button C51.

Furthermore, the above-described chat screen C20 can be transitioned to from the chat icon T32 of the follow list screen T30 (FIG. 17).

Also, a chat icon can also be arranged on a profile screen of another user, and the user can transition from various pages to a chat screen, and start a video chat.

When a video chat is started, a notification is sent to the other party, and the other party can participate in the video chat by responding to the notification. Users can set whether or not to receive such notifications.

Furthermore, the system may be configured to allow video chatting only with users who are in a mutual follow relationship. In this case, the system may be configured to display an icon on the follow list screen indicating that a user in a mutual follow relationship is in a video chat with another user, and a user may select the icon to participate in such an ongoing video chat.

The video chat in this disclosure can be said to be a function that allows only a specific user to view the collaborative distribution described above. The specific user here refers to a user participating in a video chat.

Next, an image of the spread of the virtual space in this disclosure will be described with reference to FIG. 24.

Figure 24:
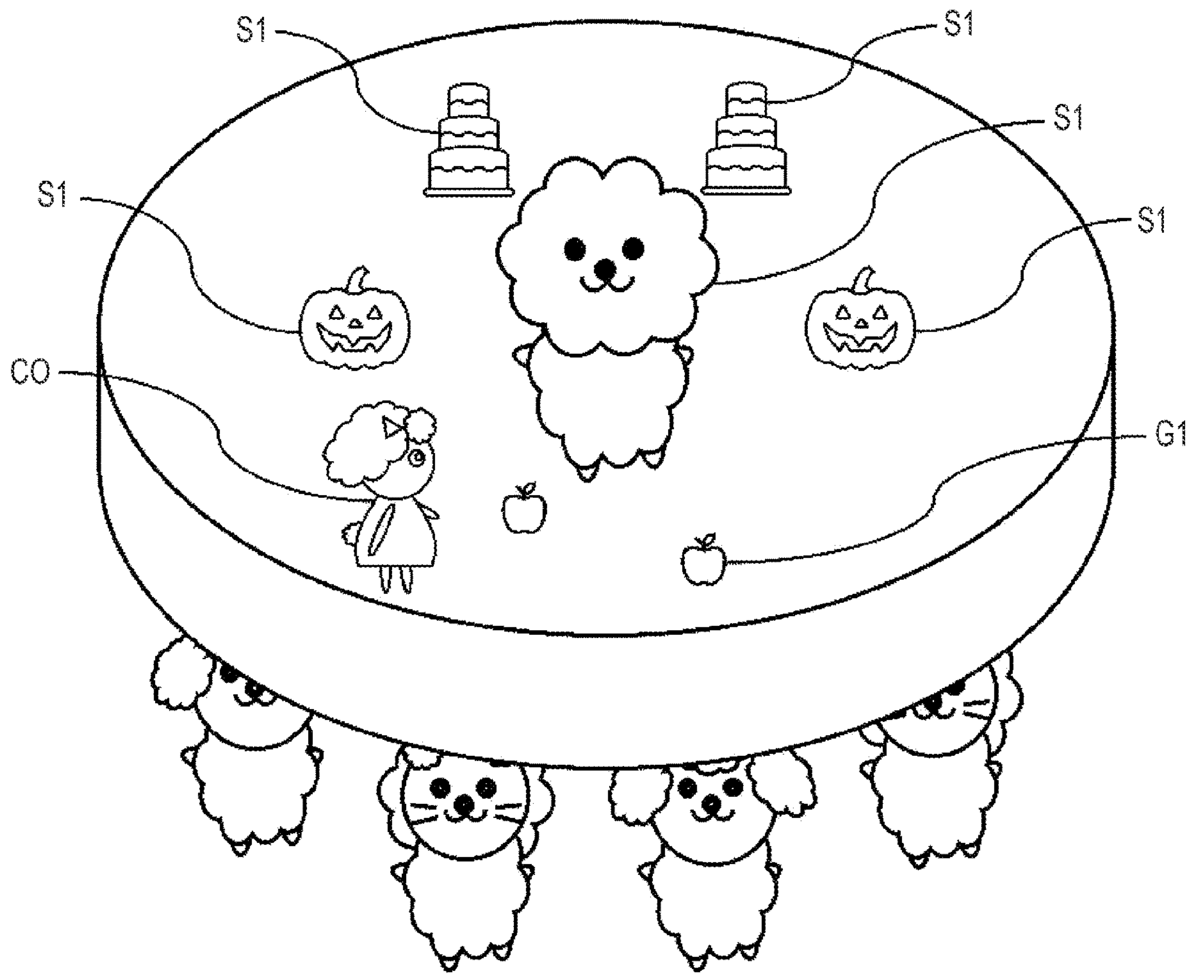
FIG. 24 is a conceptual diagram showing an image of a virtual space described in this disclosure.

As shown in FIG. 24 as an example, the virtual space in this embodiment is arranged such that a disk-shaped island (world) is floating in the air. This island is an object in the form of a tower-shaped cake turned upside down, and can be configured such that various objects are arranged on a disk-shaped ground. The island and the ground are shown as an example, and the display mode thereof is not particularly limited.

The objects that can be displayed include at least the character object CO of a first user, a gift object G1 corresponding to a gift for which a display request was made by a second user, and an object S1, the display position and display timing of which are controlled by the server device 400 (system side).

The character object can be caused to move, jump, and the like within the world by the user's operation, and such functions can be provided as one of the games described above, for example. In this disclosure, this is specifically referred to as "world distribution" and the procedures for starting and ending game distribution described above apply.

Specifically, switching from normal distribution (avatar distribution) to world distribution can be performed by selecting the play start button D33 of a game displayed in the avatar distribution video (FIG. 8) or by selecting the play button G11 or G21 of one game selected from the game list displayed on the destination screen to which the user has moved by selecting the play start button D33 (FIG. 9, FIG. 10).

Also, switching from world distribution to avatar distribution can be performed by selecting a play end button displayed in a world distribution video.

Next, various functions executable in the information processing system 3000 according to an embodiment of this disclosure will be described with reference to the drawings.

The information processing system 3000 according to an embodiment of this disclosure can be, for example, an information processing system that provides a virtual space in which the character object of the user can be displayed.

The virtual space is not particularly limited as long as the space is one that can display the user's character object.

Furthermore, the information processing system 3000 according to the embodiment of this disclosure includes a user terminal 100 (first user terminal 100) of a user and a server device 400.

Figure 25:
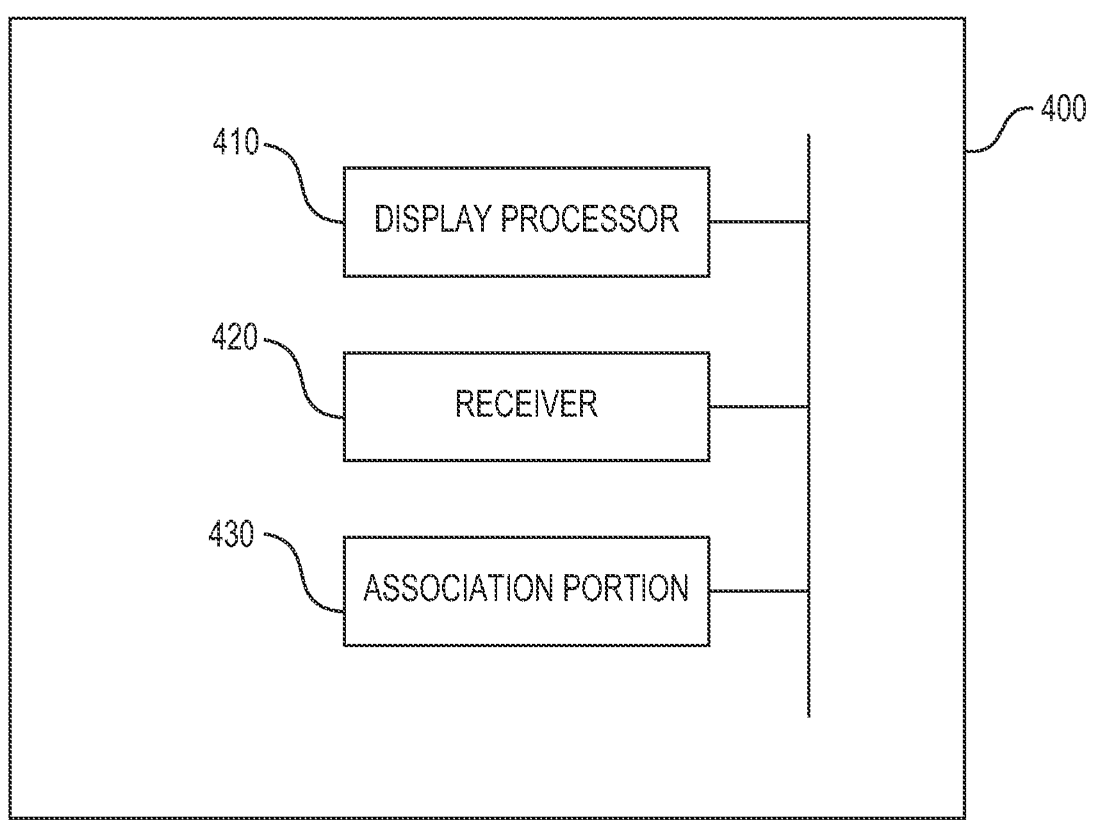
FIG. 25 is a configuration diagram showing an example of a functional configuration of a server device in this disclosure.

One or more computer processors included in the information processing system 3000 include a display processor 410, a receiver 420, and an association portion 430, as shown in FIG. 25 as an example.

The display processor 410 displays a display screen including a first screen that displays a character object of a user and a second screen that selectably displays one or more game media that can be attached to the character object.

Before explaining the details of this display screen, a flow up to the transition to the display screen will be explained.

Figure 26:
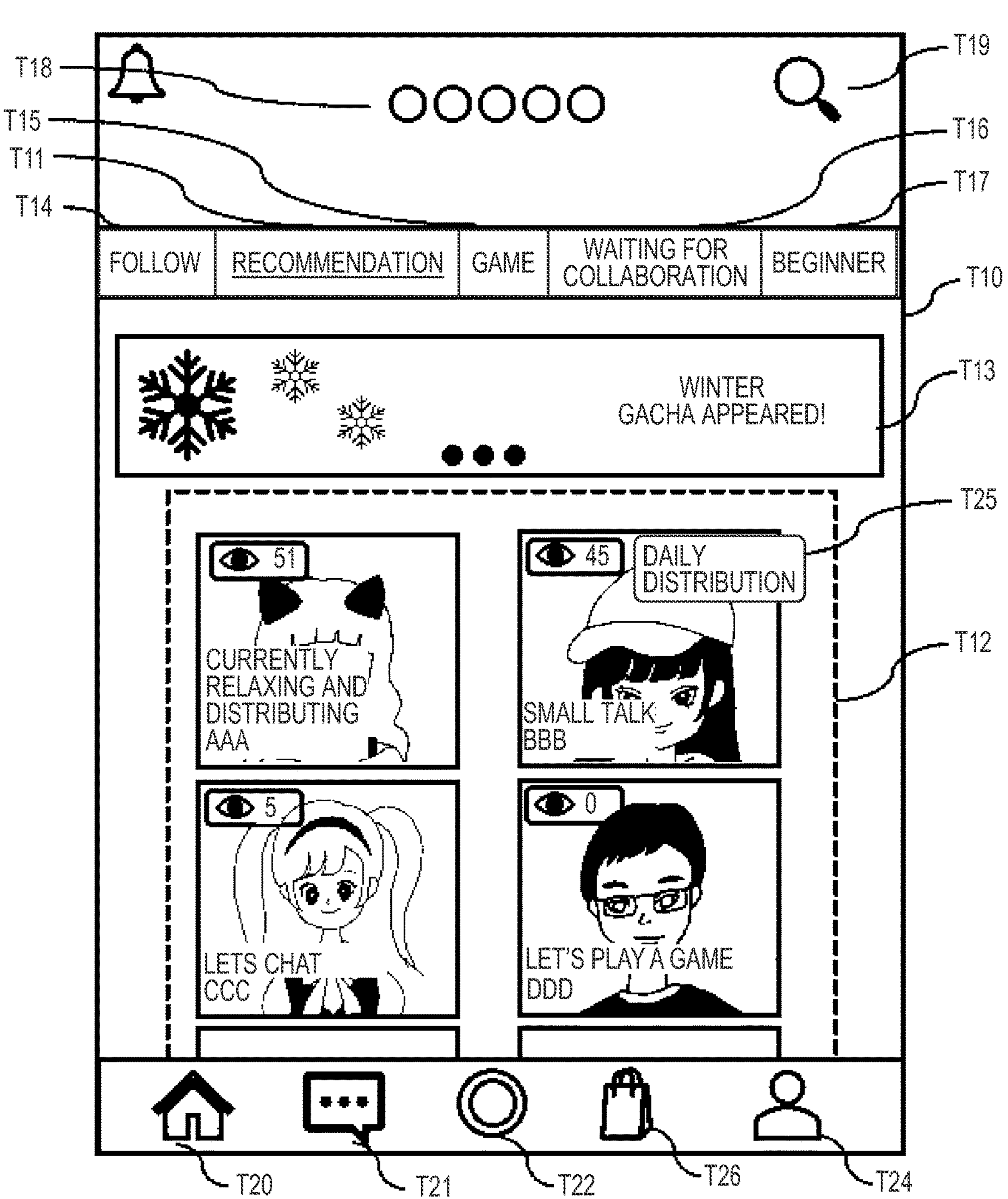
FIG. 26 is a conceptual diagram showing an image of a screen displayed on a user terminal.

As shown in FIG. 26 as an example, a shop button T26 is displayed on a top screen T10 displayed on the user terminal 100 when an application realized by the information processing system 3000 is started. This is an expansion of the function of the gacha button T23 displayed in FIG. 5.

Figure 27:
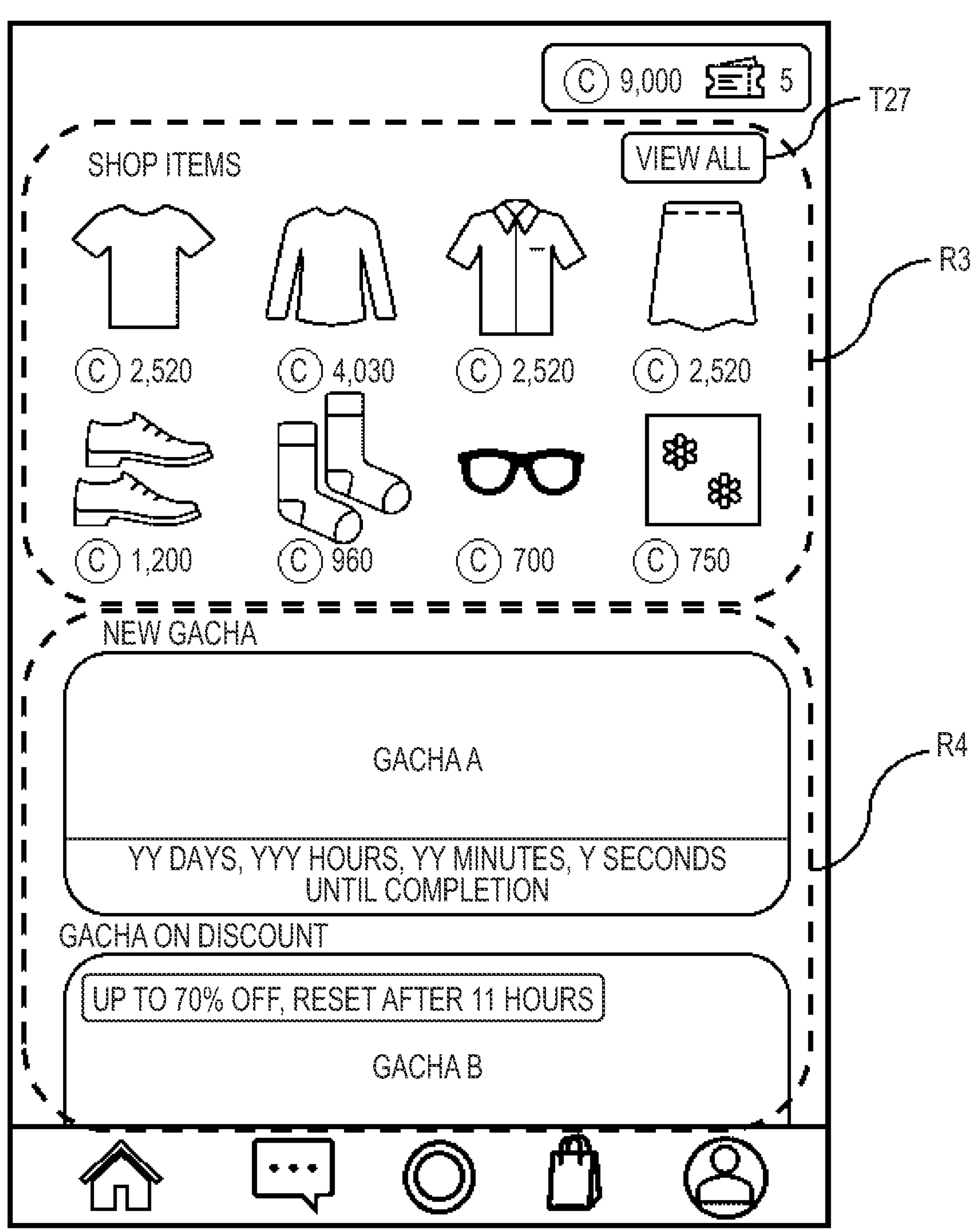
FIG. 27 is a conceptual diagram showing an image of a screen displayed on a user terminal.

Then, when the shop button T26 is selected by a user, the screen transitions to the screen shown as an example in FIG. 27.

The screen shown in FIG. 27 displays a shop column R3 in which some of the game media that the user can purchase at a shop are selectably displayed, and a gacha column R4 in which gachas that can be executed by a user are selectably displayed. When a gacha displayed in the gacha column R4 is selected, the screen will transition to a lottery screen for obtaining the above-mentioned avatar parts.

Furthermore, the game media that the user can purchase at a shop can also include the above-mentioned avatar parts.

Additionally, the screen shown in FIG. 27 displays specific game media associated with (e.g., held by) the user. The specific game media include coins, points, tickets, and the like. In the example shown in FIG. 27, the number of coins and gacha tickets held is displayed.

Figure 28:
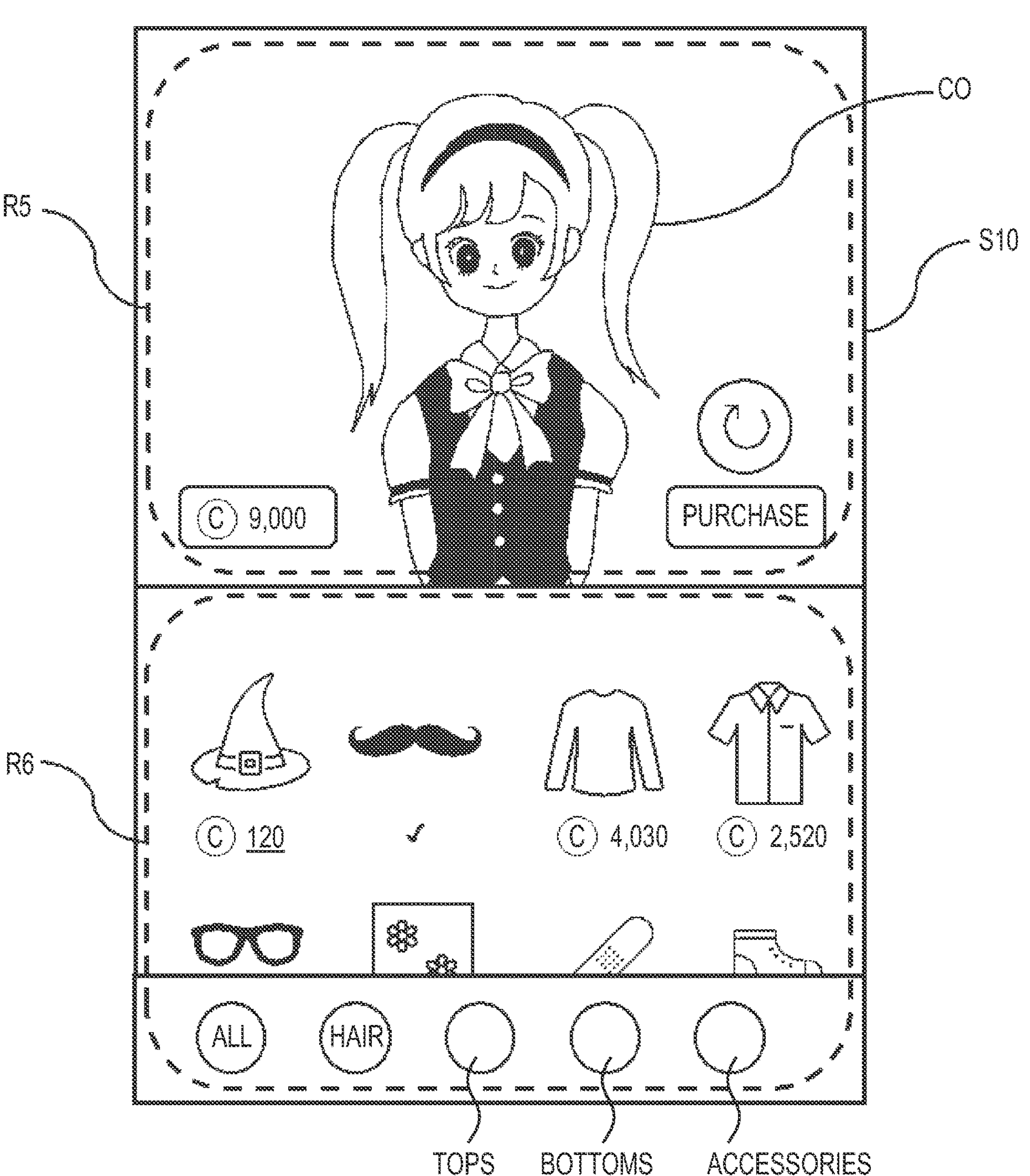
FIG. 28 is a conceptual diagram showing an image of a screen displayed on a user terminal.

Then, when the user selects object T27 in the shop column R3, or when the user selects an item displayed in the shop column R3, the screen transitions to a display screen S10 shown as an example in FIG. 28.

When the user selects the object T27 in the shop column R3, the user's character object CO displayed on the display screen S10 is displayed in a state of having attached thereto a game medium (or media) that has already been associated with the user and the character object CO.

On the other hand, if the user selects one game medium displayed in the shop column R3, the user's character object CO displayed on the display screen S10 is displayed in a state of having attached thereto the selected game medium. At this time, if there is already a game medium attached in a place to which the selected game medium should be attached, the association of the already attached game medium with the character object CO is canceled, and the selected game medium is newly associated and displayed. At this time, the selected game medium may not yet be associated with the user.

The display screen S10 shown in FIG. 28 includes a first screen R5 that displays the user's character object CO, and a second screen R6 that selectably displays one or more game media that can be attached to the character object CO.

Furthermore, a specific game medium associated with the user is displayed on the display screen S10. In an example shown in FIG. 28, the number of coins held is displayed.

On the second screen R6, one or more game media that can be attached to the character object CO can be displayed along with the number of specific game media required for purchase.

Additionally, among the game media displayed on the second screen R6, the game media that are the same as the game media already associated with the user are displayed in a different manner so that they can be distinguished from the game media not yet associated with the user.

For example, among the game media displayed on the second screen R6, the same game media as the game media already associated with the user can be made unselectable or non-displayed, or the number of specific game media required to purchase the game media can be made non-displayed. In the shown in FIG. 28, among the game media displayed on the second screen R6, the number of specific game media required to purchase the same game media as the game media already associated with the user is non-displayed, and instead a checkmark is attached indicating that it is already associated with the user.

The game media displayed on the second screen R6 can be classified and displayed by category. In the example shown in FIG. 28, buttons for switching the display of game media by category are displayed at the bottom of the second screen R6.

The receiver 420 receives a selection instruction of at least one game medium from among the one or more game media from the user terminal 100.

A selection instruction is given by the user selecting (for example, tapping or the like) a game medium displayed on the display screen S10.

If multiple game media to be attached to one part of a character object are selected, an alert or the like can be output to the effect that a second game medium cannot be attached. Alternatively, a configuration may be adopted in which multiple game media to be attached to one part of the character object cannot be selected. Specifically, a configuration can be adopted such that the second game medium can be made unselectable, or if the second game medium is selected, selection of a first game medium can be canceled and selection of the second game medium can be applied.

The association portion 430 consumes a predetermined number of specific game media associated with the user based on the selection instruction received by the receiver 420, and stores the game medium related to the selection instruction in association with the user and the character object.

Here, storing the game medium related to the selection instruction in association with the user means that the user owns the game medium, and storing the game medium related to the selection instruction in association with the character object means that the character object has the game medium attached thereto.

Additionally, the storage associated with the user of the game medium related to the selection instruction may be made permanent, and the storage associated with the character object of the game medium related to the selection instruction may be made temporary. As described hereafter, game media can be temporarily stored (tried on) in association with a character object before being associated with a user, and in this case, once the purchase of a game medium has been completed, it can be permanently associated with the user and stored (owned) while maintaining its association with the character object. At this time, the game medium that remains associated with the character object is not in a tried-on state but is in a properly attached state.

The character object associated with the game medium related to the selection instruction may be displayed on the first screen R5, or may be displayed on a purchase completion screen that is a separate screen.

Furthermore, as described hereafter, other steps are not excluded from occurring between the selection instruction and the consumption (purchase completion) of the specific game medium.

For example, after providing a selection instruction and before consuming a specific game medium, it is possible to include a step of displaying a list of the selected game media, a step of performing confirmation before purchase, and the like.

The above-described configuration provides a technical improvement that solves or alleviates at least part of the problem of the conventional technology described above.

Specifically, by storing a purchased game medium in association with not only a user but also a character object, the steps from the user using a shop to distributing a video can be reduced, allowing for smooth starting of the video distribution and the like.

By suppressing delays in the start of distribution, and by suppressing shortening of distribution time due to a decline in users' desire to distribute, it is possible to maintain or improve the quality of video content.

As an alternative, the association portion 430 may consume a predetermined number of specific game media associated with the user based on the selection instruction received by the receiver 420, and store the game medium related to the selection instruction in association with only the user.

If the game medium related to the selection instruction is stored in association with the user, but the game medium related to the selection instruction is not stored in association with the character object, this is a condition in which the purchased game medium is not attached to the character object.

In this case, the above-mentioned problem can be solved by combining with various configurations described hereafter.

Next, steps will be explained that can be added between the above-mentioned selection instruction and the consumption of a specific game medium.

When the receiver 420 receives a selection instruction, the display processor 410 can further display, on the display screen, a first object for receiving a display instruction of a third screen that is displayed to enable cancellation of the selection of the game medium related to the selection instruction.

Figure 29:
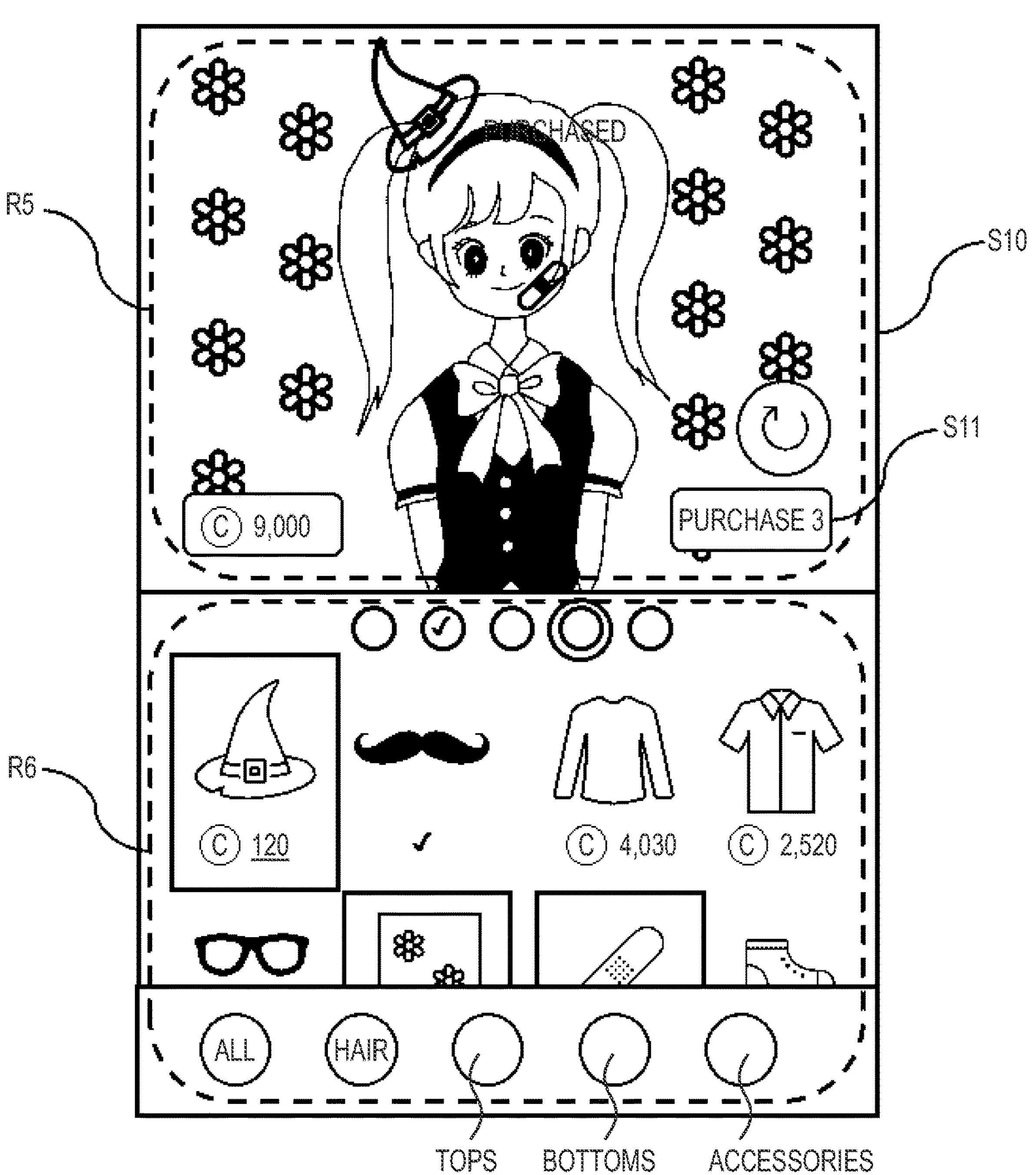
FIG. 29 is a conceptual diagram showing an image of a screen displayed on a user terminal.

FIG. 28 is an example showing the display screen S10 in a state in which the user has not yet selected a game medium, and FIG. 29 is an example showing the display screen S10 in a state in which the user is selecting three game media.

In FIG. 29, the game media related to the selection instructions can be displayed in a different manner so that they can be distinguished from unselected game media. In the example shown in FIG. 29, the game media related to the selection instructions are displayed surrounded by a frame, but it is not limited to this format.

Then, on the display screen S10 shown in FIG. 29, a first object S11 is displayed to be selectable. The first object may also be displayed on the display screen S10 shown in FIG. 28, but in that case, the first object will be displayed in an unselectable state.

Furthermore, as shown in FIG. 29, the number of game media related to the selection instructions can also be displayed in the first object S11.

Then, when the first object S11 is selected by the user, a display instruction of the third screen is provided.

Figure 30:
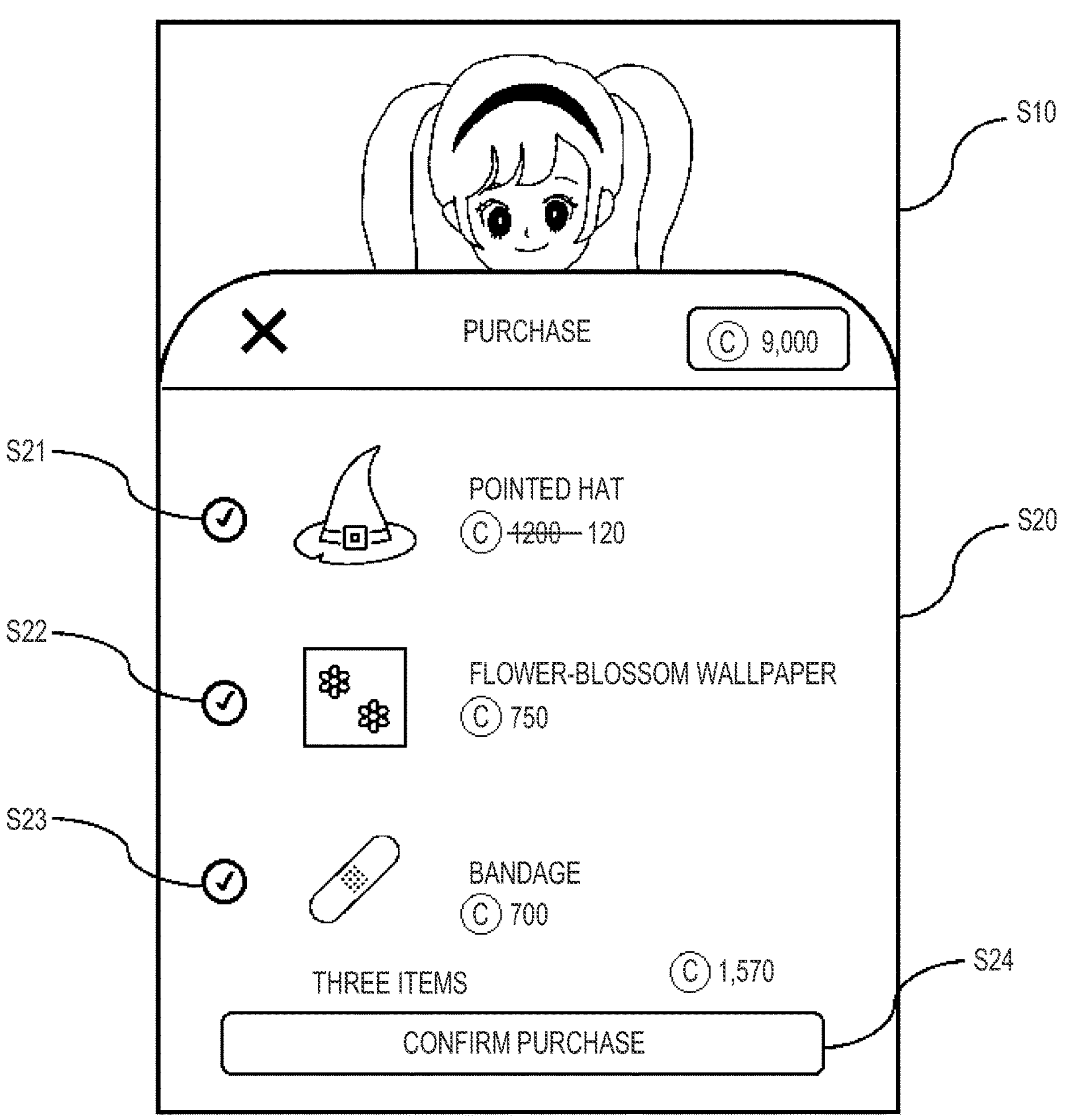
FIG. 30 is a conceptual diagram showing an image of a screen displayed on a user terminal.

FIG. 30 shows an example of such third screen S20. The third screen S20 may be displayed instead of the display screen S10 or the second screen R6, or it may be displayed superimposed on the display screen S10 or the second screen R6.

As shown in FIG. 30, the third screen S20 is displayed to enable cancellation of the selection of the game medium related to the selection instructions. On the third screen S20, selection cancellation buttons for cancellation of selections are displayed in association with the game media related to the selection instructions.

In the example shown in FIG. 30, three selection cancellation buttons S21, S22, and S23 are displayed in association with each object representing the game media related to the three selection instructions. In the example shown in FIG. 30, the three selection cancellation buttons S21, S22, and S23 are in a selected state, whereas in the example shown in FIG. 31, only the second selection cancellation button S22 is in a canceled state. In the example shown in FIG. 32, all three selection cancellation buttons S21, S22, and S23 are in a canceled state.

The user can switch between the selected state and the canceled state by selecting (tapping or the like) the selection cancellation buttons.

Furthermore, as described hereafter, the character object displayed on the first screen R5 is displayed with a game medium related to a selection instruction attached, but the association/cancellation of the association with the game medium by switching between the selected state and the canceled state can be immediately reflected. In addition, if the association of a game medium that was attached is canceled, the character object is returned to a state in which it is associated with a game medium that is associated with (owned by) the user among the game media that were associated with it before the canceled game medium was associated with it.

Although not shown in the drawings, it is also possible to arrange a button that allows the user to select/cancel all game media at once. In this case, the user's operational effort is reduced.

Then, the display processor 410 can display, on the third screen S20, a list of game media related to the selection instructions in a predetermined order.

The predetermined order is, for example, the order of selection (the most recent item is on top), the order of body parts (from the head to the feet), the order of rarity, the order of the number of required specific game media, or the like, or the reverse order of these.

Furthermore, when the receiver 420 receives a display instruction of the third screen S20 from the user terminal 100 via the first object S11, the display processor 410 can further display the third screen S20 on the display screen S10. At the same time, the display processor 410 can display, on the display screen, a second object S24 for sending a decision instruction to consume a predetermined number of specific game media and store the game media related to the selection instruction(s) in association with the user and character object.

Figure 31:
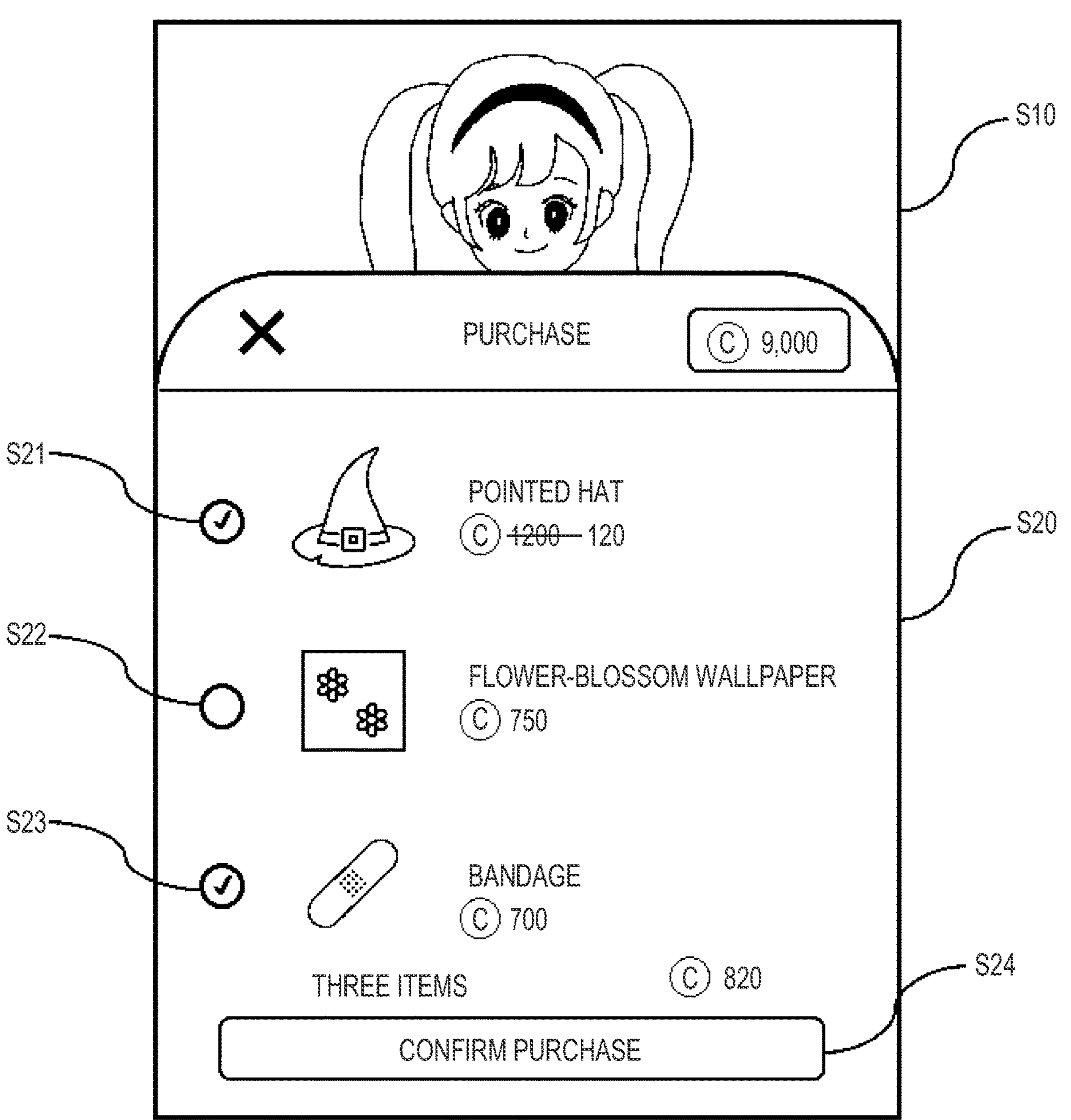
FIG. 31 is a conceptual diagram showing an image of a screen displayed on a user terminal.
Figure 32:
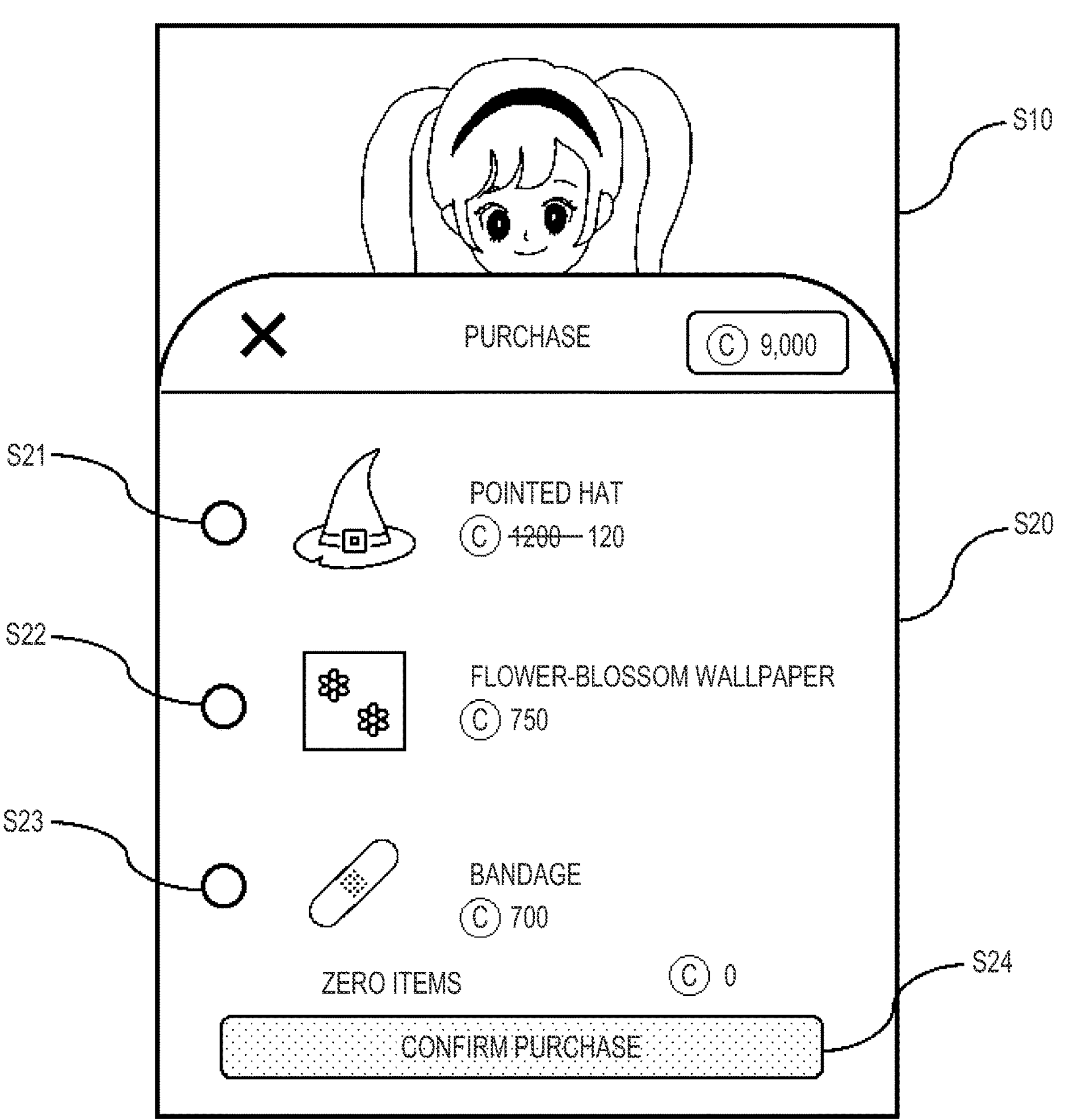
FIG. 32 is a conceptual diagram showing an image of a screen displayed on a user terminal.

As shown as an example in FIGS. 30-32, the total number of specific game media required for purchase can also be displayed in association with the second object S24.

Furthermore, if all selections have been canceled as shown in FIG. 32, the second object S24 can be made unselectable or non-displayed.

Then, in response to the selection of the second object S24, the association portion 430 stores the game media for which the selection has not been cancelled, in association with the user and the character object.

Figure 33:
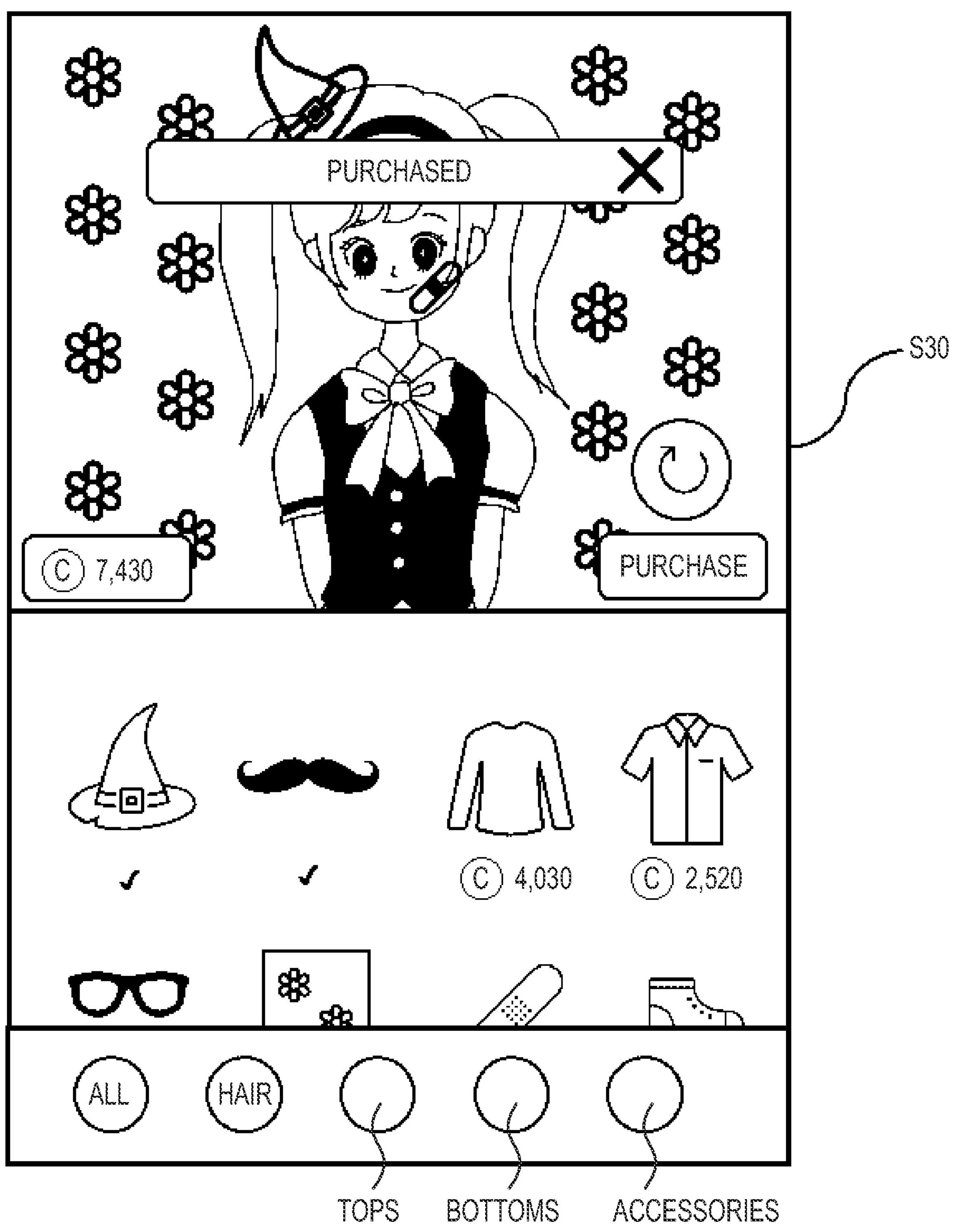
FIG. 33 is a conceptual diagram showing an image of a screen displayed on a user terminal.

Thereafter, as shown in FIG. 33, a purchase completion screen S30 can be displayed. Alternatively, the configuration may be such that the transition is made to the distribution setting screen D20 (FIG. 7) instead of the purchase completion screen S30. Alternatively, the configuration may be such that the screen transitions to the avatar setting screen D10 (FIG. 6) or a closet screen.

According to this configuration, it becomes possible to start distribution more smoothly after purchasing the game media.

Furthermore, as shown in FIG. 29, when the receiver 420 receives a selection instruction, the display processor 410 can attach the game medium related to the selection instruction to the character object that is displayed on the first screen R5, and display the character object with the attached game medium.

In the example shown in FIG. 29, objects of a pointed hat, a flower-blossom wallpaper, and a bandage are selected on the second screen R6, so the character object CO shown on the first screen R5 is also displayed with these objects attached. Also, the wallpaper can be set as a background.

Thus, when a game medium is selected on the second screen R6, the character object CO tries on the game medium. At this time, the game medium related to the selection instruction (the game medium being tried on) is associated with the character object CO, but is not associated with the user.

According to this configuration, it is possible to try on game media before purchasing, and it is possible to suppress dissatisfaction due to differences in perception towards media after and before purchase, incorrect selection, and the like.

Additionally, as described above, if a second game medium is selected to be attached to one part of a character object, the selection of a first game medium may be cancelled, and the second game medium may be displayed as being tried on.

Furthermore, the receiver 420 can further receive selection of at least one attribute from among a plurality of attributes provided for the game media related to the selection instruction.

In the example shown in FIG. 29, a color bar that can receive the selection of the color of the selected game medium is displayed at the top of the second screen R6, and the user can select at least one color from the displayed color bar. Further, after selecting such a color, a bar from which a taste can be selected may be further displayed so that at least one taste can be selected.

Furthermore, the attributes are not limited to such colors and tastes, but may be other parameters. For example, texture and blinking/scrolling patterns may be selectable as attributes.

According to such a configuration, a wide variety of game media can be selected even on a small screen such as that expected on a smartphone and the like.

When the receiver 420 receives a decision instruction from the user terminal 100 via the second object S24, the display processor 410 can further display a fourth screen that is displayed to enable cancellation of the selection of the game media related to the selection instruction(s). At the same time, the display processor 410 can display, on the display screen S10, a third object for executing the processing by the association portion.

Figure 34:
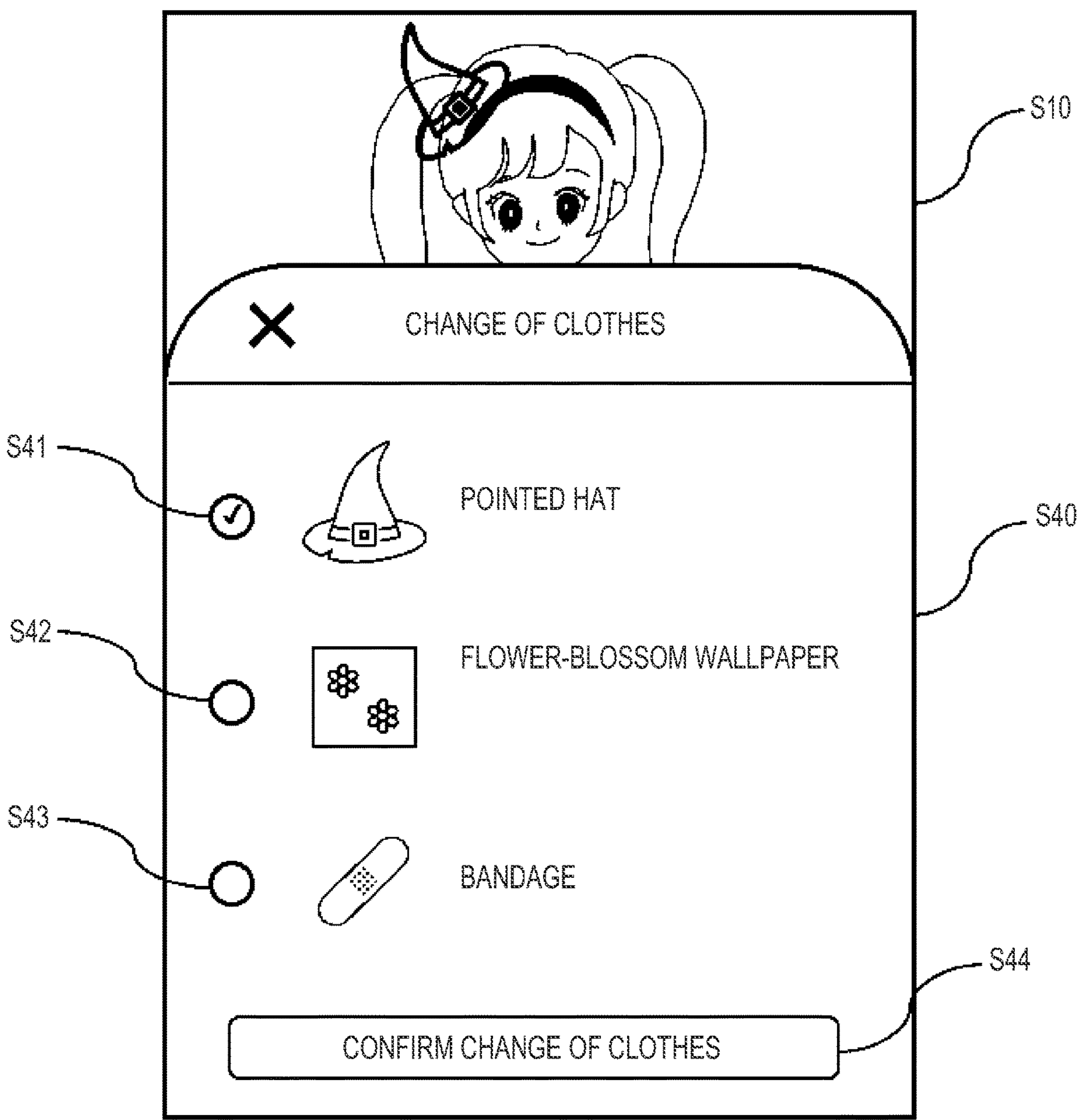
FIG. 34 is a conceptual diagram showing an image of a screen displayed on a user terminal.

FIG. 34 shows an example in which a fourth screen S40 is displayed on the display screen S10. The fourth screen S40 may also be displayed on the purchase completion screen S30.

Furthermore, in response to the selection of a third object S44, the association portion 430 can store only the game media for which selection has not been cancelled in association with the character object.

As shown in FIG. 34, the fourth screen S40 is displayed to enable the selection of the game media related to the decision instruction to be canceled. On the fourth screen S40, selection cancellation buttons for canceling the selections are displayed in association with the objects representing the game media related to the decision instruction.

In the example shown in FIG. 34, three selection cancellation buttons S41, S42, and S43 are displayed in association with the respective objects representing the game media related to the three selection instructions. In the example shown in FIG. 34, of the three selection cancellation buttons S41, S42, and S43, the selection cancellation button S41 is in the selected state, and the selection cancellation buttons S42 and S43 are in the released state.

The user can switch between the selected state and the canceled state by selecting (tapping or the like) the selection cancellation buttons.

At this time, if multiple game media to be attached to one part of the character object are selected, it is possible to output an alert or the like that the attachment cannot be performed, or to set a selection cancellation button so that only one game medium can be selected.

Figure 35:
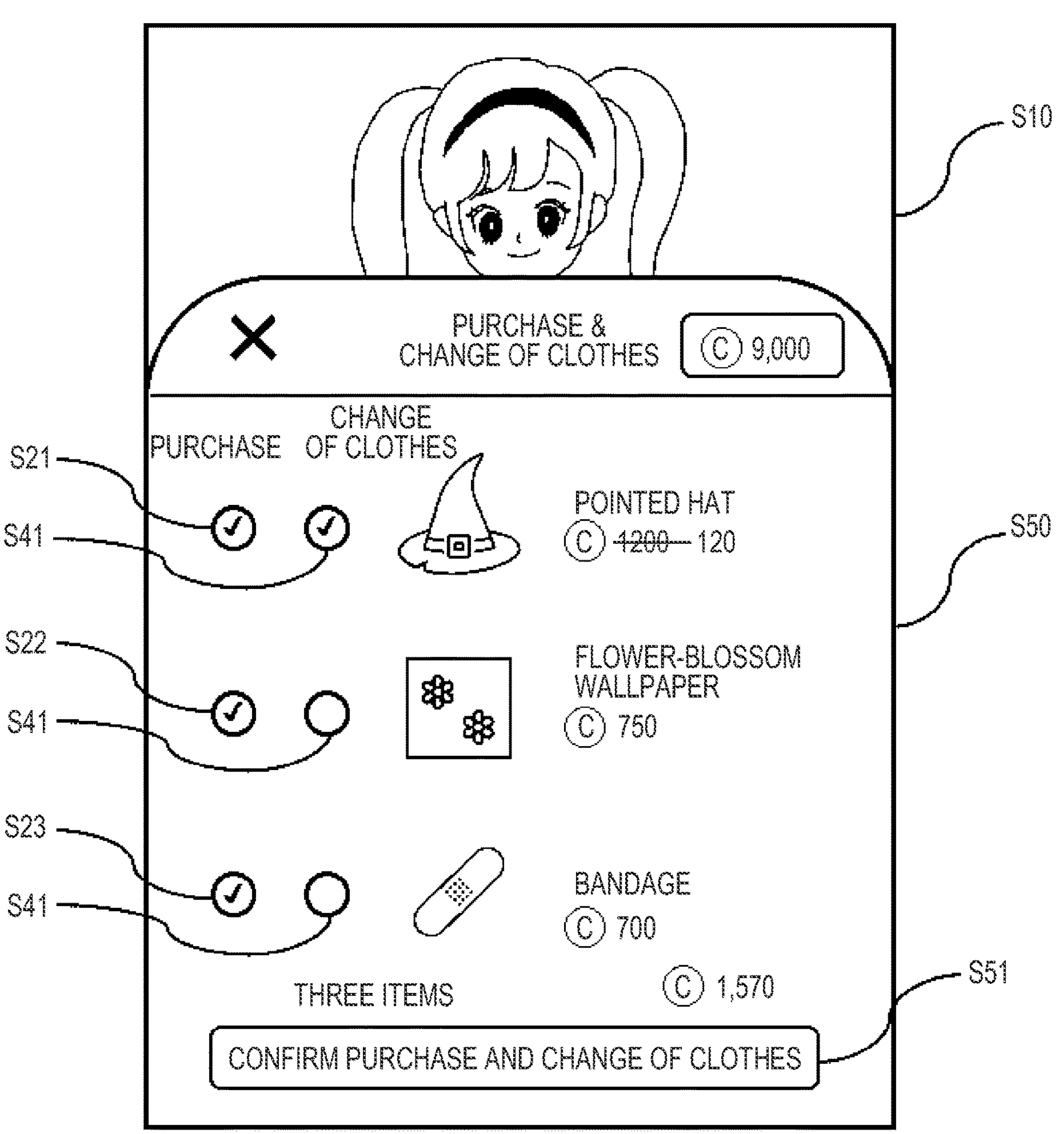
FIG. 35 is a conceptual diagram showing an image of a screen displayed on a user terminal.

Additionally, as shown in FIG. 35 as an example, the third screen S20 and the fourth screen S40 may be displayed as one screen S50.

The basic flow is to purchase the item that the character object is trying on as is, but as in the configuration above, it is also possible to take off the item that the character object is trying on and just make the purchase. If the item being tried on is removed, an item that was previously attached may be re-attached.

Figure 36:
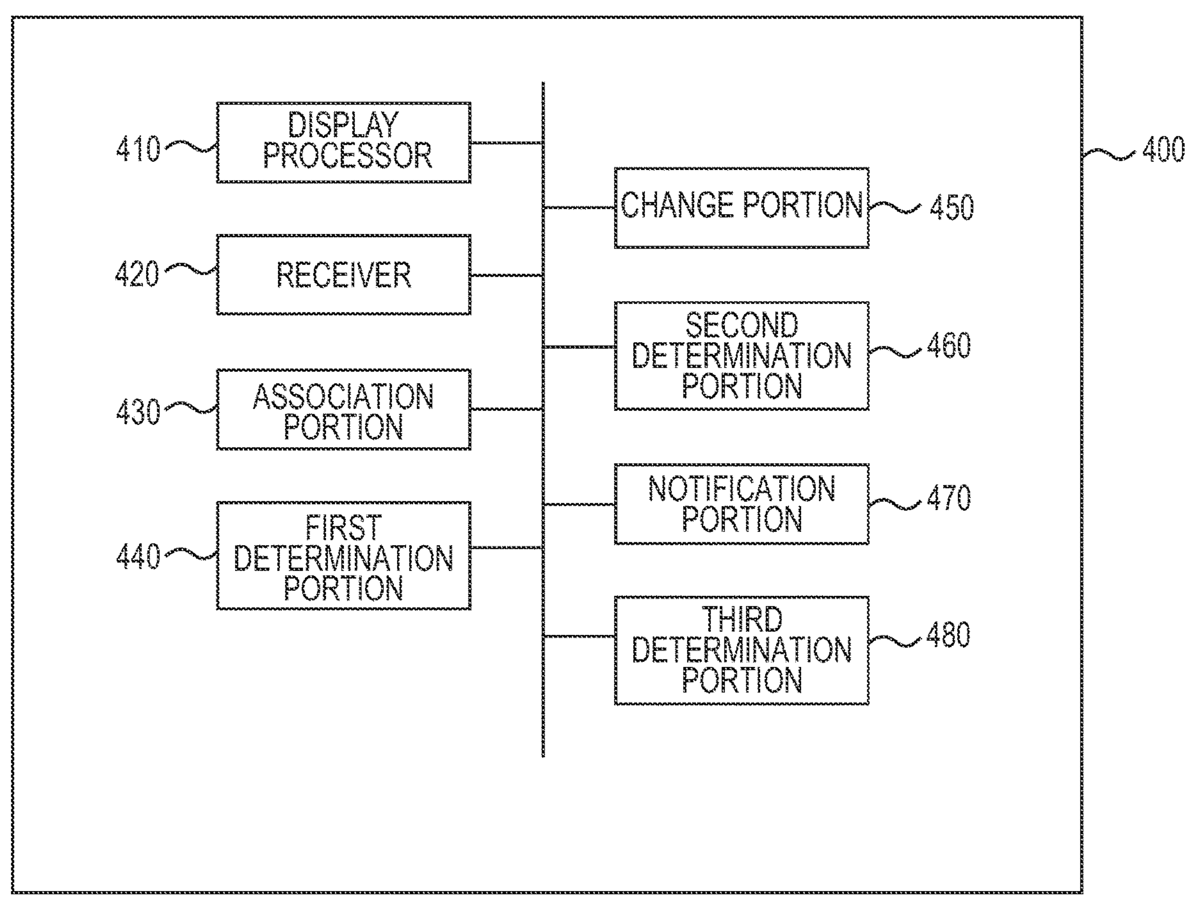
FIG. 36 is a configuration diagram showing another example of a functional configuration of a server device in this disclosure.

One or more computer processors of this disclosure can further include a first determination portion 440, as shown in FIG. 36 as an example.

The first determination portion 440 determines whether the number of specific game media is insufficient.

The determination by the first determination portion 440 is performed by comparing (i) the total number of specific game media required to purchase the game medium related to the selection instruction and (ii) the number of specific game media associated with (possessed by) the user.

The association portion 430 can associate and store the game medium related to the selection instruction with the user and the character object when the first determination portion 440 determines that the number of specific game media is not insufficient.

Figure 37:
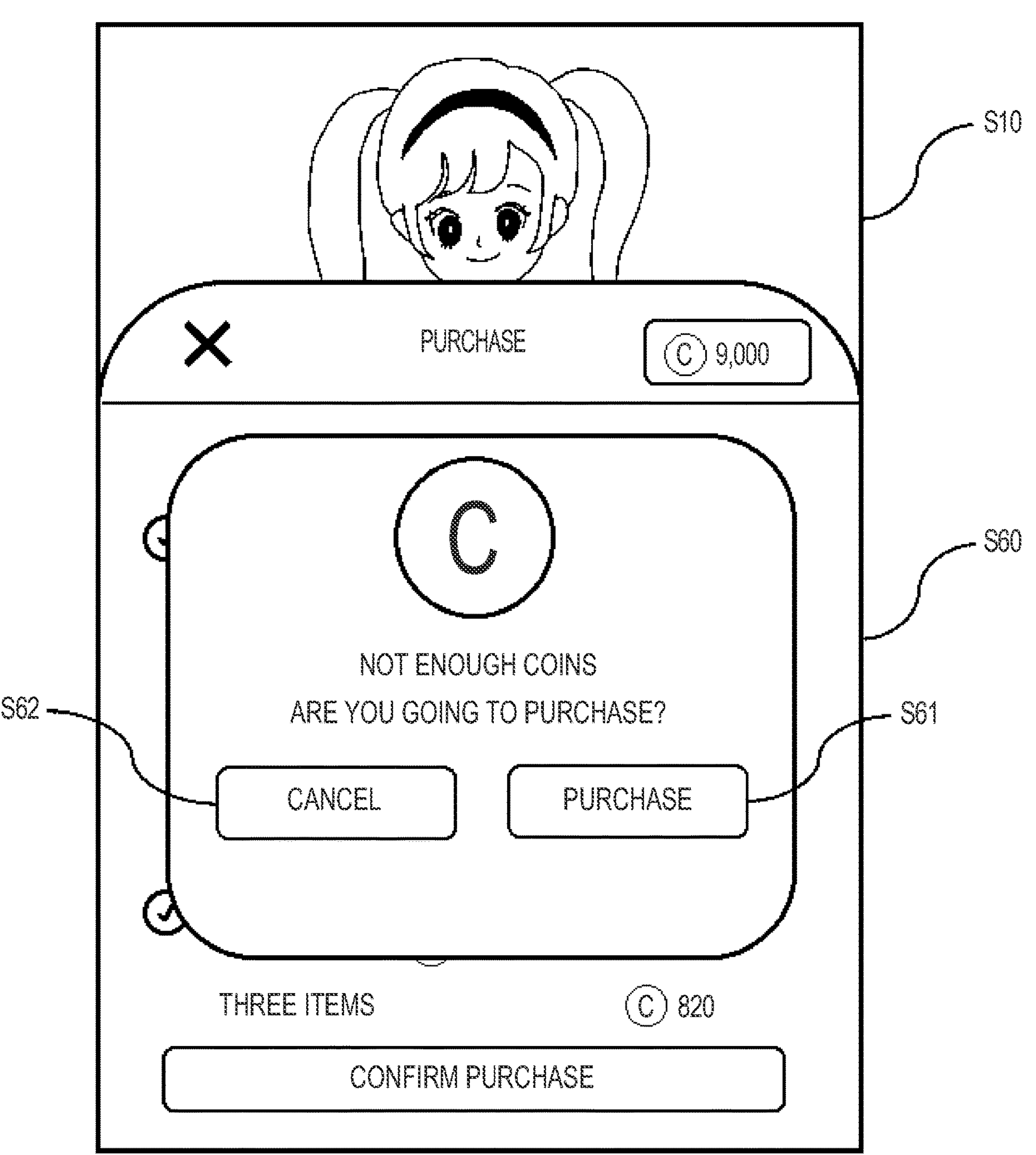
FIG. 37 is a conceptual diagram showing an image of a screen displayed on a user terminal.

On the other hand, when the first determination portion 440 determines that the number of specific game media is insufficient, the screen transitions to a confirmation screen S60 as shown in FIG. 37. This confirmation screen S60 can be displayed superimposed on the display screen S10, the third screen S20, or the like.

A purchase object S61 and a cancellation object S62 are displayed on the confirmation screen S60. When the purchase object S61 is selected, the screen transitions to a coin purchase screen S65 shown in FIG. 38, and the desired number of coins can be purchased.

Furthermore, the specific game media may be avatar points. Avatar points are points obtained by converting duplicate avatar parts into points according to the value of the duplicate parts, or converting the duplicate avatar parts into points equally, when avatar parts obtained through a gacha or the like are duplicated.

Figure 39:
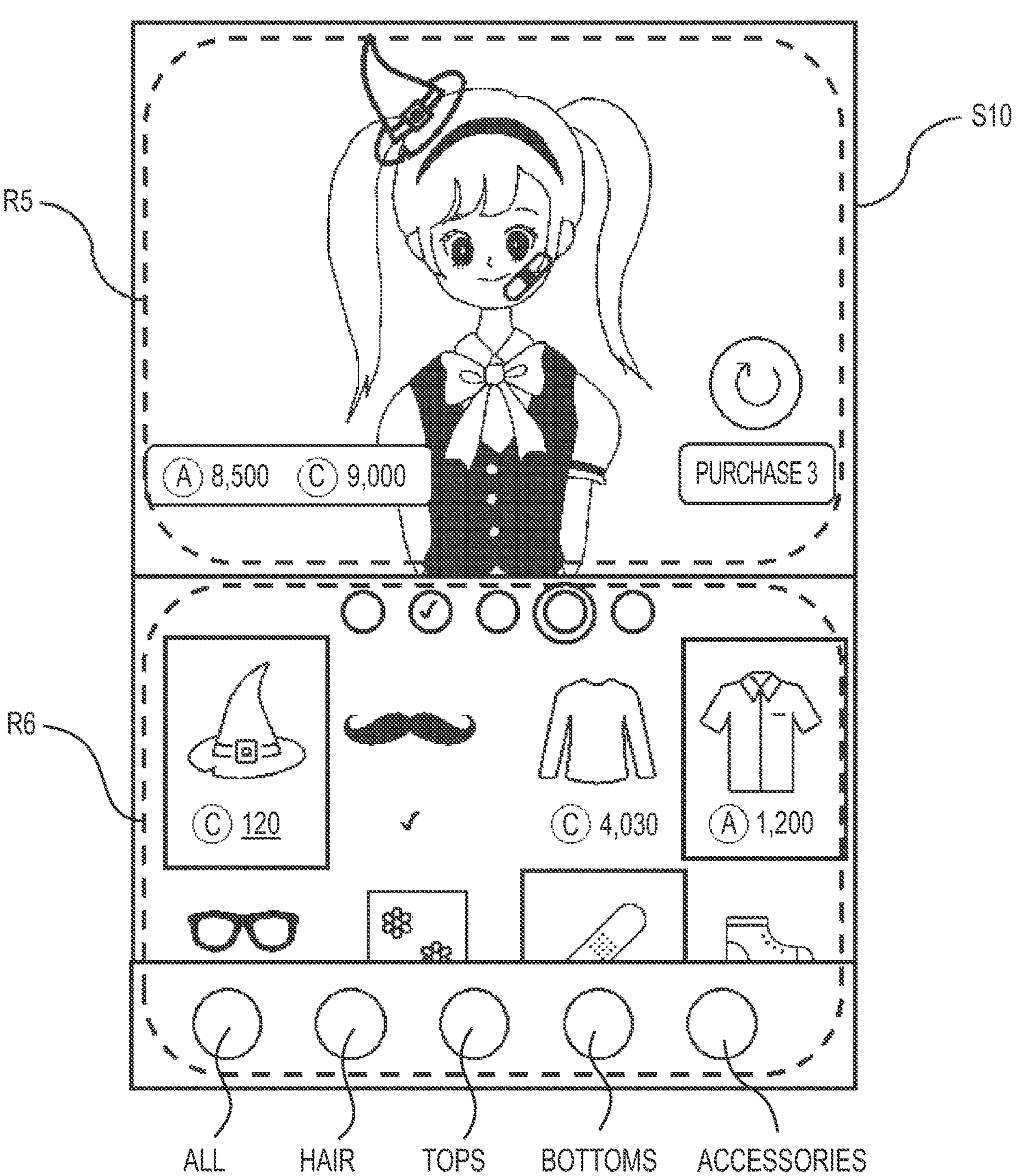
FIG. 39 is a conceptual diagram showing an image of a screen displayed on a user terminal.
Figure 40:
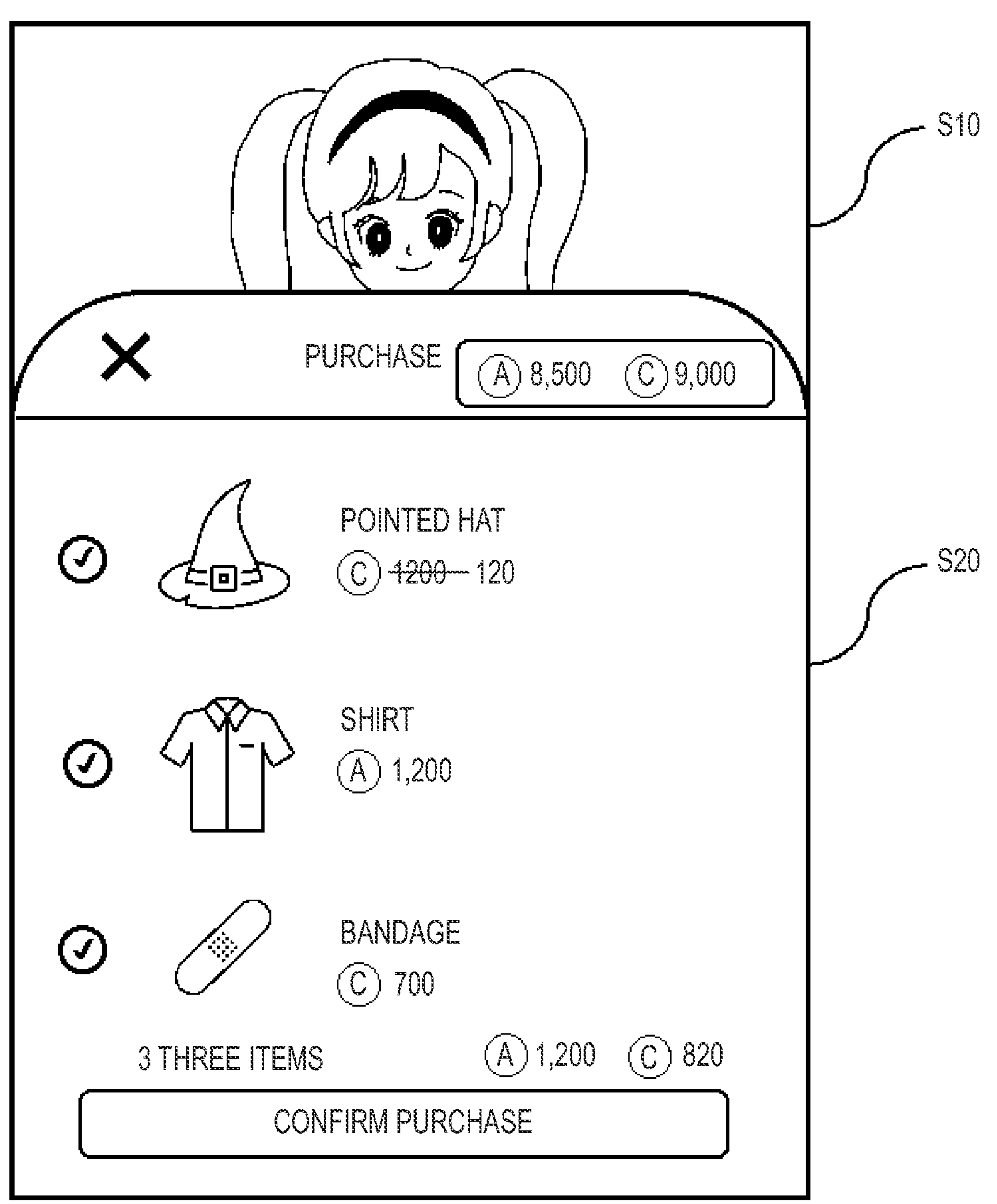
FIG. 40 is a conceptual diagram showing an image of a screen displayed on a user terminal.

FIGS. 39 and 40 show the second screen R6 and the third screen S20 when game media that can be purchased with coins and game media that can be purchased with avatar points are mixed. In addition, the display screen S10 displays the remaining number of avatar points in addition to the remaining amount of coins. In the drawing, "C" represents coins, and "A" represents avatar points.

Figure 38:
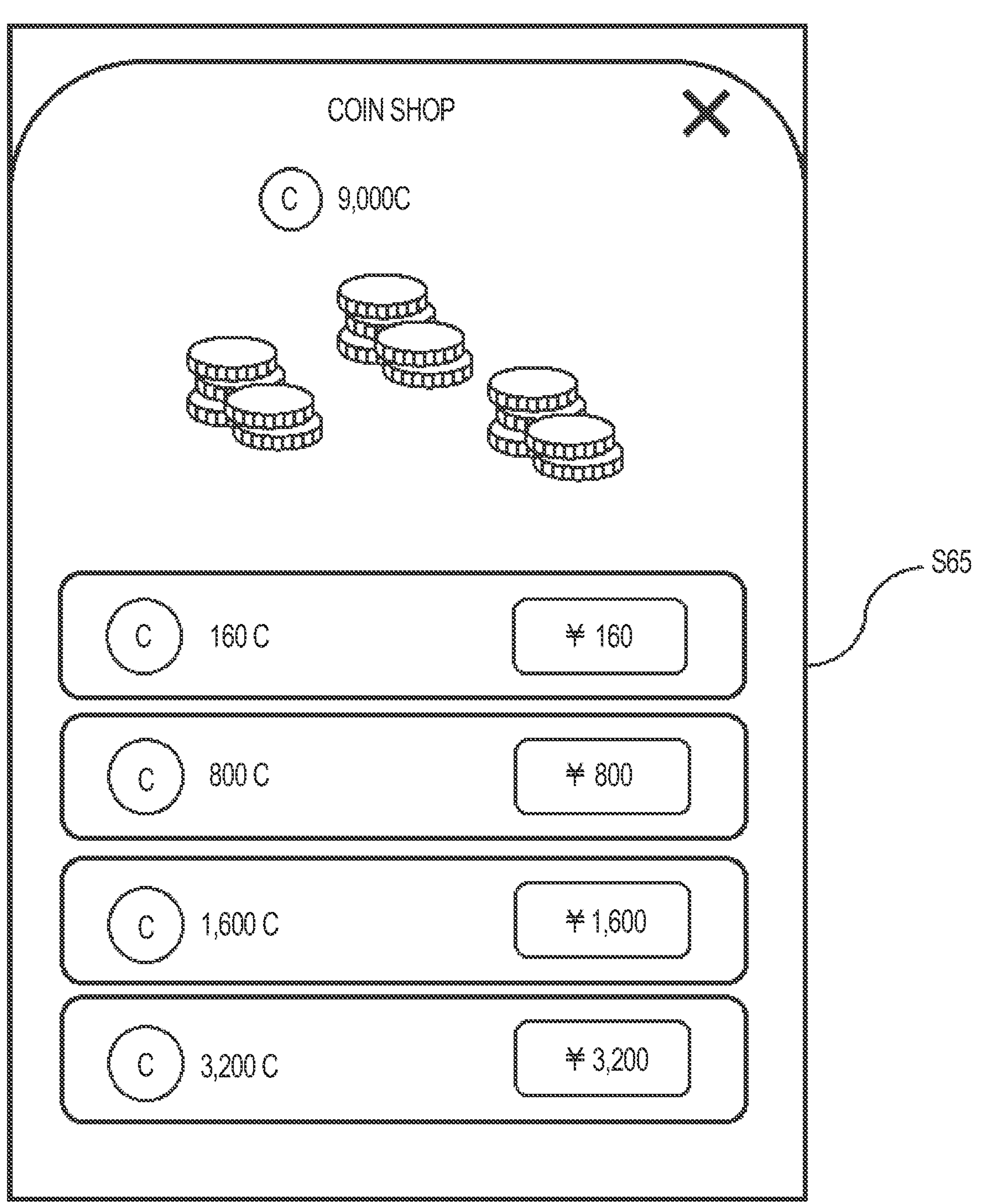
FIG. 38 is a conceptual diagram showing an image of a screen displayed on a user terminal.
Figure 41:
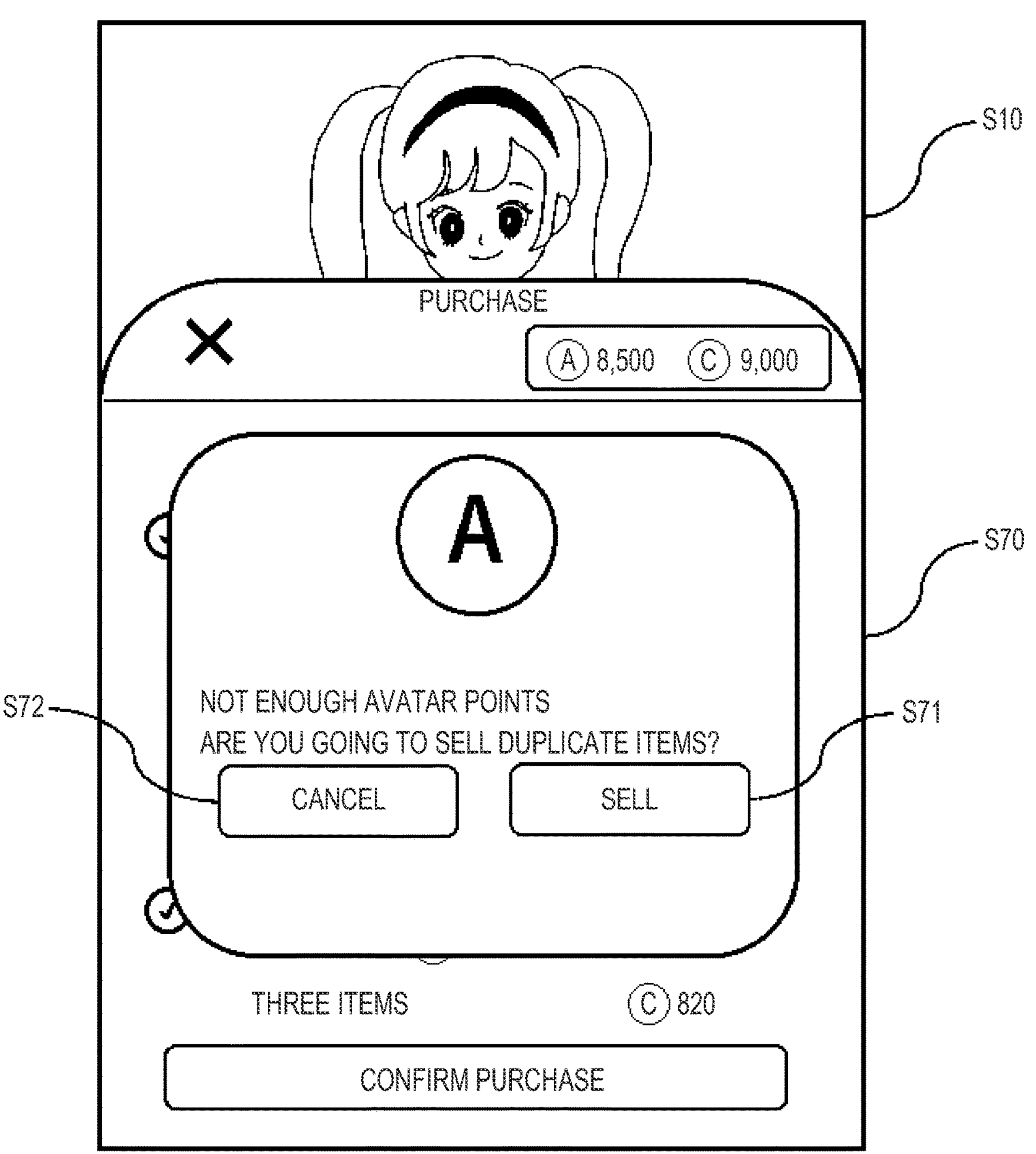
FIG. 41 is a conceptual diagram showing an image of a screen displayed on a user terminal.

Furthermore, if there are not enough coins, the screen will transition to the screens S60 and S65 shown in FIGS. 37-38 above, but if there are not enough avatar points, the screen will transition to screens S70 and S75 shown in FIGS. 41-42. Additionally, if both coins and avatar points are insufficient, a screen for additionally purchasing these specific game media will be displayed either sequentially or on the same screen.

In FIG. 41, a confirmation screen is displayed asking whether to sell a duplicate game medium in order to obtain missing avatar points. When a sell object S71 is selected, the screen transitions to a sell screen S75 shown in FIG. 42, and avatar points can be increased by selling the duplicate game medium.

The display processor 410 can determine one or more game media to be displayed on the second screen R6 according to the attributes of the character object displayed on the first screen R5.

One or more attributes can be set to the character object CO by user settings or automatically. Attributes include gender, age, preferred taste, and the like. Gender is not limited to male or female, and various genders can be set. Moreover, the favorite taste can be, for example, the favorite taste of clothes. For example, tastes related to the shape and color of clothes, such as boyish, girly, monotone, pastel, and vivid, may be set as attributes.

The display processor 410 can then determine one or more game media to be displayed on the second screen R6 according to the character object displayed on the first screen R5, that is, the attributes of the character object currently being used by the user. That is, if the attributes are different, the displayed game media may also be different.

Furthermore, as described hereafter, even if the character object is switched on the first screen R5 above, the game media will be displayed according to the attributes of the displayed character object. At this time, processing by a second determination portion 460, which will be described later, is not essential.

According to this configuration, game media suitable for the character object are lined up in the shop, and the user's desire to purchase can be increased. In addition, by sorting the game media to be displayed in the shop, for a user who uses a smartphone or the like, which is expected to have a small display screen, it can reduce the hassle of searching for the desired game media from a large amount of game media.

The one or more computer processors in this disclosure can further include a change portion 450, as shown in FIG. 36 as an example.

The change portion 450 changes the character object displayed on the first screen R5 to another character object of the user according to the user's operation.

Here, the premise is that users can create multiple character objects as their own avatars. It is also possible to designate one character object from among multiple character objects as a main avatar. This main avatar designation can be changed on the above-mentioned closet screen, distribution preparation screen, and the like, but it is also possible to change the designation on the first screen R5.

Figure 43:
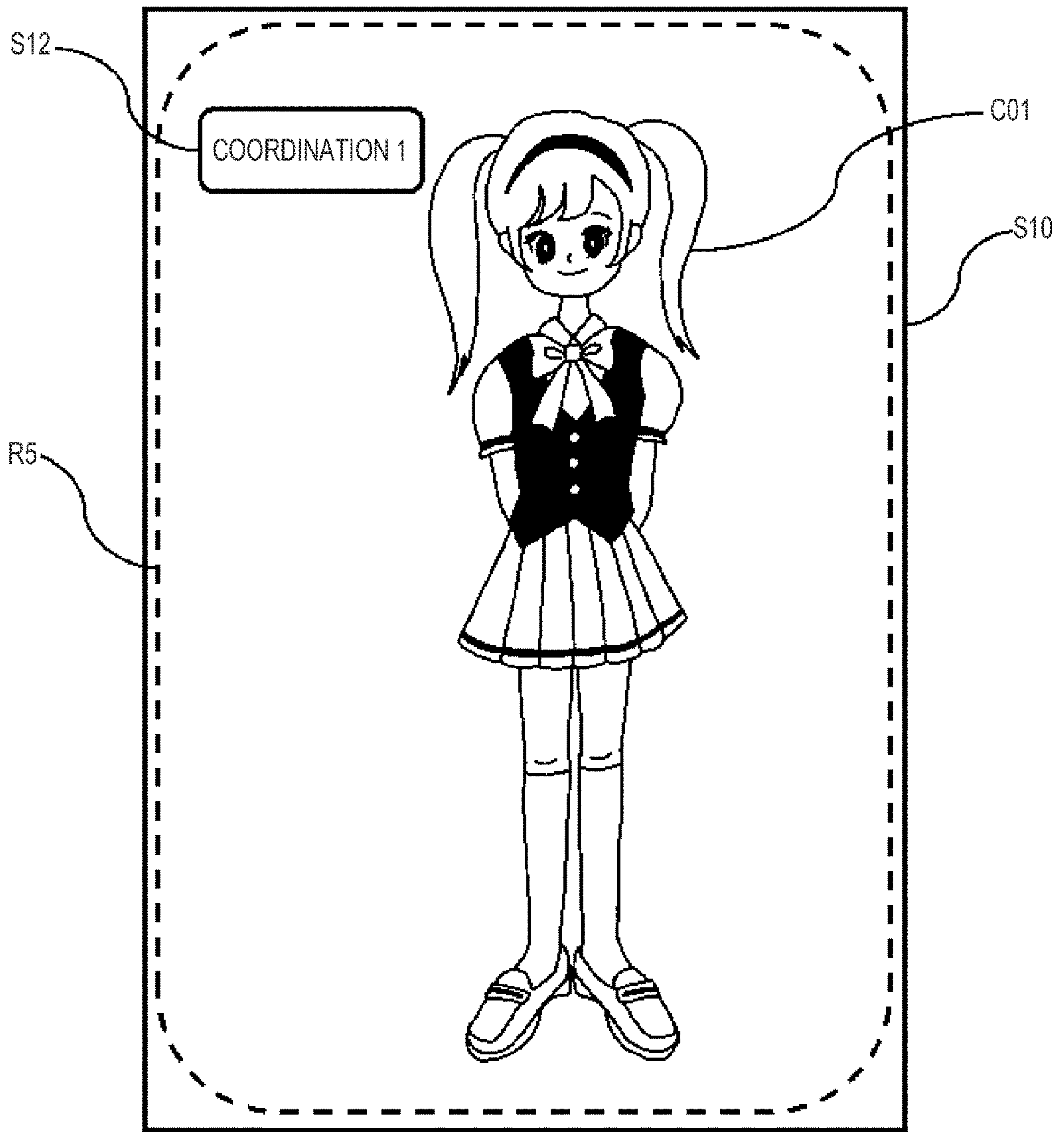
FIG. 43 is a conceptual diagram showing an image of a screen displayed on a user terminal.

For example, as shown in FIG. 43, it is assumed that the user has specified character object CO1, which is set as coordination 1, as a main avatar. Then, when a coordination field S12 displayed on the first screen R5 is selected, as shown in FIG. 44, the coordination field S12 expands, and it is possible to change the designation of the main avatar to character object CO2, which is set as coordination 2, for example.

The game media displayed on the second screen R6 correspond to the character object displayed on the first screen R5. Therefore, the game media may be changed according to the change from the character object CO1 to the character object CO2. Details will be described hereafter.

It is also possible to newly create and delete character objects from the expanded coordination field S12. However, an upper limit can be provided for the number of character objects that can be set by the user.

Figure 44:
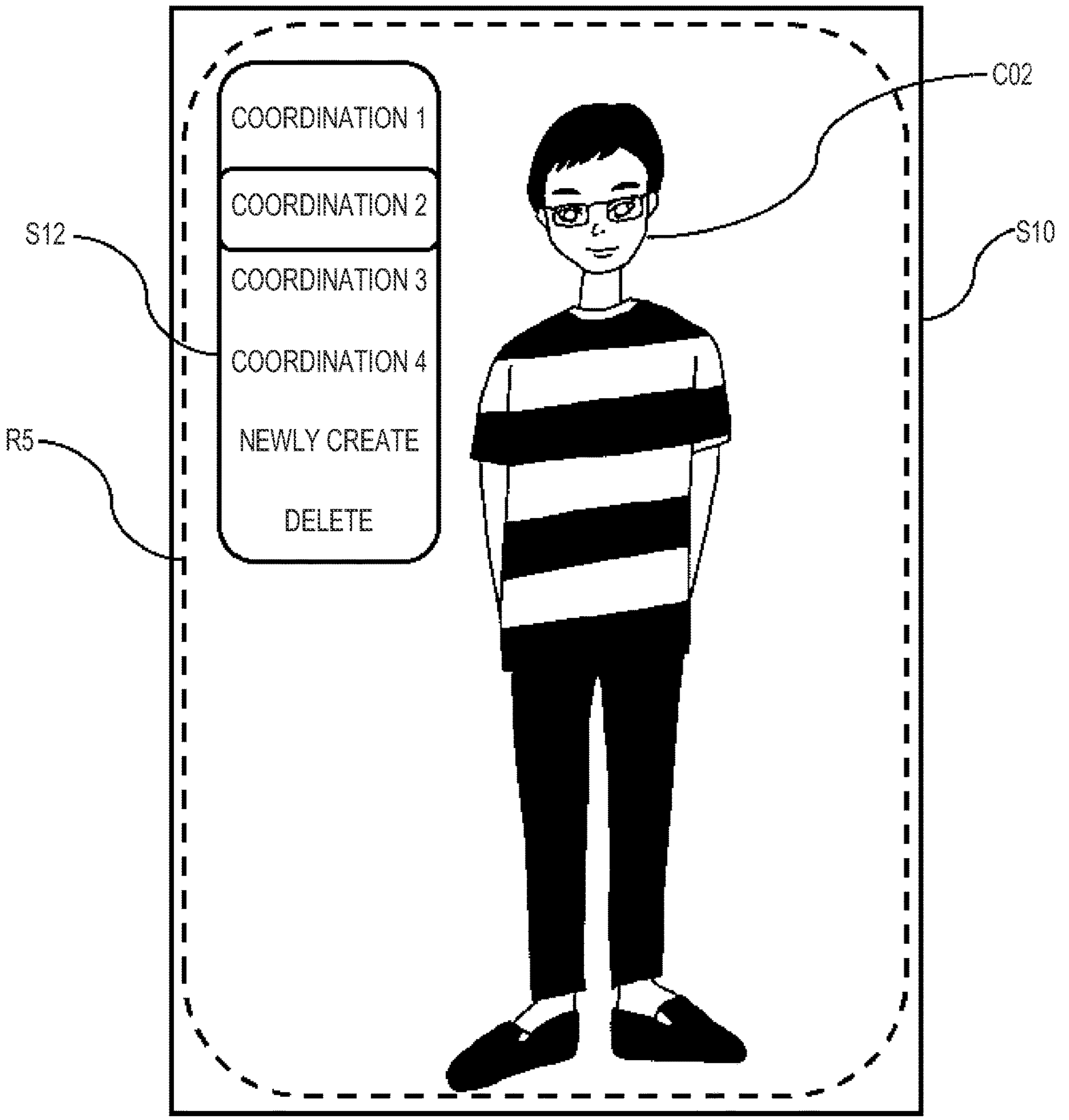
FIG. 44 is a conceptual diagram showing an image of a screen displayed on a user terminal.

Furthermore, in FIGS. 43 and 44, the display of the second screen R6 and the like is omitted.

The one or more computer processors in this disclosure can further include a second determination portion 460, as shown in FIG. 36 as an example.

The second determination portion 460 determines whether the attribute(s) of a character object and another character object are different in relation to the change process by the change portion 450.

Furthermore, if the second determination portion 460 determines that the attribute(s) of the character object and another character object are different, the display processor 410 determines one or more game media to be displayed on the second screen R6 according to the attribute(s) of the other character object.

For example, if the female-type character object CO1 shown in FIG. 43 is displayed, game media for women are sold at the shop, and if the male character object CO2 shown in FIG. 44 is displayed, game media for men will be sold at the shop. Additionally, unisex items can be displayed in both cases.

Furthermore, as described above, the attributes referred to here are not limited to gender, but include age, preferred taste, and the like.

When the receiver 420 receives a selection instruction of one or more game media that can be attached to a character object and one or more game media that can be attached to another character object, the display processor 410 can (i) further display, on the display screen S10, the first object S11 for receiving a display instruction of the third screen S20, which is displayed to enable cancellation of the selection of the game medium related to the selection instruction, and (ii) display, on the third screen S20, a list of game media related to the selection instruction in a predetermined order for each character object to which the one or more game media are to be attached.

For example, on the first screen R5, after the character object CO1 is displayed and game medium A is selected, even if the character object CO2 is displayed, the selection of game medium A is maintained. At this time, the game medium A may be displayed by being worn by the character object CO2, or may be displayed without being worn by the character object CO2. It is also possible to newly select game medium B after displaying the character object CO2.

Additionally, according to the attribute(s) of the character object CO1 and the character object CO2, and the attribute(s) of the game medium A, the display processor 410 may determine whether the game medium A may be worn on the character object CO2 displayed on the first screen R5.

For example, in the case in which the character object CO1 is a female-type character object and game medium A is female-type clothes, when the display is changed from the character object CO2 to the character object CO1, which is a female-type character object, the display processor 410 displays the game medium A by attaching it to the character object CO1.

Meanwhile, in the case in which the character object CO1 is a female-type character object and the game medium A is female-type clothes, when the display is changed from the character object CO1 to the character object CO2, which is a male-type character object, the display processor 410 does not allow the game medium A to be attached to the character object CO2.

Alternatively, if the character object CO1 is a female-type character object and the game medium A is unisex clothing, when the display is changed from the character object CO1 to the character object CO2, which is a male-type character object, the display processor 410 displays the game medium A by attaching it to the character object CO2.

Thus, when an attribute of the character object displayed on the first screen R5 and an attribute of the game medium related to the selection instruction have a predetermined relationship, the game medium is displayed in association with the character object.

Then, on the third screen S20, the game medium related to the selection instruction can be displayed for each character object.

Furthermore, when multiple game media to be attached to one part of the character object are selected, the display processor 410 can switch and display multiple game media according to the user's movement or operation.

In the shop, it may be possible to make only one item be selectable to attach to one body part, or the user may be able to select as many items as s/he likes without setting an upper limit. Even in the latter case, only one item can be attached to (tried on) the character object at a time. Thus, if the user wants the character object to try on clothes it has already taken off, the user needs to select the previous game medium again. However, according to the above configuration, it becomes possible to switch between at least two game media according to the user's movement or operation. Examples of the user's movements include winking, raising a hand, and the like, and examples of operations include swiping, double tapping, and the like.

According to this configuration, even if the user is wondering which item to purchase, comparison becomes easy and helps the user in making a purchase.

If multiple game media to be attached to one part of the character object are selected, the display processor 410 can divide the one part into a plurality of regions and attach and displays each of the multiple game media that is selected in a respective one of the regions.

For example, game media attached on the right and left sides of the body can be displayed separately.

According to this configuration, even if the user is wondering which item to purchase, comparison becomes easy and helps the user in making a purchase.

The display processor 410 can display a still image or video related to the character object of the user separately from the character object displayed on the first screen R5.

Additionally, the still image or video related to the user's character object may be, for example, (i) a three-dimensional character object itself displayed on the first screen, (ii) a two-dimensional version of the character object, or (iii) a smaller version of the character object (mini avatar). In the still image or video of the user's character object that is displayed at this time, the user's movement need not be reflected.

Additionally, the still image or video related to the user's character object may be, (i) a three-dimensional character object (character object with different coordination) itself that is not being displayed on the first screen R5, (ii) a two-dimensional version of the character object, or (iii) a smaller version of the character object (mini avatar). In the still image or video of the user's character object that is displayed at this time, the user's movement need not be reflected.

For example, the above-described comparison becomes easier by displaying the mini avatar of the currently displayed character object on the screen. Also, by displaying the mini avatars of non-displayed character objects on the screen, it becomes easier to understand the overall image when purchasing items of multiple avatars.

The association portion 430 can associate and store the game medium related to the selection instruction with a user and a character object with a restriction, based on the selection instruction and a tentative decision instruction received by the receiver 420.

Regarding a flow of the processing from the selection instruction to the tentative decision instruction, the flow of the processing is the same as the flow of the processing from the selection instruction to the decision instruction described above. However, when the tentative decision instruction is received, a restriction is placed on the association of the user and character object with the game medium related to the selection instruction.

Such a restriction may, by way of example, relate to the duration of the association.

A restriction on the duration of the association refers to a so-called rental period of game media, and is a restriction that limits the association period to days, hours, a distribution time slot, or the like.

This period may be one predetermined period for each selectable game medium, or may be one that the user can select from among multiple predetermined periods.

Then, when the period ends, the game medium that is associated with the user and character object with the restriction is disassociated from the user and character object.

At this time, in order to avoid the character object being in a state of not wearing clothes, an appropriate game medium can be newly associated with the character object from among the game media already associated with the user. For example, the game medium that was associated immediately before the game medium related to the disassociation can be newly associated with the character object.

Thus, the user can rent clothes sold at the shop.

At this time, the game medium may be displayed in a manner that allows the user or other users to understand that the game medium is a rental item.

For example, it is possible to display characters, marks, or the like on the game medium that make it clear that the game medium is a rental product.

Additionally, it is also possible to change the display mode of the game medium when the above-mentioned deadline approaches (for example, 10 minutes remaining) or as the deadline approaches. Changes in display mode include increasing transparency, decreasing color brightness and/or saturation, and the like.

Furthermore, if a predetermined number of hours/days remain in the above-mentioned deadline, the user may be notified of this fact.

Additionally, a consumption amount of specific game media when the association portion 430 stores the game media related to the selection instruction in association with the user and the character object with a restriction can be less than a consumption amount of the specific game media when the association portion 430 stores the game media related to the selection instruction in association with the user and the character object.

That is, it is possible to set the price of renting game media to be cheaper than purchasing it.

Furthermore, the consumption amount of specific game media at the time of rental may vary depending on the rental period. Additionally, such rental period may be extended by consuming additional specific game media.

Additionally, the above-described restriction can be cancelled by consumption of specific game media by the user or another user.

The other user here can be another user in the virtual space, a co-starring user in a video distribution, or a viewing user.

Additionally, the number of specific game media required to lift the restriction can be the selling price, or can be the selling price minus the rental fees paid.

Once the restriction is lifted, it is possible to associate the game media with the user as if it were purchased rather than rented.

Additionally, if the accumulated amount of rental fees reaches the selling price, the restriction can be lifted and the game media can be associated with the user as a purchase rather than a rental.

The one or more computer programs in this disclosure can further include a notification portion 470, as shown in FIG. 36 as an example.

After the association is canceled due to a restriction, the notification portion 470 displays, on the user terminal 100, a notification indicating that the number of specific game media to be consumed when associating the game media related to the selection instruction has been reduced, at a predetermined timing, In other words, the user is notified that the price of the rented item has been reduced. According to this configuration, it is possible to encourage the user to purchase game media.

The one or more computer processors in this disclosure can further include a third determination portion 480, as shown in FIG. 36 as an example.

The third determination portion 480 determines whether the game medium related to the selection instruction includes a plurality of game media having a predetermined relationship.

Examples of predetermined relationships include a set relationship (a set of tops and bottoms, items with the same theme, or the like), a relationship between different colors, and the like.

Then, when the third determination portion 480 determines that multiple game media having a predetermined relationship are included, the association portion 430 can reduce the number of specific game media consumed when associating the game media related to the selection instruction, and store the game media related to the selection instruction in association with the user and the character object.

This is, in other words, a discount from the selling price.

Additionally, the third determination portion 480 determines whether the number of game media related to the selection instruction is greater than or equal to a predetermined number. When the third determination portion 480 determines that the number of game media related to the selection instruction is greater than or equal to the predetermined number, the association portion 430 may reduce the number of specific game media consumed when associating the game media related to the selection instruction, and store the game media related to the selection instruction in association with the user and the character object.

According to this configuration, it is possible to encourage the user to purchase game media.

Also, when the user is a video distributing user, the processing by the display processor 410, the receiver 420, and the association portion 430 is executed while the video is being distributed so that a video viewing user can view it.

An object of this disclosure described above was to allow the users to smoothly start distributing a video and the like by reducing the steps from using the shop to distributing a video. According to the above configuration, since the user can use the shop while the video is being distributed, it will be possible to start distributing the video more smoothly.

In addition, by distributing to the viewing user the situation of the user using the shop, interaction with the viewing user will become more active. For example, the user can decide which game medium to purchase by looking at comments posted by the viewing user.

Furthermore, the number of specific game media consumed may be varied depending on the number of viewing users. For example, a configuration can be used in which the greater the number of viewing users, the greater the discount from the selling price.

In addition, the viewing user can give the video a ticket or the like, as a gift that can be used by the user to purchase or rent game media at the shop.

Furthermore, the display processor 410 can make at least part of the display screen different between the user terminal 100 of the distributing user and the user terminal 200 of the viewing user.

For example, items related to coins/points owned by the user can be non-displayed with respect to the viewing user.

Additionally, the confirmation screen S60 shown in FIG. 37, the coin purchase screen S65 shown in FIG. 38, the confirmation screen S70 shown in FIG. 41, and the sell screen S75 shown in FIG. 42 can also be non-displayed with respect to the viewing user.

Furthermore, each function in this disclosure can also be applied to a shop installed in a metaverse space, regardless of whether a video is distributed.

Next, an example of an information processing method in an embodiment of this disclosure will be explained.

The information processing method in the embodiment of this disclosure is an information processing method in the information processing system 3000 shown in FIG. 3. The information processing system 3000 includes at least the user terminal 100 and the server device 400.

Figure 45:
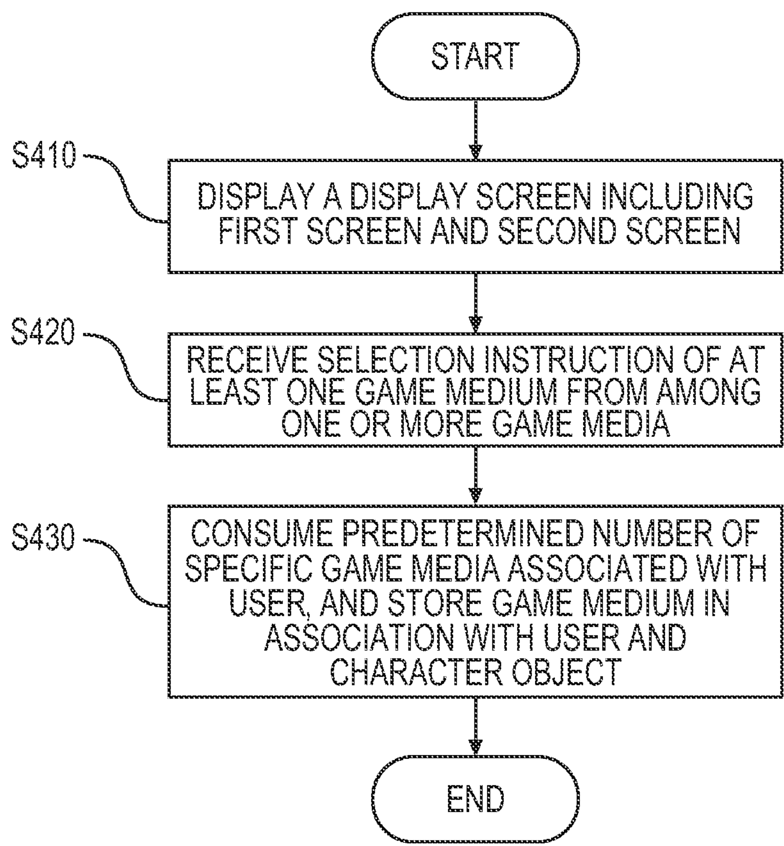
FIG. 45 is a flow diagram showing an example of a flow of an information processing method in this disclosure.

As shown in FIG. 45 as an example, the information processing method in this disclosure causes one or more computer processors included in the information processing system 3000 to execute a display processing step S410, a receiving step S420, and an associating step S430.

The display processing step S410 displays a display screen that includes a first screen that displays a character object of the user, and a second screen that selectably displays one or more game media that can be attached to the character object. This display processing step S410 can be executed by the display processor 410 described above.

The display processing step S410 may be executed at the server side (server device 400) or at the client side (user terminal 100).

In the receiving step S420, a selection instruction of at least one game medium from among the one or more game media is received from the user terminal. Such receiving step S420 may be executed by the receiving portion 420 described above.

The receiving step S420 may be executed at the server side (server device 400) or at the client side (user terminal 100).

In the associating step S430, a predetermined number of specific game media associated with the user is consumed based on the selection instruction received in the receiving step S420. At the same time, the game medium related to the selection instruction is stored in association with the user and the character object. This associating step S430 can be executed by the association portion 430 described above.

The receiving step S430 may be executed at the server side (server device 400) or at the client side (user terminal 100).

The above-described configuration provides a technical improvement that solves or alleviates at least part of the problem of the conventional technology described above.

Next, a computer program in an embodiment of this disclosure will be explained.

The computer program in the embodiment of this disclosure is a computer program executed in the information processing system 3000 shown in FIG. 3. The information processing system 3000 includes at least the user terminal 100 and the server device 400.

The computer program in this disclosure causes one or more computer processors included in the information processing system 3000 to realize a display processing function, a receiving function, and an associating function.

The display processing function displays a display screen that includes a first screen that displays the character object of the user, and a second screen that selectably displays one or more game media that can be attached to the character object.

The receiving function receives a selection instruction of at least one game medium from among the one or more game media from the user terminal.

The associating function consumes a predetermined number of specific game media associated with the user based on the selection instruction received by the receiving function, and also stores the game medium related to the selection instruction in association with the user and the character object.

Figure 46:
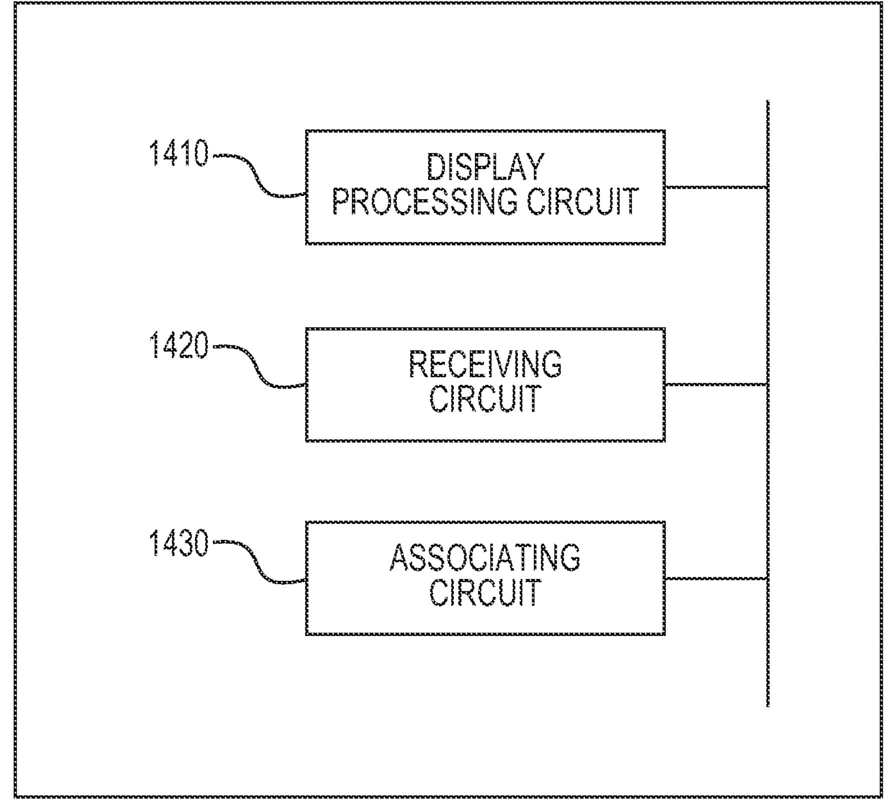
FIG. 46 is a circuit configuration diagram showing a circuit configuration for realizing a computer program in this disclosure.

The above-described functions can be realized by circuits 1410 to 1430 shown in FIG. 46. It is assumed that the display processing circuit 1410, the receiving circuit 1420, and the associating circuit 1430 are realized by the display processor 410, the receiver 420, and the association portion 430 described above, respectively. Details of each portion are as described above.

The above-described configuration provides a technical improvement that solves or alleviates at least part of the problem of the conventional technology described above.

Next, an information processing device in an embodiment of this disclosure will be explained. The information processing device corresponds to the user terminal 100 in the information processing system 3000 described above.

Figure 47:
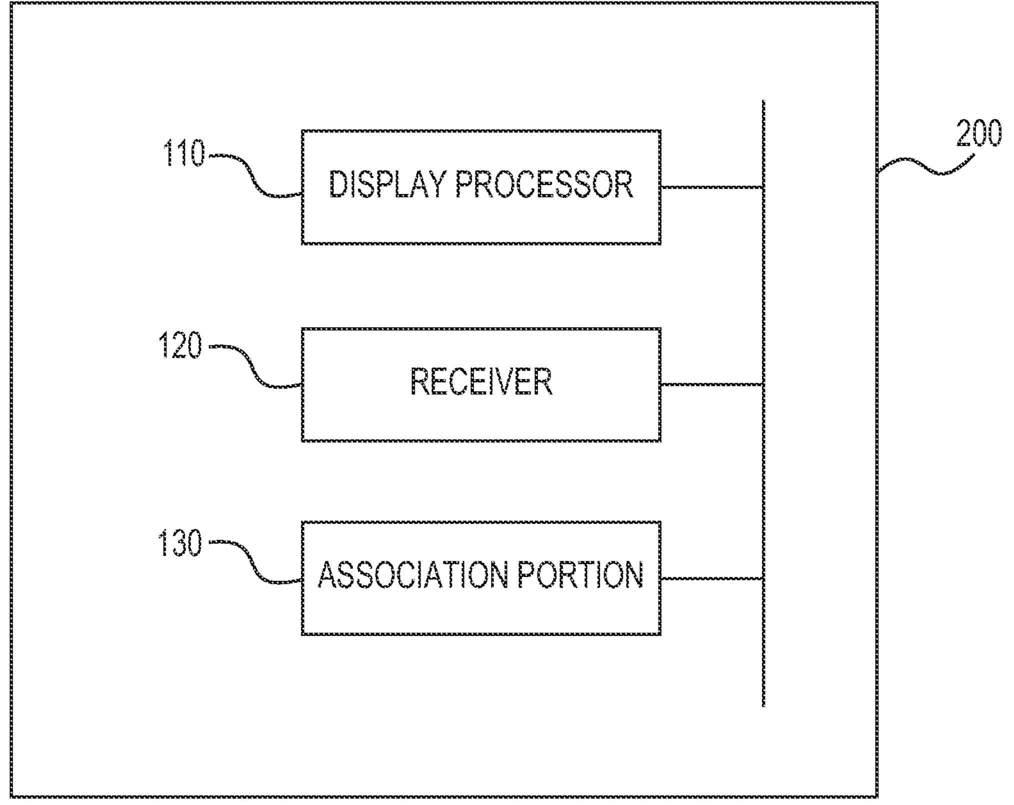
FIG. 47 is a configuration diagram showing an example of a function configuration of a user terminal in this disclosure.

The information processing device includes a display processor 110, a receiver 120, and an association portion 130, as shown in FIG. 47.

The display processor 110 displays a display screen that includes a first screen that displays the character object of the user, and a second screen that selectably displays one or more game media that can be attached to the character object. This display processor 110 can have a similar configuration to the display processor 410 described above.

The receiver 120 receives a selection instruction of at least one game medium from among the one or more game media. The receiver 120 can have a similar configuration to the receiver 420 described above.

The association portion 130 consumes a predetermined number of specific game media associated with the user based on the selection instruction received by the receiver 120, and also stores the game medium related to the selection instruction in association with the user and the character object. The association portion 130 can have a similar configuration to the association portion 430 described above.

The above-described configuration provides a technical improvement that solves or alleviates at least part of the problem of the conventional technology described above.

Next, an example of an information processing method in an embodiment of this disclosure will be explained. This information processing method is an information processing method executed in the above-mentioned information processing device (user terminal 100).

Figure 48:
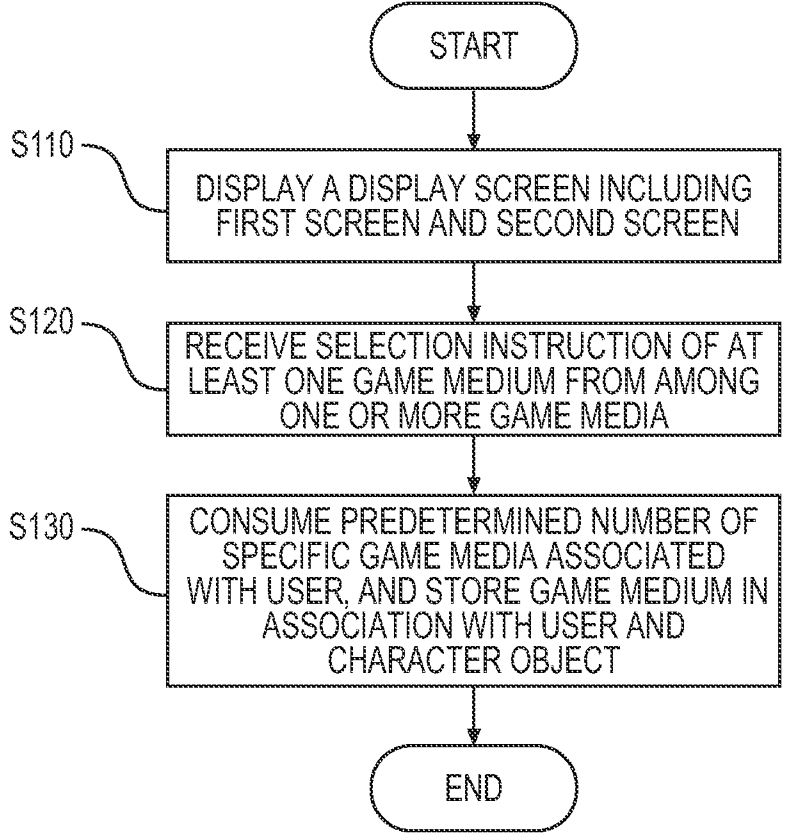
FIG. 48 is a flow diagram showing an example of a flow of an information processing method in a user terminal in this disclosure.

The information processing method in this disclosure causes the information processing device to execute the display processing step S110, the receiving step S120, and the associating step S130, as shown as an example in FIG. 48.

The display processing step S110 displays a display screen that includes a first screen that displays the character object of the user, and a second screen that selectably displays one or more game media that can be attached to the character object. This display processing step S110 can be executed by the display processor 110 described above.

The receiving step S120 receives a selection instruction of at least one game medium from among the one or more game media. The receiving step S120 can be executed by the receiver 120 described above.

The association step S130 consumes a predetermined number of specific game media associated with the user based on the selection instruction received in the receiving step S120, and also stores the game medium related to the selection instruction in association with the user and the character object. The association step S130 can be executed by the association portion 130 described above.

The above-described configuration provides a technical improvement that solves or alleviates at least part of the problem of the conventional technology described above.

Finally, a computer program in an embodiment of this disclosure will be explained. This computer program is a computer program executed in the information processing device (user terminal 100) described above.

The computer program in this disclosure causes an information processing device to realize a display processing function, a receiving function, and an associating function.

The display processing function displays a display screen that includes a first screen that displays the character object of the user, and a second screen that selectably displays one or more game media that can be attached to the character object.

The receiving function receives a selection instruction of at least one game medium from among the one or more game media.

The associating function consumes a predetermined number of specific game media associated with the user based on the selection instruction received by the receiving function, and also stores the game medium related to the selection instruction in association with the user and the character object.

Figure 49:
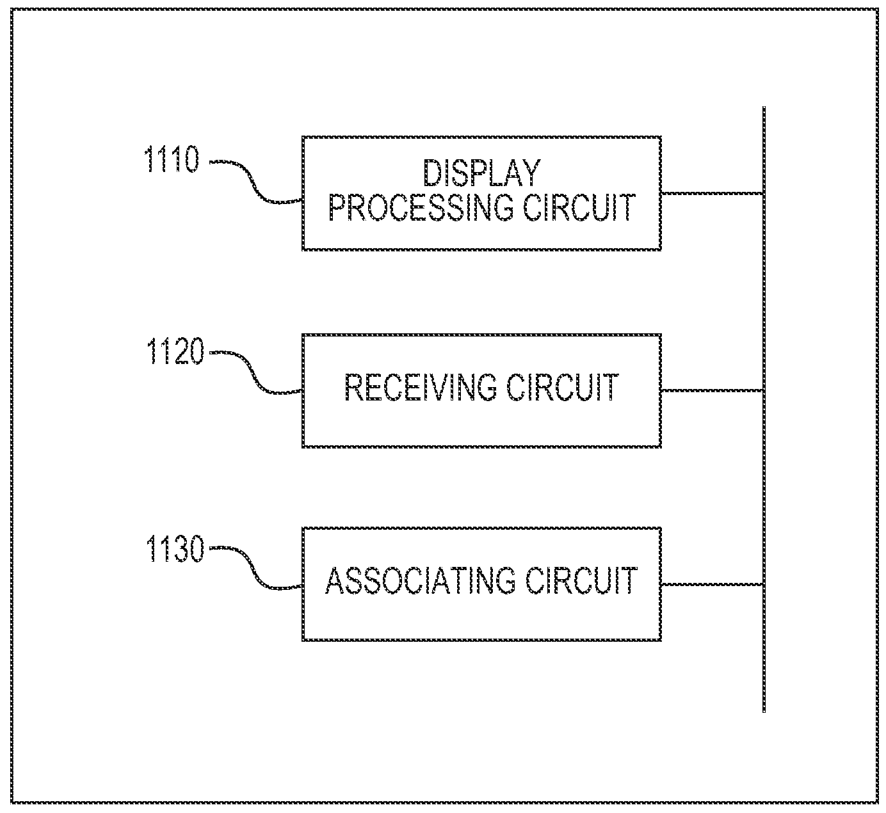
FIG. 49 is a circuit configuration diagram showing an example of a circuit configuration for realizing a computer program executed in a user terminal in this disclosure.

The above-described functions can be realized by circuits 1110 to 1130 shown in FIG. 49. It is assumed that the display processing circuit 1110, the receiving circuit 1120, and the associating circuit 1130 are realized by the display processor 110, the receiver 120, and the association portion 130 described above, respectively. Details of each portion are as described above.

The above-described configuration provides a technical improvement that solves or alleviates at least part of the problem of the conventional technology described above.

In order to function as the server device or the terminal device according to the above-described embodiments, an information processing device such as a computer or a mobile phone can be suitably used. Such an information processing device can be realized by storing in the memory of the information processing device a program that describes processing details for realizing each function of the server device or the terminal device according to the embodiment, and having the CPU of the information processing device read out and execute the program.

Figure 50:
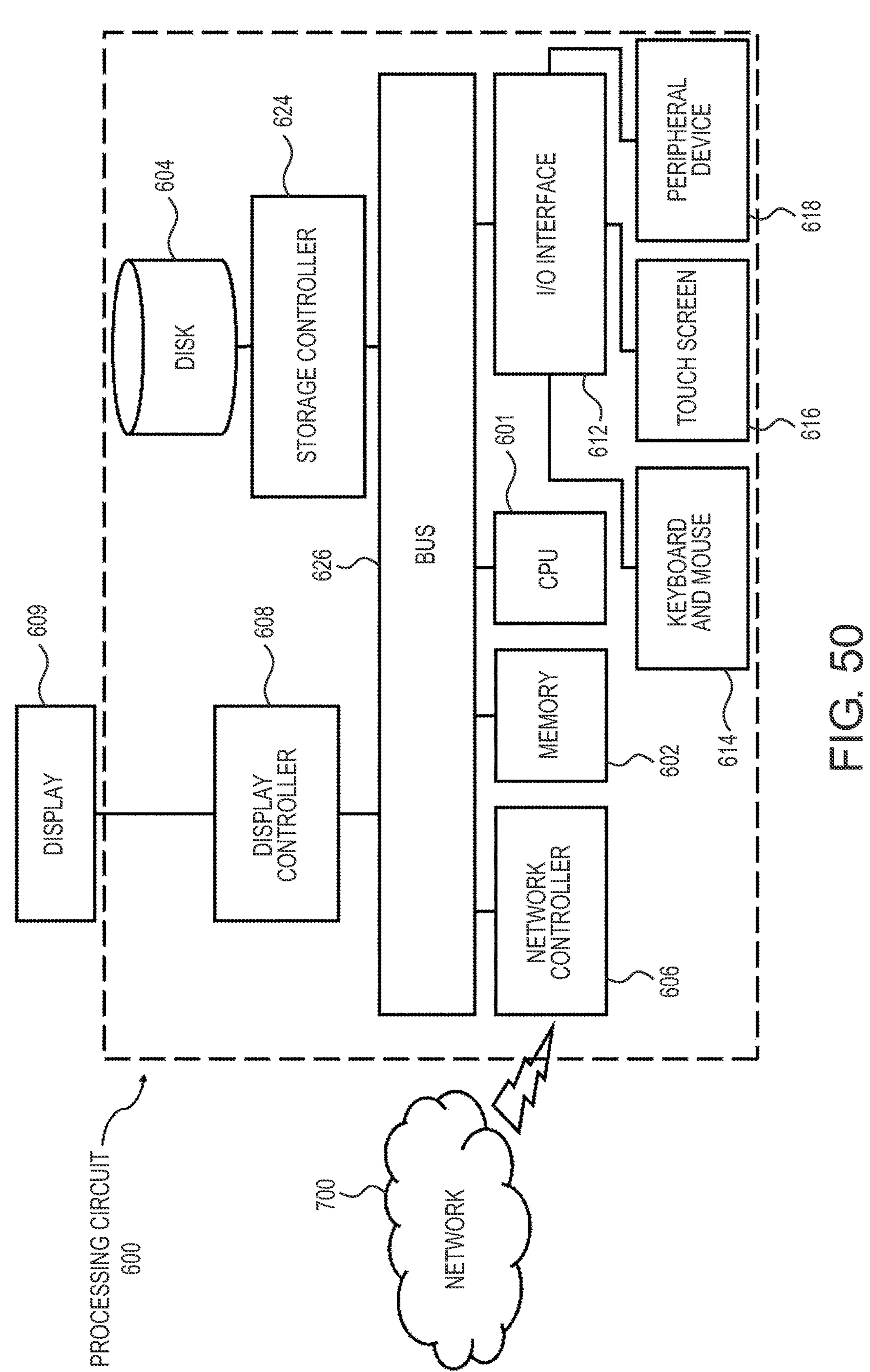
FIG. 50 is a block diagram of a processing circuit that executes computer-based operations in this disclosure.

FIG. 50 is a block diagram of processing circuitry for performing computer-based operations in accordance with this disclosure. FIG. 50 shows a processing circuit 600, which corresponds to a CPU of the terminal(s) and device(s) in this disclosure.

The processing circuit 600 can be used to control any computer-based or cloud-based control process, and the flowchart descriptions or blocks can be understood as expressing modules, segments or portions of one or more executable commands for implementing specific logical functions or steps within the process, and alternative implementations are included within the exemplary embodiments of this advancement in which the function may be executed. The order from that shown or discussed includes substantially the same or the reverse order depending on the functionality involved, as will be understood by one skilled in the art. The functionality of the elements disclosed herein can be implemented using processing circuits or circuits including general purpose processors, special purpose processors, integrated circuits, ASICs ("Application Specific Integrated Circuits"), conventional circuits configured or programmed to perform the disclosed functions, and/or combinations thereof. A processor may be a circuit or may process circuits so as to include transistors and other circuits therewithin. The processor may be a processor programmed to execute programs stored in memory. In this disclosure, processing circuits, units, and means are hardware that performs or is programmed to perform the enumerated functions. The hardware can be any hardware disclosed herein or any commonly known hardware that is otherwise programmed or configured to perform the enumerated functions.

In FIG. 50, the processing circuit 600 includes a CPU 601 that executes one or more of the control processes discussed in this disclosure. Process data and instructions may be stored in a memory 602. These processes and instructions may also be stored on a storage medium disk 604, such as a hard drive (HDD) or portable storage medium, or may be stored remotely. Furthermore, the advancement(s) recited in the scope of the claims is not limited by the form of computer-readable media on which the instructions of the process are stored. For example, the instructions may be stored on a CD, DVD, flash memory RAM, ROM, PROM, EPROM, EEPROM, hard disk, or any other non-transitory computer-readable medium in an information processing device with which the processing circuit 600 communicates, such as a server or computer. The processes may also be stored in network-based storage, cloud-based storage, or other mobile-accessible storage and be executable by the processing circuit 600.

Further, the claimed advancement may be provided as a utility application, a background daemon, or an operating system component, or as a combination thereof, and can be executed along with the CPU 601 and an operating system such as Microsoft Windows, UNIX, Solaris, LINUX, Apple MAC-OS, Apple iOS and other systems known to those skilled in the art.

The hardware elements for realizing the processing circuit 600 may be realized by various circuit elements. In addition, each function of the above-described embodiment may be realized by a circuit including one or more processing circuits. The processing circuits include a specially programmed processor, such as the processor (CPU) 601 shown in FIG. 50. The processing circuits also include devices such as application specific integrated circuits (ASICs) and conventional circuit components arranged to perform the enumerated functions.

Alternatively, or additionally, the CPU 601 may be implemented on an FPGA, ASIC, or PLD, or using discrete logic circuits, as will be appreciated by those skilled in the art. Also, the CPU 601 may be realized as a plurality of processors operating in parallel and in cooperation to execute the above-described instructions of the processes of this disclosure.

The processing circuit 600 of FIG. 50 also includes a network controller 606 such as an Ethernet PRO network interface card for interfacing with the network 700. As can be appreciated, the network 700 can be a public network such as the Internet, or a private network such as a local area network (LAN) or wide area network (WAN), or any combination thereof, and may also include a public switched telephone network (PSTN) or integrated services digital network (ISDN) sub-networks. The network 700 can also be wired, such as an Ethernet network, a Universal Serial Bus (USB) cable, or the like, or wireless, such as a cellular network including EDGE, 3G and 4G wireless cellular systems. The wireless network can also be Wi-Fi, wireless LAN, Bluetooth, or any other form of wireless communication known. Additionally, the network controller 606 may comply with other direct communication standards such as Bluetooth, Near Field Communication (NFC), infrared or others.

The processing circuit 600 further includes a display controller 608, such as a graphics card or graphics adapter, for interfacing with a display 609, such as a monitor. An I/O interface 612 interfaces with a keyboard and/or a mouse 614 and a touch screen panel 616 on or separate from the display 609. The I/O interface 612 also connects to various peripheral devices 618.

A storage controller 624 connects the storage media disk 604 with a communication bus 626, which may be ISA, EISA, VESA, PCI or similar, and which interconnects all components of the processing circuit 600. A description of the general features and functionality of the display 609, the keyboard and/or mouse 614, the display controller 608, the storage controller 624, the network controller 606, and the I/O interface 612, is omitted here for brevity because these features are commonly known.

The exemplary circuit elements described in the context of this disclosure may be replaced with other elements or may be of different construction than the examples provided herein. Further, circuits configured to perform the functions described in this specification may be implemented in multiple circuit units (e.g., chips), or the features may be combined in circuits on a single chipset.

The functions and features described herein may also be performed by various distributed components of the system. For example, one or more processors may perform these system functions, where the processors are distributed among a plurality of components communicating within a network. Distributed components can include one or more client and server machines that can share processing, as well as various human interfaces and communication devices (e.g., display monitors, smartphones, tablets, or personal digital assistants (PDAs)). The network may be a private network such as LAN or WAN, or a public network such as the Internet. Input to the system is received through direct user input and can be received remotely in real time or as a batch process. Moreover, some implementations may be performed on hardware or modules that are not identical to those described. Accordingly, other implementations are within the scope of what is claimed.

While several embodiments have been described, these embodiments are provided by way of example and are not intended to limit the scope of the disclosure. These novel embodiments can be implemented in various other forms, and various omissions, replacements, and modifications can be made without departing from the spirit of the disclosure. These embodiments and their modifications are included in the scope and gist of the disclosure, and are included in the scope of the disclosure described in the claims, and their equivalents.

Further, the methods described in the embodiments can be stored on a recording medium such as a magnetic disk (floppy (registered trademark) disk, hard disk, or the like), optical disc (CD-ROM, DVD, MO, or the like), semiconductor memory (ROM, RAM, flash memory, or the like), or the like, as programs that can be executed by a computer (computer), or can be sent and distributed via a communication medium. The programs stored on the medium include setting programs that configure, in the computer, software means (including not only executable programs but also tables and data structures) executed by the computer. A computer that realizes this device reads a program stored on a recording medium, and depending on the case, constructs software means by a setting program, and executes the above-described processes through operations controlled by the software means. The term "recording medium" as used herein is not limited to those for distribution, and includes storage media such as magnetic disks and semiconductor memory provided inside the computer or equipment connected via a network. A memory may function, for example, as a main memory device, an auxiliary memory device, or cache memory.

EXPLANATION OF SYMBOLS

100 First user terminal
400 Server device
410 Display processor
420 Receiver
430 Association portion

The invention claimed is:

1. An information processing system for processing information between a user terminal and a server device, the system comprising:
 at least one processor programmed to:
  cause a display screen to be displayed that includes a first screen that displays a first character object of a user of the user terminal, and a second screen that selectably displays one or more first game media that can be attached to the first character object;
  receive, from the user terminal, a selection instruction selecting at least one first game medium from among the one or more first game media; and
  consume a predetermined number of second game media held by the user based on the received selection instruction, the second game media being different from the first game media, and store the selected at least one first game medium in association with the user and the first character object, wherein
 the second screen displays the second game media that are consumed based on the received selection instruction selecting the at least one first game medium for attachment to the first character object.

2. The information processing system according to claim 1, wherein the at least one processor is further programmed to determine whether a held number of the second game media held by the user is sufficient, and store the selected at least one first game medium in association with the user and the first character object when the held number is determined to be sufficient.

3. The information processing system according to claim 1, wherein the user is a distributing user of a video distributed in a manner viewable by a viewing user of the video, the video including the first and second screens.

4. The information processing system according to claim 3, wherein the at least one processor causes at least part of the display screen to be displayed differently on the user terminal of the distributing user and on a user terminal of the viewing user.

5. The information processing system according to claim 1, wherein the at least one processor determines the one or more game first media to be displayed on the second screen according to an attribute of the first character object that is displayed on the first screen.

6. The information processing system according to claim 1, wherein the at least one processor is further programmed to change the first character object displayed on the first screen to a second character object of the user according to an operation of the user.

7. The information processing system according to claim 6, wherein the at least one processor is further programmed to determine whether attributes of the first character object and the second character object are different, and upon determining that the attributes of the first character object and the second character object are different, determine the one or more first game media to be displayed on the second screen according to the attribute of the second character object.

8. The information processing system according to claim 1, wherein the at least one processor is further programmed to cause to be displayed, on the display screen, a first object for receiving a display instruction of a third screen that enables cancellation of selection of the selected at least one first game medium.

9. The information processing system according to claim 8, wherein the at least one processor causes to be displayed, on the third screen, a list of the first game media related to the selection instruction in a predetermined order.

10. The information processing system according to claim 6, wherein the selection instruction selects the at least one first game medium for attachment to the first character object and selects at least one first game medium for attachment to the second character object, and in response to receiving the selection instruction, the at least one processor (i) causes to be displayed, on the display screen, a first object for receiving a display instruction of a third screen that enables cancellation of selection of the selected at least one first game media, and (ii) causes to be displayed, on the third screen, a list of the first game media related to the selection instruction in a predetermined order for at least one of the first and second character objects.

11. The information processing system according to claim 8, wherein in response to receiving the display instruction of the third screen via the first object, the at least one processor (i) causes the third screen to be displayed on the display screen and (ii) causes to be displayed a second object on the display screen for sending a decision instruction to consume the predetermined number of the second game media and to store the selected at least one first game medium in association with the user and the first character object, and in response to receiving selection of the second object, the at least one processor stores the first game media for which the selection has not been canceled in association with the user and the first character object.

12. The information processing system according to claim 11, wherein in response to receiving the decision instruction via the second object, the at least one processor causes the display screen to display (i) a fourth screen that enables cancellation of the selection of the at least one first game medium related to the decision instruction and (ii) a third object for consuming the predetermined number of the second game media and storing the selected at least one first game medium in association with the user and the first character object, and the at least one processor stores only the first game media for which the selection has not been canceled in association with the first character object in response to selection of the third object.

13. The information processing system according to claim 1, wherein at least one processor is further programmed to receive selection of at least one attribute from among a plurality of attributes provided for the selected at least one first game medium.

14. The information processing system according to claim 1, wherein in response to receiving the selection instruction, the at least one processor causes the selected at least one first game medium to be displayed as attached to the first character object displayed on the first screen.

15. The information processing system according to claim 1, wherein in response to the selected at least one first game medium including multiple first game media, the at least one processor switches display of attachment of the multiple first game media according to a movement of the user or an operation of the user.

16. The information processing system according to claim 1, wherein in response to the selected at least one first game medium including multiple first game media to be attached to one part of the first character object, the at least one processor divides the one part into a plurality of regions and attaches and displays each of the multiple first game media in a respective one of the regions.

17. The information processing system according to claim 1, wherein the at least one processor is further programmed to cause to be displayed a still image or a video related to the first character object separately from the first character object displayed on the first screen.

18. The information processing system according to claim 1, wherein the at least one processor stores the selected at least one first game medium in association with the user and the first character object with a restriction, based on the selection instruction and a restriction instruction.

19. The information processing system according to claim 18, wherein a consumption amount of the second game media when the selected at least one first game medium is stored in association with the user and the first character object with the restriction is less than a consumption amount of the second game media when the selected at least one first game medium is stored in association with the user and the first character object without the restriction.

20. The information processing system according to claim 18, wherein the restriction is cancelled in response to consumption of the second game media by the user or another user.

21. An information processing method by an information processing system for processing information between a user terminal and a server device, the method comprising:

causing a display screen to be displayed that includes a first screen that displays a first character object of a user of the user terminal, and a second screen that selectably displays one or more first game media that can be attached to the first character object;

receiving, from the user terminal, a selection instruction selecting at least one first game medium from among the one or more first game media; and consuming a predetermined number of second game media held by the user based on the received selection instruction, the second game media being different from the first game media, and storing the selected at least one first game medium in association with the user and the first character object, wherein the second screen displays the second game media that are consumed based on the received selection instruction selecting the at least one first game medium for attachment to the first character object.

22. A non-transitory computer-readable medium storing thereon a program that causes an information processing device to execute:

causing a display screen to be displayed that includes a first screen that displays a first character object of a user, and a second screen that selectably displays one or more first game media that can be attached to the first character object;

receiving a selection instruction selecting at least one first game medium from among the one or more first game media; and consuming a predetermined number of second game media held by the user based on the received selection instruction, the second game media being different from the first game media, and storing the selected at least one first game medium in association with the user and the first character object, wherein the second screen displays the second game media that are consumed based on the received selection instruction selecting the at least one first game medium for attachment to the first character object.

* * * * *